United States Patent [19]

Maehara et al.

[11] Patent Number: 5,063,490
[45] Date of Patent: Nov. 5, 1991

[54] REGULATED CHOPPER AND INVERTER WITH SHARED SWITCHES

[75] Inventors: Minoru Maehara, Kadoma; Haruo Nagase, Nara, both of Japan

[73] Assignee: Matsushita Electric Works Ltd., Kadoma, Japan

[21] Appl. No.: 514,052

[22] Filed: Apr. 24, 1990

[30] Foreign Application Priority Data

| Apr. 25, 1989 | [JP] | Japan | 1-105181 |
| May 26, 1989 | [JP] | Japan | 1-134397 |
| Jul. 26, 1989 | [JP] | Japan | 1-193431 |
| Jul. 26, 1989 | [JP] | Japan | 1-193435 |

[51] Int. Cl.[5] ................................ H02M 5/458
[52] U.S. Cl. ................................ 363/37; 315/247; 315/307; 363/80; 363/98; 363/124
[58] Field of Search ............ 363/36, 37, 79, 80, 363/98, 124, 126; 315/247, 307

[56] References Cited

U.S. PATENT DOCUMENTS

| 4,523,131 | 6/1985 | Zansky | 315/307 |
| 4,564,897 | 1/1986 | Okamoto et al. | 363/37 |
| 4,905,136 | 2/1990 | Tanaka | 363/124 |
| 4,933,831 | 6/1990 | Takahashi et al. | 363/37 |

Primary Examiner—William H. Beha, Jr.
Attorney, Agent, or Firm—Armstrong, Nikaido, Marmelstein, Kubovcik & Murray

[57] ABSTRACT

An improved inverter AC power supply includes a chopper providing a DC voltage from an AC source voltage and an inverter providing from the DC voltage a high frequency AC voltage to a load. The chopper incorporates a pair of first and second switching elements operating to turn on and off for obtaining a periodically interrupted AC voltage which is rectified and smoothened to provide the DC voltage to the inverter. The inverter is arranged to share the first and second switching elements in common to the chopper, and operates to drive the same switching elements for switching the DC voltage in order to provide a desired AC voltage to the load. The power supply is provided with an input power sensor monitoring an input power supplied to the chopper and an output power sensor monitoring an output power from the inverter to the load. A power controller is included for varying at least one of a switching frequency and a duty ratio for the first and second switching elements in accordance with the monitored chopper input power and inverter output power for equalizing the input and output powers.

11 Claims, 37 Drawing Sheets

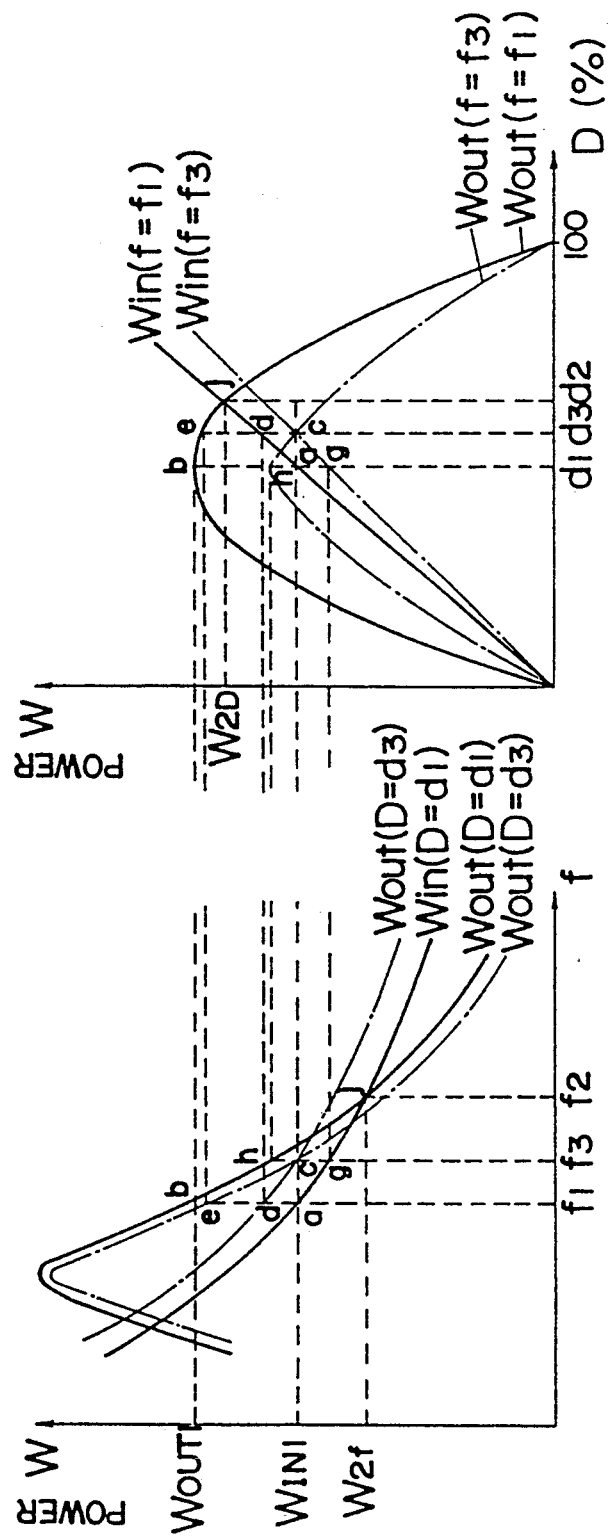

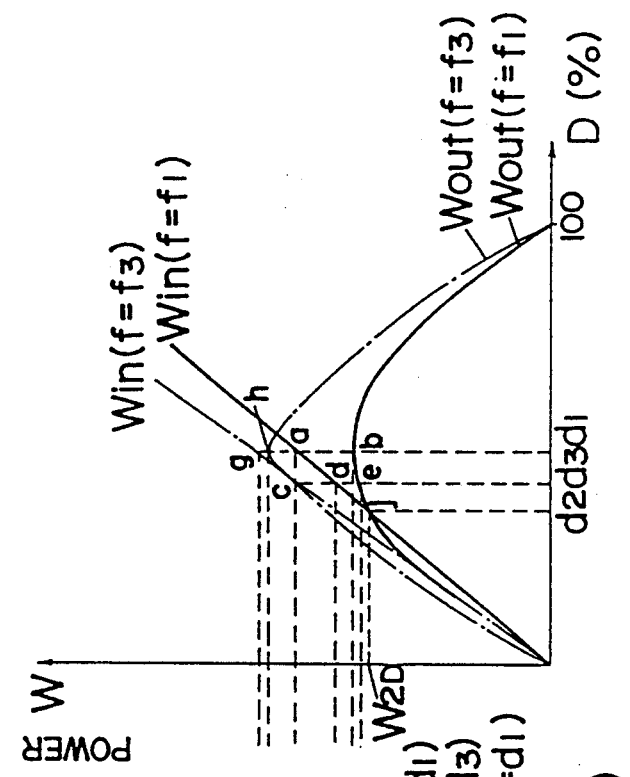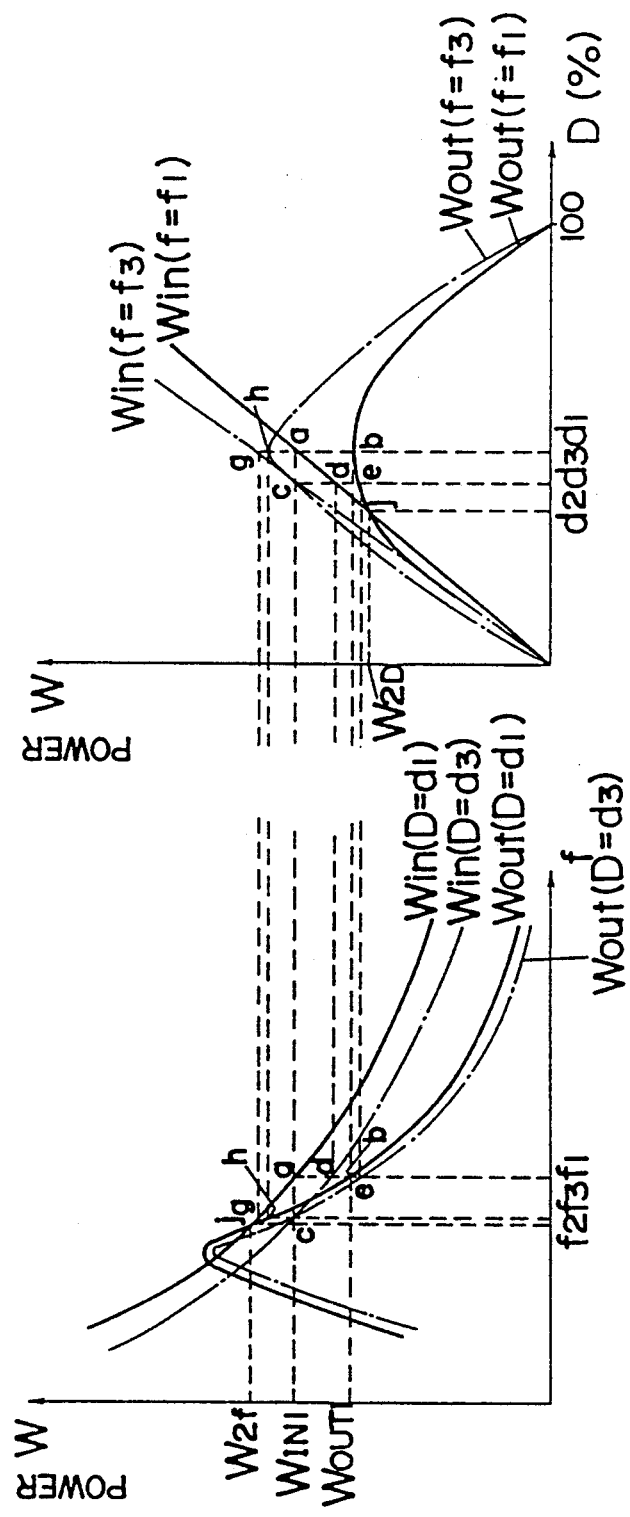

REGULATED CHOPPER AND INVERTER WITH SHARED SWITCHES

BACKGROUND OF THE INVENTION

1. The field of the Invention

The present invention is directed to a power supply, and more particularly to an inverter AC power supply which is connected to an commercial ac voltage source to provide therefrom through an ac-dc-ac conversion a high frequency AC voltage to a load with a maximum efficiency.

2. Description of the Prior Art

Inverter AC power supplies are known to comprise an ac-to-dc converter providing a dc voltage form a commercial ac source voltage and an inverter providing from the dc voltage a high frequency voltage for driving loads such as discharge lamps. It is also known to utilizes a chopper in the circuit which operates to chop the ac source voltage in providing the dc voltage to the inverter input for reducing the size of an inductor element necessary for improving a power factor of the circuit. In order to avoid duplication of components for the chopper and inverter, it has been proposed in the preceding U.S. application Ser. No. 407,093 now U.S. Pat. No. 4,933,831, to share switching elements for the chopper and inverter circuits. Although such a prior power supply is found most effective in reducing the number of circuit components while assuring an improved power factor, it is rather difficult to control an input power $W_{IN}$ to the chopper and an output power $W_{OUT}$ from the inverter independently of one another due to the limitation that the switching elements are common to the chopper and the inverter. This poses another problem when the power supply suffers from considerable variations in the input power $W_{IN}$ or output power $W_{OUT}$ which may result from, for example, varying load conditions, fluctuations in the ac source voltage, or other factors. That is, when the input power to the chopper is for some reason reduced to have $W_{IN} < W_{OUT}$, considerable harmonics will appear, in an input current from the AC source thereby causing undesirable input distortion and eventually reducing the power factor. On the other hand, when the input power to the chopper is increased to have $W_{IN} > W_{OUT}$, the chopper output is correspondingly increased so as to apply such increased voltage to the switching elements and smoothing capacitors forming the chopper and the inverter. Consequently, it is required to utilize the switching element and the capacitors which can withstand such increased voltage for safe operation of the circuit. However, such components are unexceptionably expensive and will certainly add extra cost to the power supply. Therefore, it is highly demanded to positively control for balancing the chopper input power $W_{IN}$ and the inverter output power $W_{OUT}$, particularly in the power supply circuit utilizing the switching element common to the chopper and the inverter for the purpose of reducing the input distortion to a minimum, maintaining improved power factor, and preventing an undue increase in cost.

SUMMARY OF THE INVENTION

It is therefore a primary object of the present invention to provide an improved inverter AC power supply which is capable of positively equalizing the chopper input power and the inverter output power for eliminating an undesirable input distortion to maintain an improved power factor, while assuring a safe operation with the use of less expensive circuit components.

In order to achieve the above objects, studies have been made to investigate a suitable control scheme for equalizing input power and output power in an inverter AC power supply circuit which comprises a chopper providing an input dc voltage from an ac source voltage and an inverter providing a high frequency ac voltage to a load from the dc voltage, and in which the chopper and the inverter share at least one switching element. Prior to discussing the control scheme, a brief explanation will be made to the power supply of the present invention for easy understanding of the present invention. Referring to FIG. 1, there is shown a basic circuit arrangement of the power supply invention, although the present invention is not limited thereto. As shown in the figure, the power supply comprises the chopper 1 connected through a low pass filter 3 to a commercial AC source voltage Vs, and the inverter 2 connected in circuit to invert the dc voltage from the chopper 1 for providing a high frequency AC voltage to a load, which is illustrated as one typical example to comprise an inductance $L_3$ and a fluorescent lamp FL with a capacitor $C_4$. The chopper 1 includes an inductor $L_2$, a full-wave rectifier diode bridge of $D_1$ to $D_4$, a pair of series connected switching elements $Q_1$ and $Q_2$, and a pair of series connected capacitors $C_2$ and $C_3$. The switching elements $Q_1$ and $Q_2$ are driven to alternately turn on and off at a high frequency in order to chop or repeat interrupting the AC voltage $V_{IN}$ from the source voltage Vs, developing at inductor $L_2$ a resulting voltage which is then rectified through the full-wave rectifier to provide a DC voltage to the capacitors $C_2$ and $C_3$ while being smoothed thereat. The inverter 2 shares the switching elements $Q_1$ and $Q_2$ to switch the DC voltage from the capacitors $C_2$ and $C_3$ for providing the resulting high frequency AC voltage to the load while the chopper 1 operates to provide the DC Voltage to the capacitors $C_2$ and $C_3$. FIG. 2 shows waveforms for input voltage $V_{In}$ and current $I_{IN}$, current $I_{L2}$ through inductor $L_2$, drive signals $S_1$ and $S_2$ for switching elements $Q_1$ and $Q_2$, dc voltage $V_C$ developed across each of capacitors $C_2$ and $C_3$, and a load voltage $V_L$ or current $I_L$. As shown in FIGS. 3A to 3D, and FIGS. 4A to 4D, the alternate switching on and off of the switching elements $Q_1$ and $Q_2$ produces within each half cycle of the AC voltage a first chopper mode alternated by a second chopper mode while effecting an inverter operation of providing the high frequency AC voltage to the load. The inverter operation is shown in FIG. 3A and 3C for positive half cycle of the AC source voltage $V_{IN}$ and also in FIG. 4A and 4C for the negative half cycle of the AC source voltage $V_{IN}$. The first chopper mode is a pre-charge condition [FIG. 3B for the positive half cycle and FIG. 4B for the negative half cycle] in which one of the switching elements $Q_1$ ($Q_2$) is conductive to establish a closed loop of the AC voltage source Vs, the inductor $L_2$, one of the diodes $D_3$ ($D_4$), and the one switching element $Q_1$ ($Q_2$) for storing the energy in the inductor $L_2$. The second chopper mode is a charge condition [FIG. 3D for the positive half cycle and FIG. 4D for the negative half cycle] in which the one of switching element $Q_1$ ($Q_2$) is non-conductive to establish a closed loop of the inductor $L_2$, the one of the third and fourth diodes $D_3$ ($D_4$), the capacitor $C_2$ ($C_3$), one of the first and second diodes $D_2$ ($D_1$), and the AC voltage source Vs for releasing the energy from the inductor $L_2$ to charge the capacitor $C_2$ ($C_3$). In this manner, these modes or conditions repeat within each half cycle of the AC source voltage Vs to effect charging the capacitors $C_2$ and $C_3$ which provides the smoothed input voltage to the inverter. Thus, the switching elements $Q_1$ and $Q_2$ of the inverter can be best utilized equally within each one complete cycle of the input AC voltage as effecting the chopper operation for providing the DC voltage to the capacitors $C_2$ and $C_3$. That is, $Q_1$ serves both for chopper and inverter operations while $Q_2$ serves only for the inverter operation during the positive half cycle, and $Q_2$ serves both for chopper and inverter operations while $Q_1$ serves only for the inverter operation during the negative half cycle of the AC source voltage. In this sense, both of the switching elements $Q_1$ and $Q_2$ are be utilized common to the inverter and chopper operations. Further details of the circuit operation are fully explained in the preceding U.S. application Ser. No. 407,093, now U.S. Pat. No. 4,933,831, and are not repeated here.

Based upon the above power circuit having the switching elements common to the chopper and the inverter, it is contemplated to positively equalize the chopper input power $W_{IN}$ and inverter output power $W_{OUT}$. In one version of the present invention, the chopper input power $W_{IN}$ and inverter output power $W_{OUT}$ are positively equalized by controlling to vary a switching frequency f and/or a duty ratio D of the switching elements with due consideration of simultaneous variations resulting both in the chopper input power $W_{IN}$ and in the inverter output power $W_{OUT}$. The consequence of the individual controls are discussed in the below. Unless otherwise specified, the following description is based upon the power circuit of FIG. 1 having two switching elements $Q_1$ and $Q_2$ for driving the load composed of inductor $L_3$, fluorescent lamp FL with capacitor $C_4$.

I Frequency Control $W_{IN}$ and $W_{OUT}$ can be represented respectively as functions of the switching frequency f, as shown in FIG. 5A, in which an operating frequency ranged is defined to be above a natural frequency $f_c$ of the load. As apparent from the figure, both of $W_{IN}$ and $W_{OUT}$ show a monotonic decreasing relation to an increase in the switching frequency f within the available operating frequency range, and there is a frequency $f_0$ at which $W_{IN}$ is equal to $W_{OUT}$. Also known from the figure is that $W_{OUT}$ has a greater gradient or shows a greater ratio of change than $W_{IN}$ relative to the change in the frequency f, i.e., $$\frac{d}{df} W_{OUT} > \frac{d}{df} W_{IN}$$

Therefore, it is found that the frequency control is suitable for varying $W_{OUT}$ with a small change in $W_{IN}$.

II Duty Ratio Control

Duty ratio D is defined as a ratio of the on-time period to one complete cycle of the switching element. Since the power supply circuit includes two switching elements, the duty ratio can be defined in two different manners, one is for the case where the two switching elements $Q_1$ and $Q_2$ having the same on-time period, the other is for the case where they have differing on-time periods which are complementary to one another, i.e., the on-period of the one switching element corresponds to the off-period of the other switching element.

II-A Duty ratio control with the same on-time period for $Q_1$ and $Q_2$

Due to the restriction of the inverter circuit in which the switching elements $Q_1$ and $Q_2$ should not be simultaneously turned on for protection against short-circuiting, the duty ratio D has to be less than 50%. Within a controllable duty ratio range below 50%, $W_{IN}$ and $W_{IN}$ show monotonic increasing relation to the increasing duty ratio D, as shown in FIG. 8. It is found from the figure that there is a particular point d0 adjacent D=50% at which $W_{IN}$ is equal to $W_{IN}$ and that $W_{OUT}$ has a greater gradient or shows greater ratio of change than $W_{IN}$ in the vicinity of D=50%, in relation to the change in duty ratio D, i.e., $$\frac{d}{dD} W_{IN} > \frac{d}{dD} W_{OUT}$$

Therefore, it is revealed that the duty ration control is suitable for varying $W_{IN}$ with a small change in $W_{OUT}$.

II-B Duty ratio control with differing on-time periods in complementary relation between $Q_1$ and $Q_2$ In this control, the two switching elements $Q_1$ and $Q_2$ are driven in such a manner that on-time period of one switching element corresponds to the off-time period of the other switching element, as illustrated in FIG. 9A where $Q_1$ and $Q_2$ have the same on-time period T/2 and FIG. 9B where $Q_1$ and $Q_2$ have differing on-time periods $X_{ON}$ and T-$X_{ON}$ in complementary relation. Since there could be two definitions of duty ratio for the two switching elements with this control, duty ratio D is defined as directed to one of the switching elements which is currently responsible for the chopper operation. It is noted at this time that the switching elements $Q_1$ and $Q_2$ responsible for the chopper operation will alternate in synchronism with the polarity reversal in the AC source voltage Vs, as discussed in the above. That is, during positive half cycle of the input AC voltage $V_{IN}$, the switching element $Q_1$ is responsible for the chopper and inverter operations, while the switching element $Q_2$ is responsible only for the inverter operation. During the negative half cycle of the input voltage $V_{IN}$, the switching element $Q_2$ turns to be responsible for the chopper and inverter operations, while the switching element $Q_1$ is responsible only for the inverter operation. With this definition of the duty ratio D, the chopper input power $W_{IN}$ and the inverter output power $W_{OUT}$ show also monotonic increasing relation to the increasing duty ratio D, as shown in FIG. 5B. It is found from the figure that there is a particular point de adjacent D=50% at which $W_{IN}$ is equal to $W_{IN}$ and that $W_{IN}$ has a greater gradient or shows greater ratio of change than $W_{OUT}$ in the vicinity of D=50%, in relation to the change in duty ratio D, i.e., $$\frac{d}{dD} W_{IN} > \frac{d}{dD} W_{OUT}$$

Therefore, it is also revealed that the duty ratio control is suitable for varying $W_{IN}$ with a small change in $W_{OUT}$. In view of the above behaviors of $W_{IN}$ and $W_{OUT}$ in relation to the switching frequency f and duty ratio D of the switching elements, it is concluded that the frequency control is advantageous for effecting relatively great change in $W_{OUT}$ with less change in $W_{IN}$ and that the duty ratio control is advantageous for effecting relatively great change in $W_{IN}$ with less change in $W_{OUT}$. Accordingly, it is possible to compensate for change in the chopper input power $W_{IN}$ or the inverter output power $W_{OUT}$ by suitably selecting the frequency control and/or the duty ratio control such that $W_{IN}$ and $W_{OUT}$ are kept at the same level while maintaining one of $W_{IN}$ and $W_{OUT}$ substantially unchanged. The above changes in $W_{IN}$ and $W_{OUT}$ are likely in the actual operational environment of the inverter AC power supply and are seen in the following situations, particularly when the power supply is used to drive the discharge lamp.

I Output power control

When the power supply is designed to additionally include a dimmer for controlling light intensity, the inverter output power $W_{OUT}$ has to be variable, thus inevitably breaking the relation $W_{IN}=W_{OUT}$

II Differing operational modes

When the power supply is designed to have $W_{IN}=W_{OUT}$ at a certain frequency so as to provide a maintaining voltage for keeping the discharge lamp on (normal operational mode), it will have $W_{IN}>W_{OUT}$ at the time of preheating the lamp by driving the switching elements at a greater frequency (preheating mode). And when the power supply is designed to have $W_{IN}=W_{OUT}$ at the preheating mode, it will have $W_{IN}<W_{OUT}$ at the normal operation mode.

III AC source voltage variations or fluctuations

This eventually breaks the relation $W_{IN}=W_{OUT}$.

IV Load variations

When, for example, the power supply is utilized to drive a number of parallel coupled lamps, the inverter output power $W_{OUT}$ will decrease upon one or more of the lamps becoming extinct or emission-less, resulting in $W_{IN}>W_{OUT}$.

FIGS. 5 to 7 illustrate three possible situations having the relations between $W_{IN}$ and $W_{OUT}$ with respect to switching frequency f and duty ratio D. In the figures, duty ratio D is determined in accordance with the above definition II-B. FIGS. 5A and 5B illustrates an ideal situation where $W_{IN}$ is kept equal to $W_{OUT}$ at selected operating frequency $f_1$ and duty ratio $d_1$ so that the chopper can provide an optimum voltage to the inverter and distortion in the input current can be kept at a minimum.

FIGS. 6A and 6B illustrates an unbalanced situation where $W_{OUT}$ becomes greater than $W_{IN}$ at the selected operation frequency f and duty ratio $d_1$ so that input current will suffer from significant distortion to reduce the power factor.

FIGS. 7A and 7B illustrates another unbalanced situation where $W_{IN}$ becomes greater than $W_{OUT}$ at the selected operation frequency $f_1$ and duty ratio $d_1$ so that the chopper will provide unduly high voltage which may damage the switching elements and the capacitors.

In order to balance $W_{IN}$ and $W_{OUT}$, it is possible to vary the switching frequency f [$f_1 f_2$] or duty ratio D [$d_1-d_2$]. In determining which of the switching frequency f and the duty ratio D is utilized, it is considered that which of $W_{IN}$ and $W_{OUT}$ has to have less variation. That is, when compensating for the unbalanced conditions [$W_{IN}<W_{OUT}$ of FIGS. 6A and 6B, $W_{IN}>W_{OUT}$ of FIGS. 7A and 7B] while maintaining the variation in $W_{IN}$ to a less extent, the frequency control is preferable. Likewise, when compensating for the unbalanced conditions [$W_{IN}<W_{OUT}$ of FIGS. 6A and 6B, $W_{IN}>W_{OUT}$ of FIGS. 7A and 7B] while maintaining the resulting variation in $W_{OUT}$ to a less extent, the duty ratio control is preferable.

In either case, both of $W_{IN}$ and $W_{OUT}$ have to change from their initial level, although one of them could be maintained to see a relatively small variation. However, in the actual use of the inverter AC power supply, there is a certain requirement to maintain either of $W_{IN}$ and $W_{OUT}$ at a fixed level when balancing them. Such requirement can be successfully satisfied by effecting a delicate control of combining the frequency control and the duty ratio control.

The above delicate combination control of frequency f and duty ratio D will be now discussed with regard to four possible conditions [A] to [D].

[A] For condition $W_{IN}<W_{OUT}$ with $W_{IN}$=fixed:

FIGS. 10A and 10B show a condition where $W_{IN}<W_{OUT}$ at a selected operating frequency $f_1$ and a selected operating duty ratio $d_1$. To compensate for this unbalanced condition or to have $W_{IN}=W_{OUT}$, it is possible to raise frequency f [$f_1 \rightarrow f_2$] with fixed duty ratio D=$d_1$ or to raise duty ratio D [$d_1 \rightarrow d_2$] with fixed frequency f=$f_1$. In either of such frequency alone control or duty ratio alone control, both of $W_{IN}$ and $W_{OUT}$ will see certain changes, respectively. That is, the frequency alone control leads to the changes $W_{IN1}$ to $W_{2f}$ [FIG. 10A] and $W_{OUT1}$ to $W_{2f}$, and the duty ratio alone control leads to the changes $W_{IN1}$ to $W_{2D}$ and $W_{OUT1}$ to $W_{2D}$ [FIG. 10B]. In order to maintain $W_{IN}$ fixed in obtaining the balanced condition, a combination control is made through the following steps:

1) Raising the frequency f to a transient frequency $f_3$ so as to change $W_{IN}$ from point [a] to [g] on a curve $W_{IN}$[D=$d_1$] and to correspondingly change $W_{OUT}$ from point [b] to [h] on a curve $W_{OUT}$[D=$d_1$], at which condition the $W_{IN}$ is decreased to a less extent.

2) Raising the duty ratio D from $d_1$ to $d_3$ so as to change $W_{IN}$ from point [g] to [c] on a curve $W_{IN}$[f=$f_3$] and to correspondingly change $W_{OUT}$ from point [h] to [c] on a curve $W_{OUT}$[f=$f_3$], thus obtaining $W_{IN}=W_{OUT}$ while maintaining $W_{IN}$ at an initial level $W_{IN1}$.

[B] For condition $W_{IN}<W_{OUT}$ with $W_{OUT}$=fixed:

FIGS. 11A and 11B show a condition where $W_{IN}<W_{OUT}$ at selected operating frequency $f_1$ and duty ratio $d_1$. In order to maintain $W_{OUT}$ fixed in obtaining the balanced condition, a combination control is made through the following steps:

1) Raising the duty ratio D from $d_1$ to a transient duty ratio $d_3$ so as to change $W_{IN}$ from point [a] to [d] on a curve $W_{IN}$[f=$f_1$] and to correspondingly change $W_{OUT}$ from point [b] to [e] on a curve $W_{out}$[f=$f_1$], at which condition $W_{OUT}$ is decreased to a less extent.

2) Lowering the frequency $f_1$ to a frequency $f_3$ so as to change $W_{IN}$ from point [d] to [c] on a curve $W_{IN}$[D=$d_3$] and to correspondingly change $W_{OUT}$ from point [e] to [c] on a curve $W_{OUT}$[D=$d_3$], thus obtaining $W_{IN}=W_{OUT}$ while maintaining $W_{OUT}$ at an initial level $W_{OUT1}$.

[C] For condition $W_{IN}>W_{OUT}$ with $W_{IN}$=fixed:

FIGS. 12A and 12B show a condition where $W_{IN}>W_{OUT}$ at selected operating frequency $f_1$ and operating duty ratio $d_1$. In order to maintain $W_{IN}$ fixed in obtaining the balanced condition, a combination control is made through the following steps:

1) Lowering the frequency $f_1$ to a transient frequency $f_3$ so as to change $W_{IN}$ from point [a] to [g] on a curve $W_{IN}[D=d_1]$ and to correspondingly change $W_{OUT}$ from point [b] to [h] on a curve $W_{OUT}[D=d_1]$, at which condition the $W_{IN}$ is increased to a less extent.
2) Lowering the duty ratio D from $d_1$ to $d_3$ so as to change $W_{IN}$ from point [g] to [c] on a curve $W_{IN}[f=f_3]$ and to correspondingly change $W_{OUT}$ from point [h] to [c] on a curve $W_{OUT}[f=f_3]$, thus obtaining $W_{IN}=W_{OUT}$ while maintaining $W_{IN}$ at an initial level $W_{IN1}$.

[D] For condition $W_{IN}>W_{OUT}$ with $W_{OUT}=$fixed:

FIGS. 13A and 13B show a condition where $W_{IN}>W_{OUT}$ at selected operating frequency $f_1$ and duty ratio $d_1$. In order to maintain $W_{OUT}$ fixed in obtaining the balanced condition, a combination control is made through the following steps:

1) Lowering the duty ratio D from $d_1$ to a transient duty ratio $d_3$ so as to change $W_{IN}$ from point [a] to [d] on a curve $W_{IN}[f=f_1]$ and to correspondingly change $W_{OUT}$ from point [b] to [e] on a curve $W_{OUT}[f=f_1]$, at which condition $W_{OUT}$ is decreased to a less extent.
2) Lowering the frequency $f_1$ to a frequency $f_3$ so as to change $W_{IN}$ from point [d] to [c] on a curve $W_{IN}[D=d_3]$ and to correspondingly change $W_{OUT}$ from point [e] to [c] on a curve $W_{OUT}[D=d_3]$, thus obtaining $W_{IN}=W_{OUT}$. While maintaining $W_{OUT}$ at an initial level $W_{OUT1}$.

The above control modes are listed in the following table.

| control mode | relation | condition required | switching frequency | duty ratio |
|---|---|---|---|---|
| [A] | $W_{IN} < W_{OUT}$ | $W_{IN} =$ fixed | f | D |
| [B] | $W_{IN} < W_{OUT}$ | $W_{OUT} =$ fixed | f | D |
| [C] | $W_{IN} > W_{OUT}$ | $W_{IN} =$ fixed | f | D |
| [D] | $W_{IN} > W_{OUT}$ | $W_{OUT} =$ fixed | f | D |

It is noted at this time that, although the frequency f and duty ratio D are controlled both in the lowering direction in the above control modes [C] and [D], there are certain differences in control amounts of lowering the frequency f and duty ratio D. That is, the frequency f and duty ratio D are controlled to see greater and smaller change, respectively in the control mode [C] of maintaining $W_{IN}$ fixed than in the control mode [D] of maintaining $W_{OUT}$ fixed. In the above controls, the duty ratio D is determined, in accordance with above definition II-B, to be a duty ratio of the switching element which turns to act for the chopper operation where the two switching elements are driven in such a manner that on-time of the one switching element corresponds to off-time of the other switching element. Thus defined ratio D can be therefore varied from 0 to 100%. However, when the duty ratio is to be adjusted only within a range below 50%, it is equally possible to control the duty ratio determined in accordance with the above definition IIA where the two switching elements are driven in such a manner as to have the same on-time period.

Although the above frequency and/or duty ratio control is found successful for positively balancing $W_{IN}$ and $W_{OUT}$, there may be a case where more flexible control is required. To satisfy such requirement, it is contemplated in another version of the present invention to regulate the chopper input power $W_{IN}$ over a wide range relatively independently of the control of the inverter output power $W_{OUT}$. This is achieved by controlling to intermittently cease the chopper operation for regulation of the chopper input power $W_{IN}$ or the input power to the inverter, while leaving the inverter free to be controlled by the above frequency and/or duty ratio control for keeping the inverter output power $W_{OUT}$ at a desired level. In order to intermittently cease the chopper operation while keeping the inverter operation, it is required to identify which of the two switching elements is currently responsible for the chopper operation and to stop operating only such switching element at suitable time intervals within each half cycle of the AC source voltage Vs. As discussed with reference FIGS. 3 and 4, the switching element responsible for the chopper operation is determined by the polarity of the AC voltage source Vs, i.e., switching element $Q_1$ in the positive half cycle and $Q_2$ in the negative half cycle of the AC voltage source Vs. To this end, a source voltage polarity detector is included to identify which of the two switching elements $Q_1$ and $Q_2$ is currently acting for the chopper operation such that the control is made to stop operating the switching element thus identified at suitable time intervals, thereby ceasing the chopper operation intermittently to regulate the resulting DC voltage supplied from the chopper to the inverter and therefore the input chopper power $W_{IN}$ from the AC source voltage. With this control, therefore, $W_{IN}$ can be regulated over a wide range by suitable selecting the time period in which the chopper operation is ceased and without causing a remarkable variation in the inverter output power $W_{OUT}$. Consequently, when combined with the previously mentioned frequency control which gives a larger variation in $W_{OUT}$ with less variation in $W_{IN}$, the above control of intermittently ceasing the chopper operation is found most effective to regulate $W_{IN}$ and $W_{OUT}$ substantially independently.

It is therefore another object of the present invention to provide an inverter AC power supply which is capable of controlling the input power and the output power substantially independently.

In the meanwhile, for the inverter AC power supply circuit, it is desired to stop the chopper operation when a load is disconnected in order to prevent the chopper from continuously consuming the input power while there is no power consumption at the inverter, which would incur an undue voltage increase at the input of the inverter or the capacitors $C_2$ and $C_3$ supplying the dc voltage to the inverter. Such an undue voltage increase is very dangerous and will eventually break the capacitors $C_2$ and $C_3$ and the other circuit components including the switching elements $Q_1$ and $Q_2$ and diodes $D_1$ to $D_4$. To prevent this potential hazard, a load detector is included to monitor whether the load is connected or disconnected such that the chopper can be disabled when no load condition is detected and be enabled when the load is again connected. Although it is possible to deenergize the entire circuit of the chopper and the inverter upon detection of no load condition, the inverter is preferred to remain active so that it is capable of immediately providing a current when the load is again connected for detection of the on-load condition by the monitoring the current. Therefore, it is found effective to stop only the chopper while keeping the inverter active when the load is disconnected for preventing the undue voltage increase at the inverter input and at the same time for easy detection of the re-connected load condition by the use of the inverter output. For selectively stop operating the chopper in the above mentioned circuit, one of the switching elements $Q_1$ and $Q_2$ currently acting for the chopper can be identified by monitoring the polarity of the input AC voltage Vs as explained previously so that the thus identified switching element is controlled to turn off over the entire half cycle of the input AC voltage Vs, thereby generating no additional DC voltage to the input of the inverter or the capacitors $C_2$ and $C_3$ while the other switching element is kept active for the inverter operation.

Further, in the case of driving discharge lamps with the above inverter AC power supply, it is preferred to provide a lamp current have less high frequency components which may cause acoustic resonance leading to unstable discharge arc to, flickering or even to extinction of the lamp. For obtaining the lamp current with reduced high frequency components, the inverter AC power supply of the present invention is cooperative with an inductor connected in series with the lamp and a bypass capacitor connected across the lamp and is controlled in such a manner as to stop driving for a suitable time period one of the switching elements currently acting only for the inverter operation and not for the chopper operation while keeping the other switching element active. With this control, there is a certain period in which only one of the switching elements responsible for the chopper and inverter operations is active while the other switching element is kept non-conductive. During this period, the one active switching element will pass a current from the output DC voltage of the chopper in one direction through a parallel circuit of the lamp and the bypass capacitor each time it is turned on, and the inductor in series with the lamp acts to continuously flow a current in the same direction through the parallel circuit of the lamp and the bypass capacitor each time the active switching element is turned off. At this occurrence, the bypass capacitor acts to pass high frequency components resulting from the high frequency drive of the switching element, permitting the lamp to see the lamp current, substantially free from such high frequency component, thereby preventing the occurrence of the undesirable acoustic resonance. Since the active switching element responsible for the chopper and inverter operations will change between two switching elements $Q_1$ and $Q_2$ in synchronism with the polarity reversal of the input AC source voltage, the lamp current is defined as a current having a generally rectangular waveform which is removed of the high frequency components and alternates at a low frequency approximately corresponding to the frequency of the input AC source voltage. As a result the discharge lamp can be driven by the low frequency ac voltage in a stable manner without causing the harmful acoustic resonance by the use of the above inverter AC power supply.

Although the above scheme of disabling one of the switching elements responsible for the inverter only operation while keeping the other switching element responsible for the chopper and inverter operations active is discussed for driving the discharge lamp, it should not be limited thereto and may be adapted to provide a low frequency AC voltage of rather rectangular waveform.

The above and still other advantageous features of the present invention will become more apparent from the following description of the preferred embodiments when taken in conjunction with the attached drawings.

BRIEF DESCRIPTION OF THE DRAWINGS

FIGS. 10A, 10B, 11A, 11B, 12A, 12B, 13A and 13B are graphs respectively illustrating control modes for balancing $W_{IN}$ and $W_{OUT}$ with one of them maintained at a fixed level;

DETAILED DESCRIPTION OF THE PREFERRED EMBODIMENTS

Figure 14:
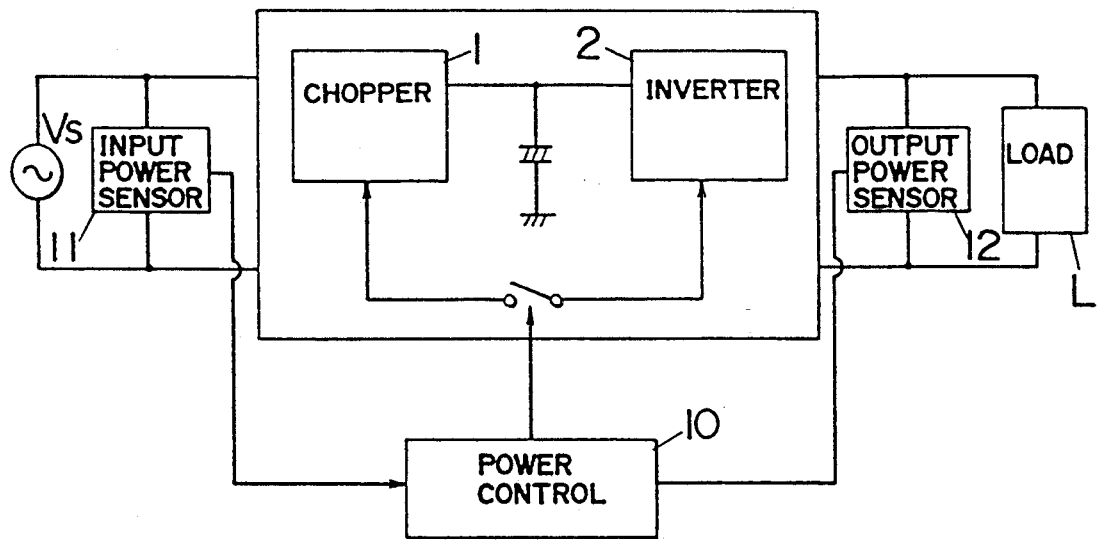
FIG. 14 is a schematic diagram illustrating a basic arrangement of a power source in accordance with the present invention.

Referring now to FIG. 14, an inverter AC power supply is shown in a general arrangement for easy understanding of the present invention. The power supply comprises a chopper 1 and an inverter z. The chopper 1 receives a low frequency AC voltage from a commercial voltage source Vs and acts to switch the voltage at a high frequency for providing a smoothen DC voltage to a capacitor C. The inverter 2 received the smoothed DC voltage from the capacitor C to switch the same to provide a high frequency AC voltage to a load L. An input power sensor 11 is provided between the chopper and the voltage source Vs to monitor an input power $W_{IN}$ supplied to the chopper 1. Likewise, an output power sensor 12 is provided between the inverter 2 and the load L to monitor an output power $W_{OUT}$ being supplied from the inverter 2. A power controller 10 is connected to the sensors 11 and 12 in order to control, based upon the monitored results, the switching of the inverter and the chopper for equalizing the chopper input power $W_{IN}$ and the inverter output power $W_{OUT}$.

First embodiment <FIGS. 12 to 17>

Figure 1:
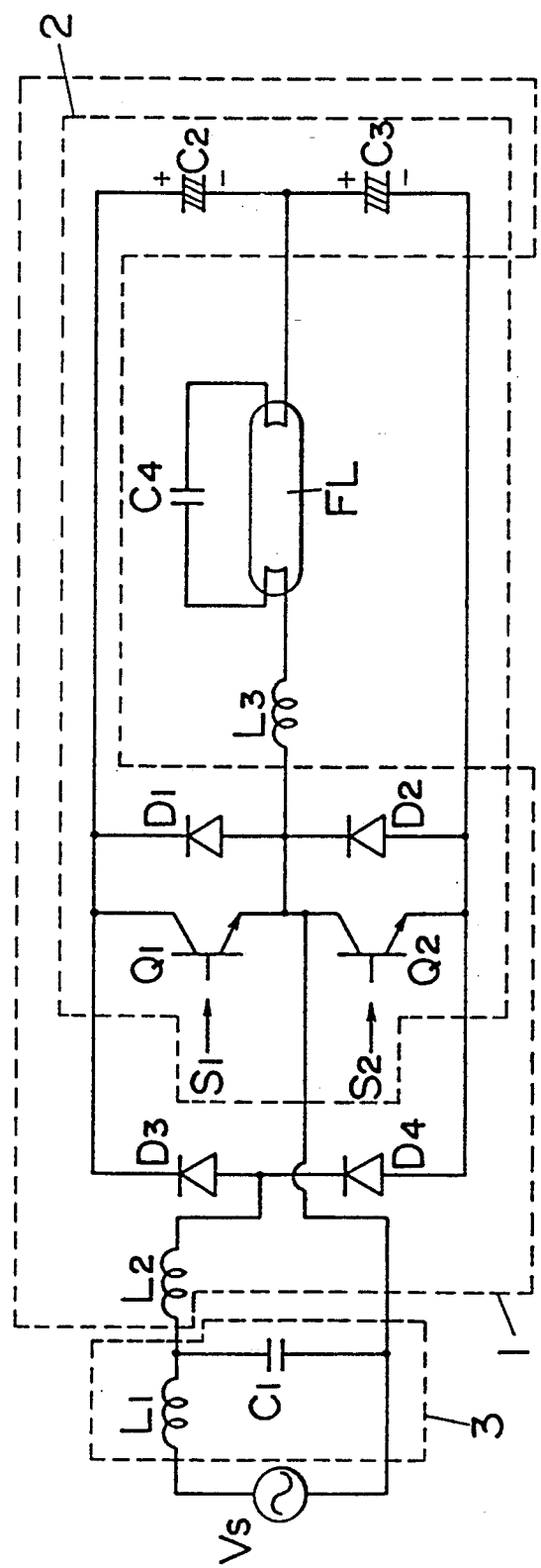
FIG. 1 is a diagram showing a basic circuit arrangement of an inverter AC power supply including a chopper and an inverter which shares two switching elements.
Figure 2:
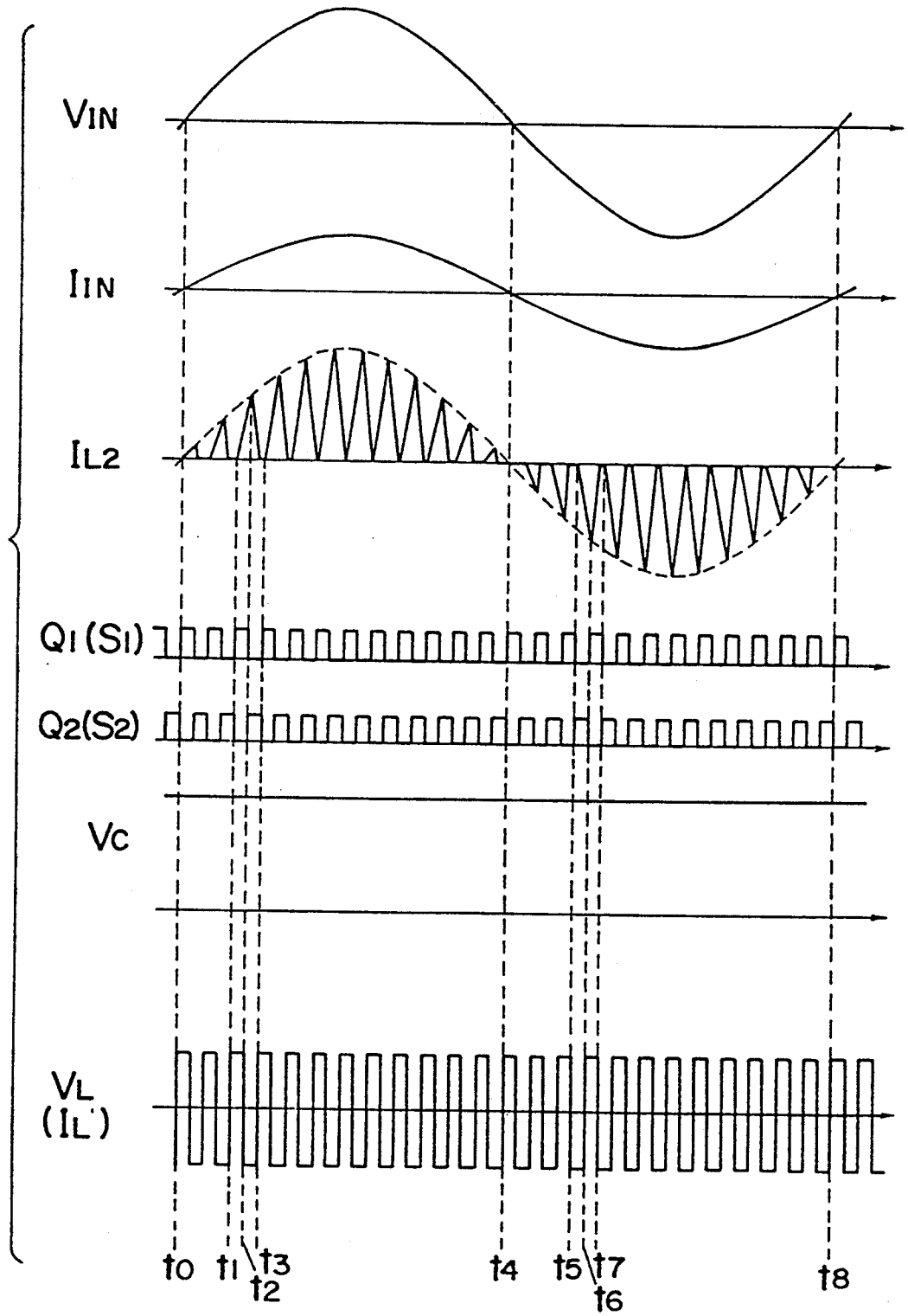
FIG. 2 is waveform chart illustrating waveforms at several points in the circuit of FIG. 1.
Figure 3A:
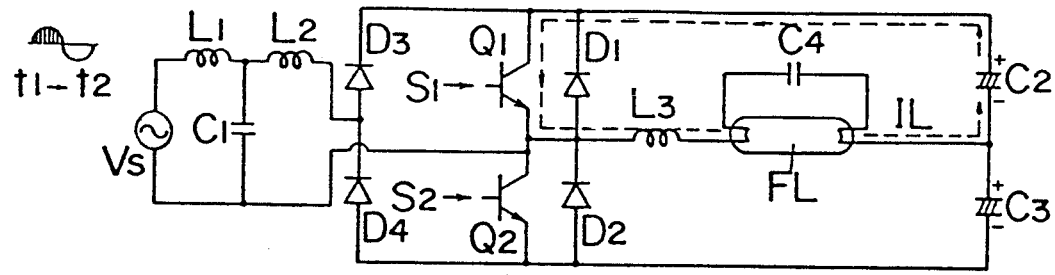
FIGS. 3A to 3D are respectively diagrams illustrating current flows in the operation of the circuit during a positive half cycle of an input AC voltage.
Figure 3B:
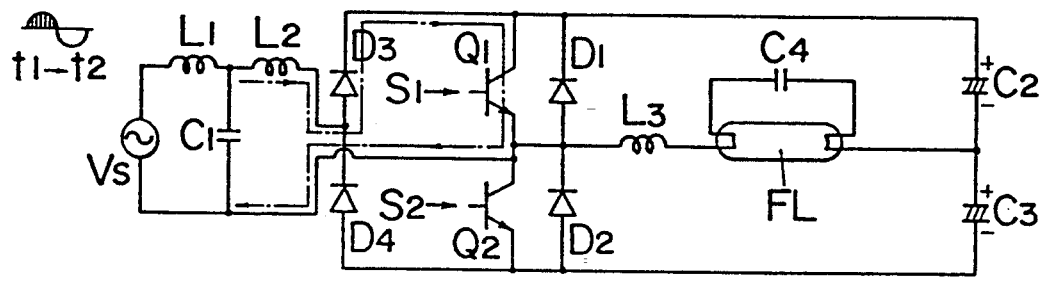
Figure 3C:
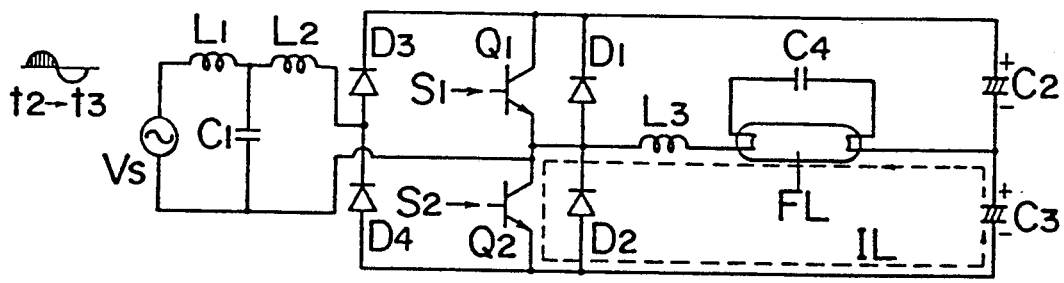
Figure 3D:
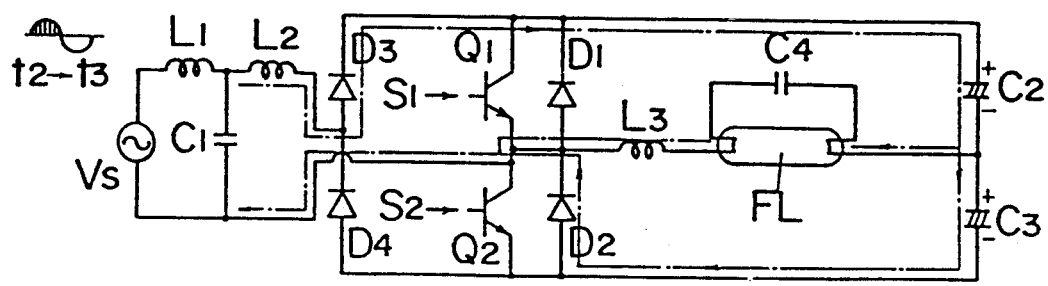
Figure 4A:
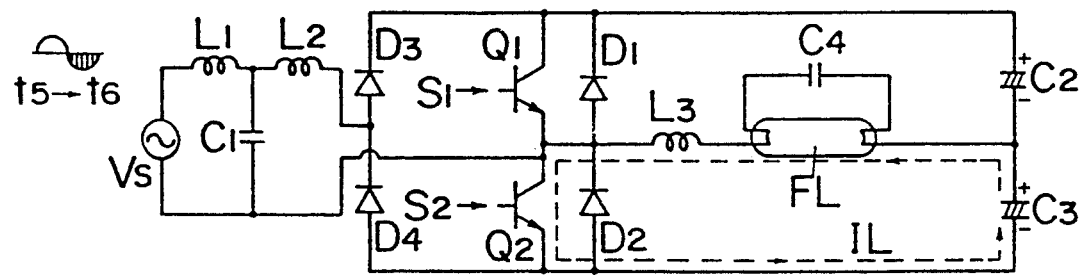
FIGS. 4A to 4D are respectively diagrams illustrating current flows in the operation of the circuit during a negative half cycle of the input AC voltage.
Figure 4B:
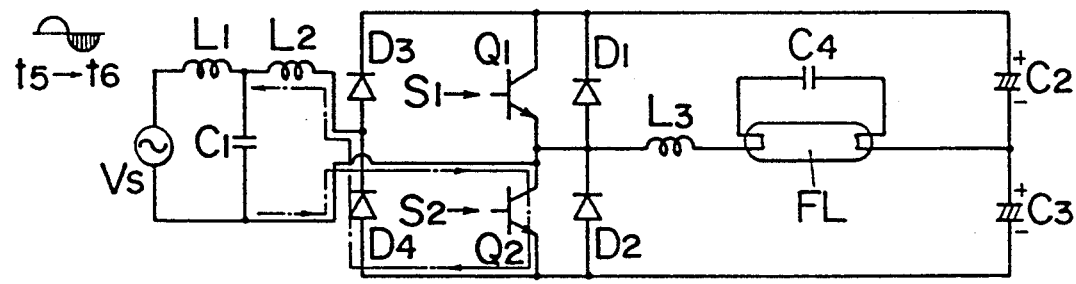
Figure 4C:
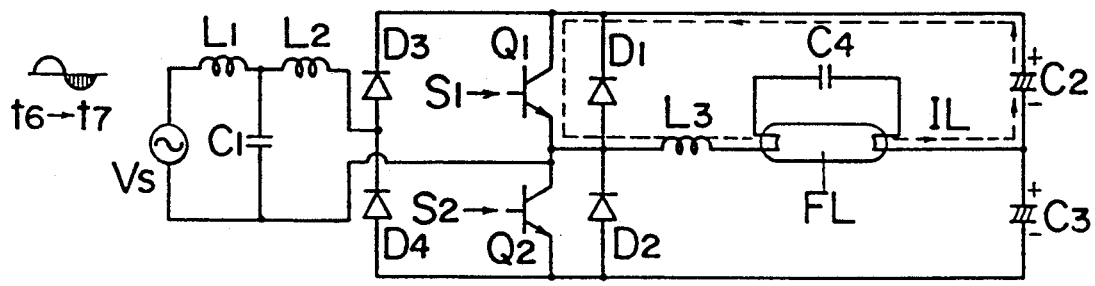
Figure 4D:
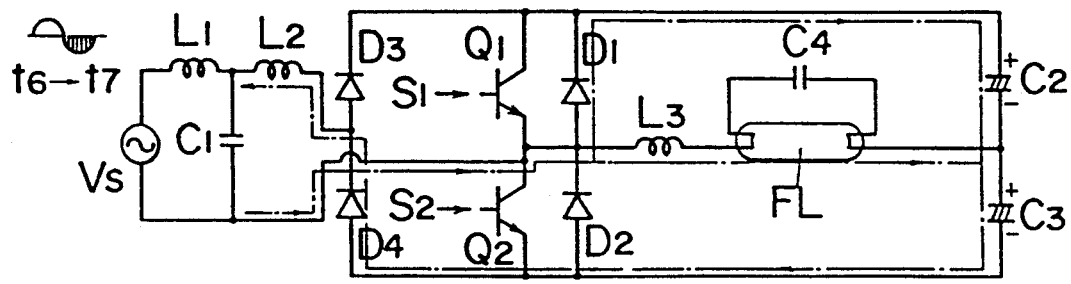
Figure 15:
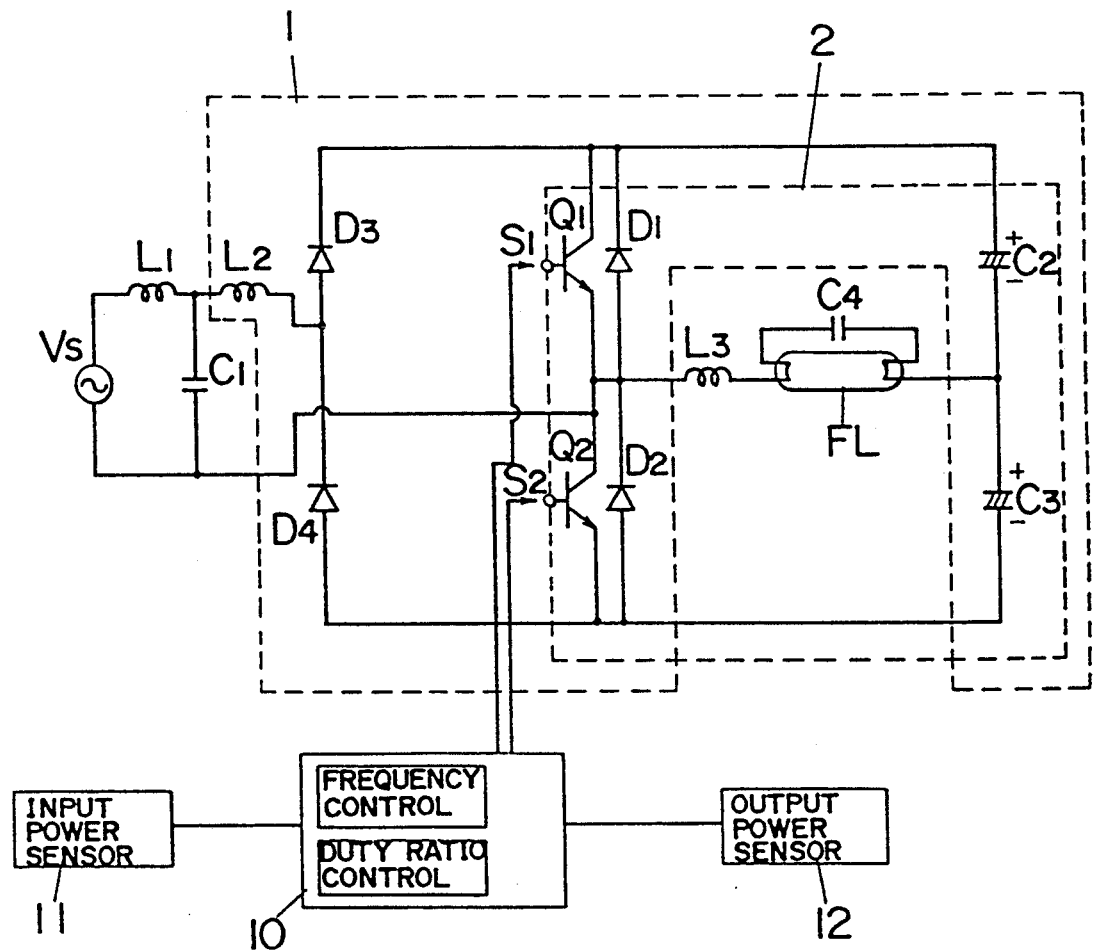
FIG. 15 is a circuit diagram illustrating an inverter AC power supply in accordance with a first preferred embodiment.

FIG. 15 shows a circuit of the power supply in accordance with a first preferred embodiment. The circuit configuration is identical except for the power controller 10 to those of FIG. 1 which is explained in the summary of the invention. The basic operation of the circuit is also identical to the circuit of FIG. 1. Therefore, no further explanation is deemed unnecessary for the basic circuit arrangement and operation. However, it appears important here to repeat the features of the circuit that:

1) An inductor $L_2$ is inserted in series with the AC voltage source VS across the rectifier input so as to counteract the captive reactance of capacitors $C_1$ and $C_2$ for improving the power factor;
2) The chopper 1 and the inverter 2 shares switching transistors $Q_1$ and $Q_2$ for effecting the chopper and the inverter operations;
3) During the positive half cycle of the input AC source voltage, $Q_1$ is responsible for both of the chopper and inverter operations, while $Q_2$ is responsible only for the inverter operation, as shown in FIGS. 3A to 3D; and
4) During the negative half cycle of the input AC source voltage, $Q_2$ is responsible for both of the chopper and inverter operations, while $Q_1$ is responsible only for the inverter operation, as shown in FIGS. 4A to 4D.

In addition, a low pass filter 3 is provided between the AC voltage source Vs and the chopper 1 in order to obtain an input current $I_{IN}$ to the power supply circuit which is free from being influenced by the high frequency switching operation and therefore can retain a continuous wave form with less distortion. In the circuit of FIG. 12, the switching elements are bipolar transistors $Q_1$ and $Q_1$ operating a frequency range around 40 KHz and the load is shown to comprise a series combination of an inductor $L_3$ and discharge lamp FL [FCL-32EX/30 by Matsushita Denshi Kogyo, Japan] with a preheating capacitor $C_4$. Capacitor $C_4$ is connected across filaments of the lamp FL to form a series resonant circuit with inductor $L_3$ for preheating the filaments at the start of energizing the lamp FL. The circuit is designed, for example, to have $L_2 = 0.95$ mH, $L_3 = 1.02$ mH, $C_2$, $C_3 = 100$ μF so as to obtain an inverter input of 260 V from the commercial AC voltage of 100 V and generate a lamp current of 350 mA when driving $Q_1$ and $Q_2$ at a switching frequency $f = 40$ KHz and at a duty ratio $D = 35\%$. The duty ratio D is determined in accordance with the above definition II-B explained previously in the summary of the invention.

For determination of the chopper input power $W_{IN}$, the input power sensor 11 may be configured, for example,
1) to multiply the input voltage by the input current;
2) to analyze and process the waveform of a current flowing into $L_2$; or
3) to process a current flowing into $Q_1$ and $Q_2$.

And, for determination of the inverter output power $W_{OUT}$, the output power sensor 12 may be configured, for example,
1) to multiply a load current flowing to the load and a load voltage developed across the load;
2) to calculate only from the load current;
3) to calculate only from the load voltage; or
4) a current flowing into $Q_1$ and $Q_2$.

In any case, it is required to determine $W_{IN}$ and $W_{OUT}$ averaged over at least one complete cycle of the input AC voltage. Operation of the power controller 10 will be now discussed with regard to the following operating conditions where undesirable unbalancing of $W_{IN}$ and $W_{OUT}$ takes place.

I. Light intensity control [Dimmer control]

Raising light intensity

Figures 5A, 5B:
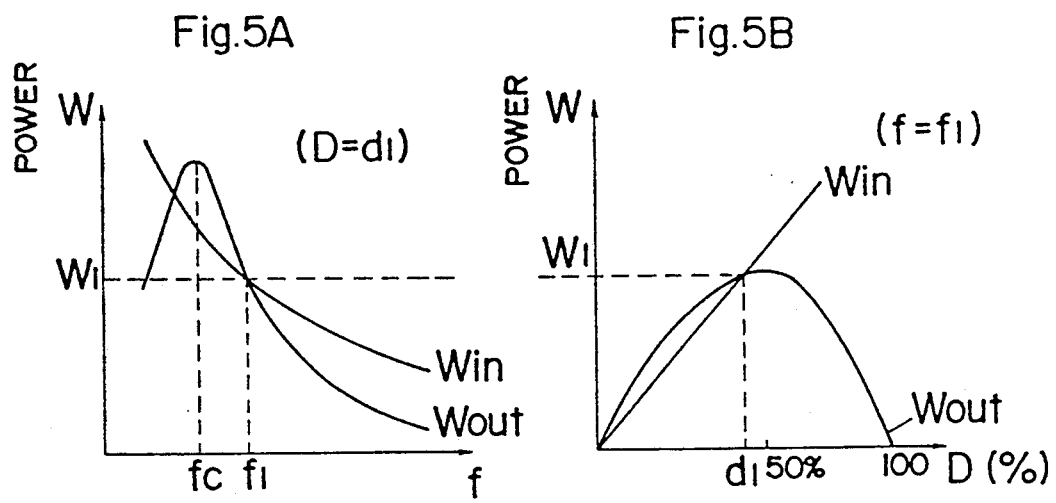
FIG. 5A and 5B are graphs respectively illustrating an ideal relation between $W_{IN}$ and $W_{OUT}$ with respect to switching frequency and duty ratio D.
Figures 6A, 6B:
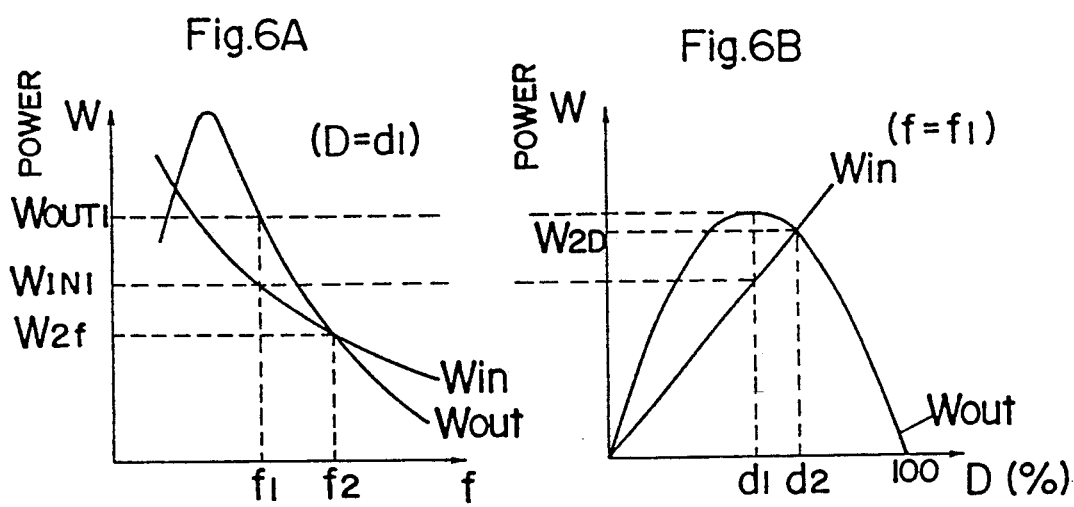
FIG. 6A and 6B are graphs respectively illustrating an unbalanced relation between $W_{IN}$ and $W_{OUT}$ with respect to switching frequency f and duty ratio D.

Starting from a balanced condition $W_{IN} = W_{OUT}$ at initially selected frequency f ($= f_0$) and duty ratio $D = D_0$, as shown in FIGS. 5A and 5B, when the switching frequency f is decreased so as to correspondingly increase the light intensity or $W_{OUT}$, there occurs an unbalanced condition $W_{OUT} > W_{IN}$ since $W_{OUT}$ shows a gradient greater than $W_{IN}$ with the frequency decrease in an operational range from $f_0$, as shown in FIG. 6A, where the switching frequency is shown as decreased from $f_0$ to $f_1$. Upon occurrence of this unbalanced condition, the power controller 10 responds immediately to control $Q_1$ and $Q_2$ to reestablish a balanced condition $W_{IN} = W_{OUT}$ while keeping $W_{OUT}$ fixed at the raised level, in accordance with the control mode [B] discussed previously with reference to FIGS. 11A and 11B. That is, the control is made by firstly increasing the duty ratio D $[d_1 \rightarrow d_3]$ and then slightly decreasing the switching frequency f $[f_1 \rightarrow f_3]$.

Lowering light intensity

Figures 7A, 7B:
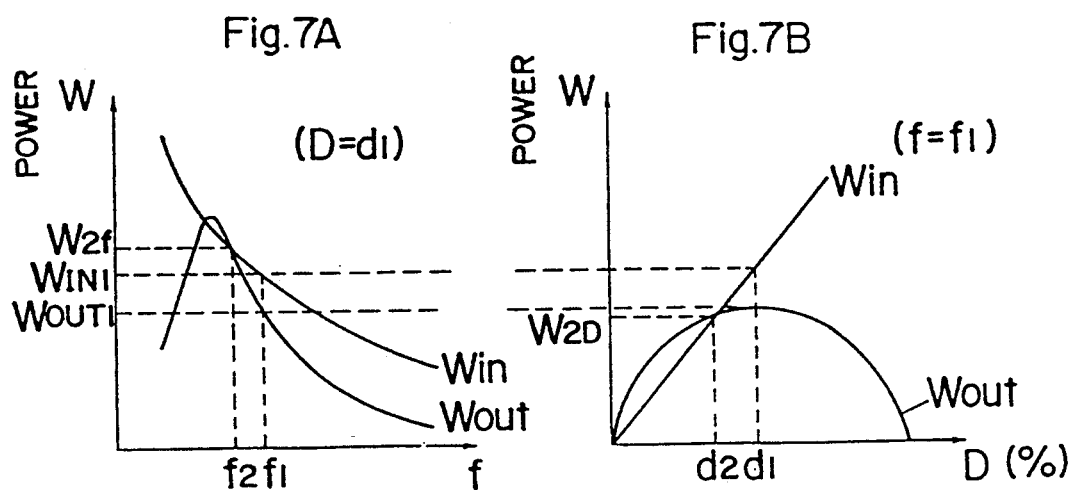
FIG. 7A and 7B are graphs respectively illustrating another unbalanced relation between $W_{IN}$ and $W_{OUT}$ with respect to switching frequency f and duty ratio D.
Figure 8:
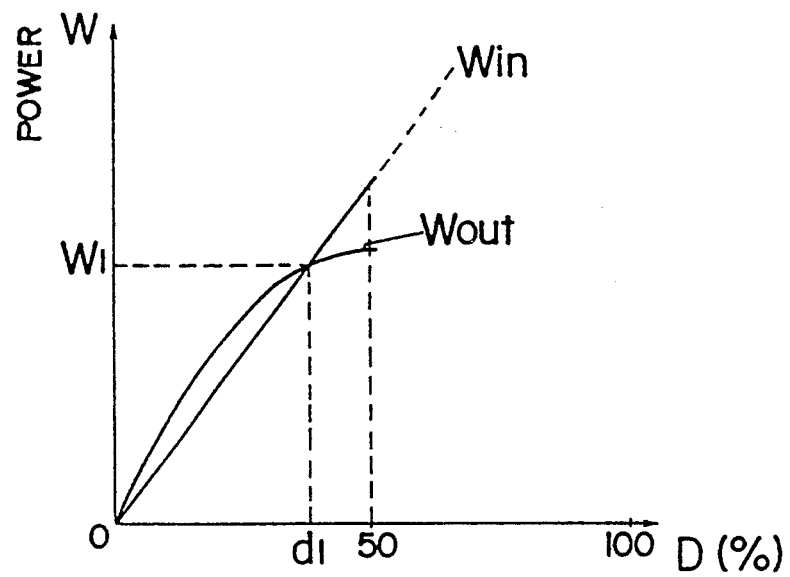
FIG. 8 is a graphical representation between the chopper input power $W_{IN}$ and the inverter output power $W_{OUT}$ with respect to a duty ratio D of the switching element.
Figure 9A:
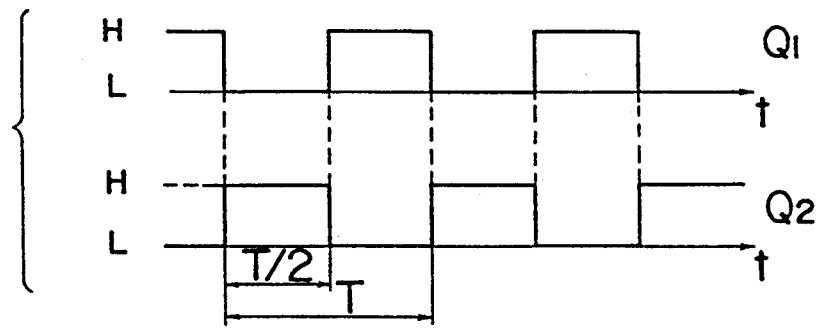
FIGS. 9A and 9B are charts illustrating waveforms for driving two switching elements in complimentary relation.
Figure 9B:
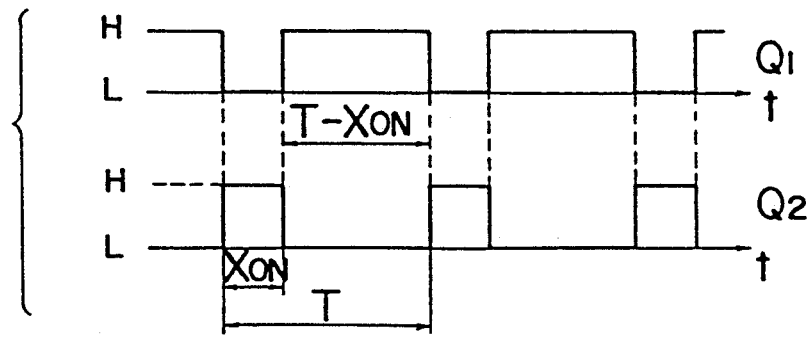

When, on the other hand, the switching frequency f is increased in order to correspondingly lower the light intensity or $W_{OUT}$ from the above starting condition of FIGS. 5A and 5B, there occurs another unbalanced condition $W_{IN} > W_{OUT}$ since $W_{IN}$ shows a gradient greater than $W_{IN}$ with the frequency increase in an operational range from $f_0$, as shown in FIG. 7A, where the switching frequency is shown as increased from $f_0$ to $f_1$. Upon occurrence of this unbalanced condition, the power controller 10 responds immediately to control $Q_1$ and $Q_2$ to reestablish a balanced condition $W_{IN} = W_{OUT}$ while keeping $W_{OUT}$ fixed at the lowered level, in accordance with the control mode [D] discussed previously with reference to FIGS. 13A and 13B. That is, the control is made by firstly decreasing the duty ratio D $[d_1 - d_3]$ and then slightly decreasing the switching frequency f $[f_1 - f_3]$.

Figure 16:
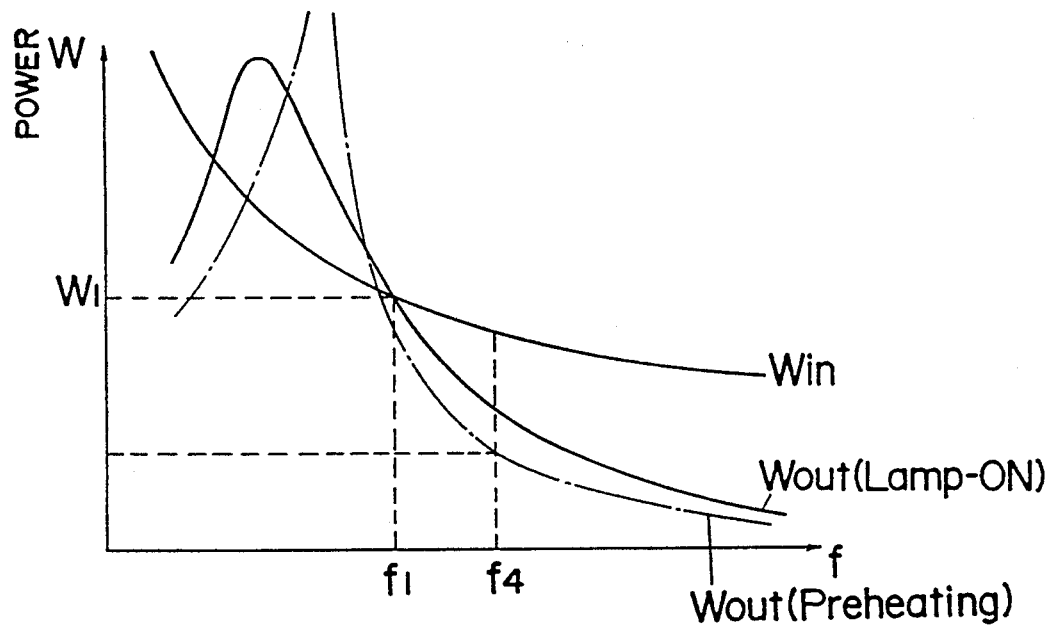
FIG. 16 is a graph illustrating a relation between $W_{IN}$ and $W_{OUT}$ at a lamp-on mode and at a lamp preheating mode.

II. Differing lamp operating modes $W_{IN}$ and $W_{OUT}$ set balanced at a lamp-on mode For the power supply which is designed to have $W_{IN} = W_{OUT}$ at a certain frequency $f_1$ so as to provide a maintaining voltage for keeping the lamp on, as shown in FIG. 16, it is required at the start of igniting the lamp to drive $Q_1$ and $Q_2$ at a higher frequency $f_4$ in order to allow capacitor $C_4$ to pass a preheating current through lamp filaments from the inverter output for preheating the filaments. After the filaments are sufficiently heated, then the switching frequency is lowered to $f_1$ to develop a high voltage (gas breakdown voltage) across capacitor $C_4$, thereby turning on the lamp. As apparent from FIG. 16, at the time of preheating the filament with an increased switching frequency $f_4$, $W_{OUT}$ sees a greater change than $W_{IN}$ thus causing an unbalanced condition $W_{IN} > W_{OUT}$. When such condition continues to consume a greater $W_{IN}$ at the chopper than $W_{OUT}$ at the inverter output, an unduly high voltage will develop at capacitor $C_2$ and $C_3$ and eventually break them. To avoid or compensate for this unbalanced condition at the preheating frequency $f_4$, the power controller 10 responds immediately to control $Q_1$ and $Q_2$ to have $W_{IN} = W_{OUT}$ while keeping $W_{OUT}$ fixed at the lowered level, in accordance with the control mode [D] discussed previously with reference to FIGS. 13A and 13B.

$W_{IN}$ and $W_{OUT}$ set balanced at a preheating mode

On the contrary, when the power supply which is designed to have $W_{IN} = W_{OUT}$ at a preheating frequency $f_4$, it will cave an unbalanced condition $W_{IN} < W_{OUT}$ in a normal lamp-on operation at a switching frequency $f_1$ ($< f_4$). To reestablish the balanced condition $W_{IN} = W_{OUT}$, the control is made at the power controller 10 to increase $W_{IN}$ without substantially changing $W_{OUT}$ in accordance with the control mode [B] discussed previously with reference to FIGS. 11A and 11B.

III AC source voltage variations or fluctuations

Raising in AC source voltage

Figure 11B:
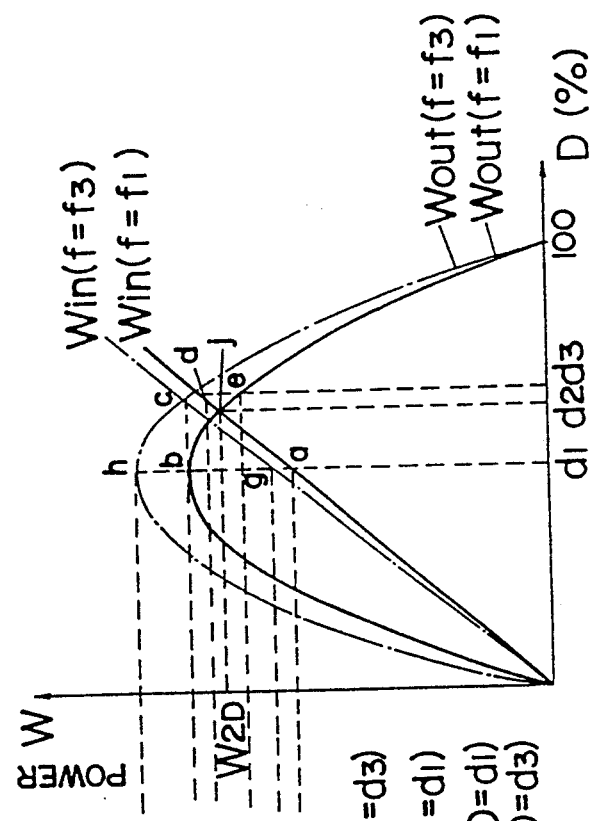
Figure 11A:
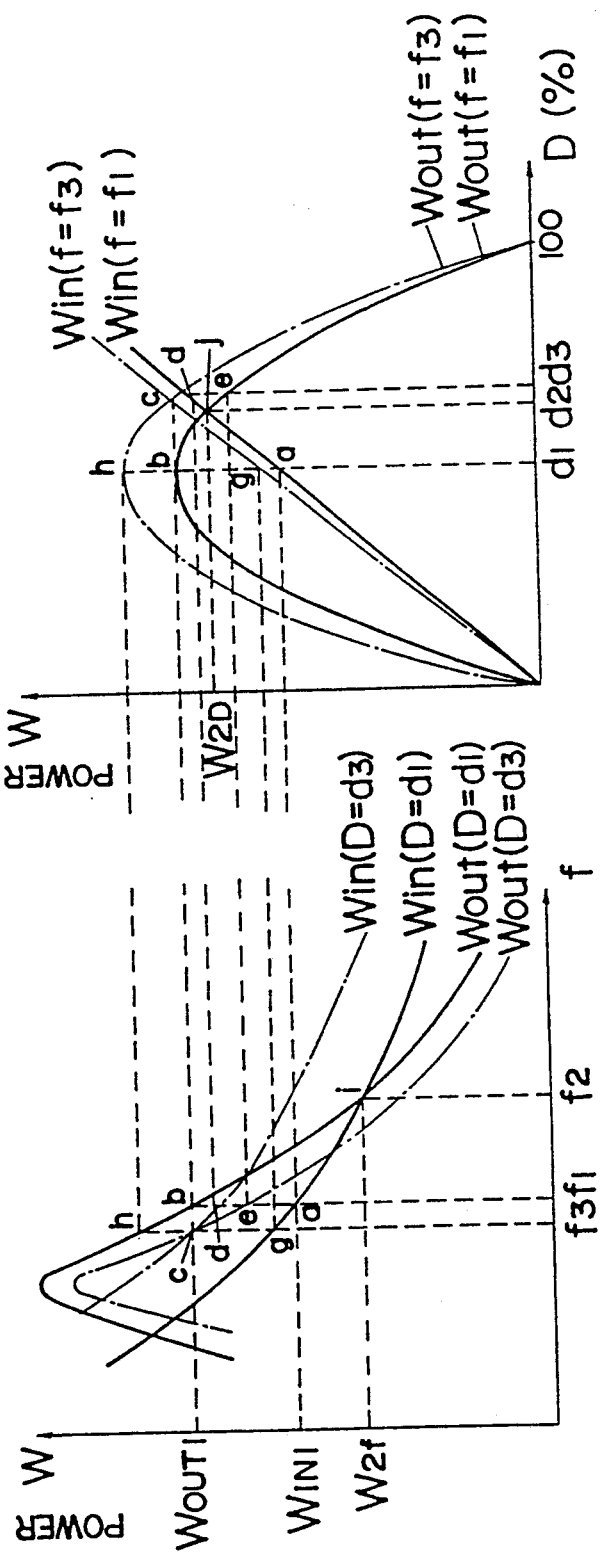

When by some reason the AC source voltage is raised from a rated voltage to cause an unbalanced condition $W_{IN} > W_{OUT}$ at the selected frequency $f_1$ and $D_1$, the power controller 10 operates, in accordance with the above control mode [B] of FIGS. 11A and 11B, to compensate for such variation, thus obtaining the balanced condition $W_{IN} = W_{OUT}$ without keeping $W_{OUT}$ substantially at a desired level.

Lowering in AC source voltage

Figure 13A:
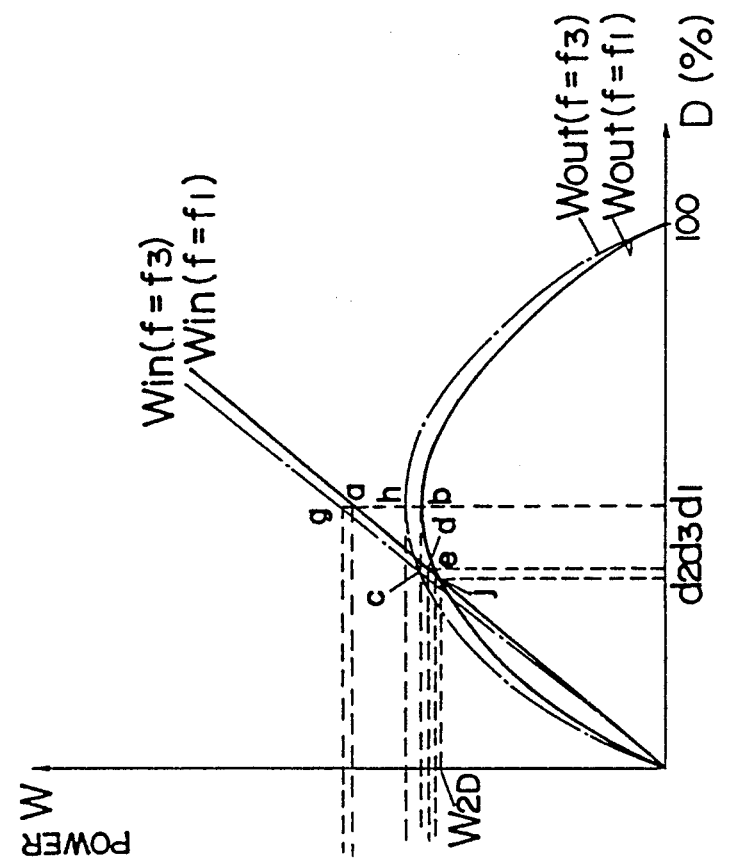
Figure 13B:
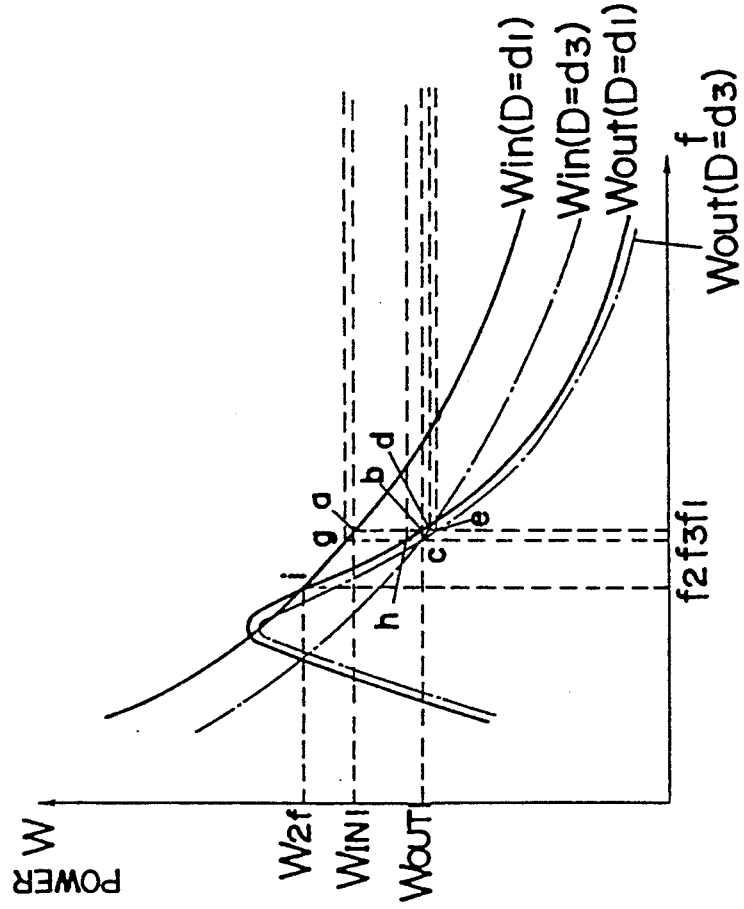

When, on the other hand, the AC source voltage is lowered from a rated voltage to cause an unbalanced condition $W_{IN} < W_{OUT}$ at the selected frequency $f_1$ and $D_1$, the power controller 10 operates, in accordance with the above control mode [D] of FIGS. 13A and 13B, to compensate for such variation, thus obtaining the balanced condition $W_{IN} = W_{OUT}$ without keeping $W_{OUT}$ substantially at a desired level.

IV Load variations

Figure 17:
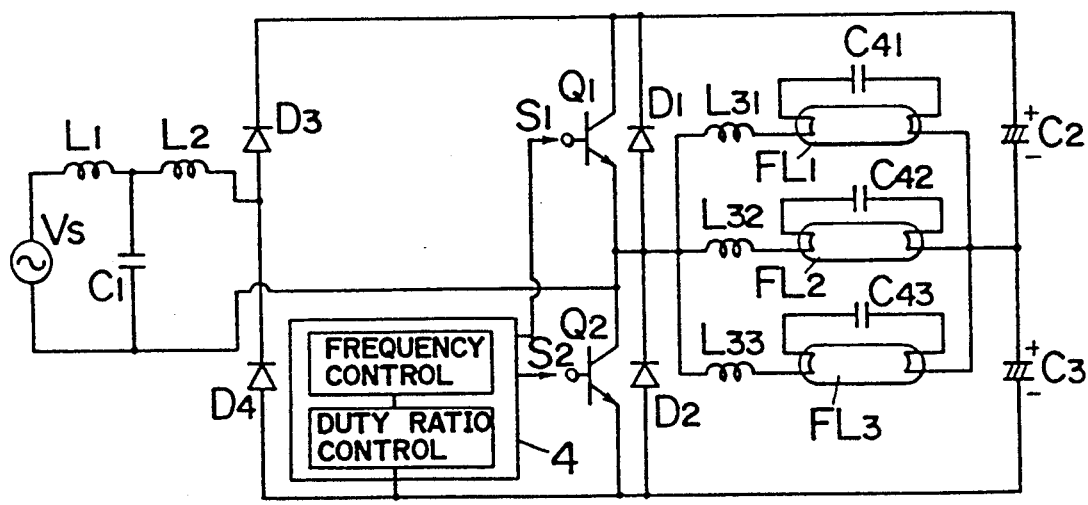
FIG. 17 is a circuit diagram illustrating the above power supply when utilized as a multi-lamp driving device.

When the power supply is utilized to drive a number of parallel coupled lamps $FL_1$ to $FL_3$, as shown in FIG. 17, $W_{IN}$ may vary depending upon the load conditions. For instance, when any one of the lamps becomes extinct due to filament breakage or lamp disconnection, the inverter output $W_{OUT}$ will be correspondingly decreased while the chopper input is still maintained at a constant $W_{IN}$ determined at selected frequency $f_1$ and duty ratio $D_1$, leading to an unbalanced condition $W_{IN} > W_{OUT}$ which would give unduly high voltage stress to capacitor $C_2$ and $C_3$, switching transistors $Q_1$ and $Q_2$. That is, with the illustrated load configuration having individual resonant circuits for the fluorescent lamps $FL_1$ to $FL_3$, even when one of the lamps $FL_1$ to $FL_3$ become extinct, the output power of the other two lamps are kept substantially unchanged so that the inverter output power $W_{OUT}$ is reduced to two-thirds (⅔) of the initial power. For the multi-lamp driving operation, it is in most cases required to keep the overall output power constant even when one of the lamps becomes extinct. Therefore, it is preferred to reestablish the balanced condition $W_{IN} = W_{OUT}$ without causing substantial change in $W_{OUT}$. Such control can be successfully made at the power controller 10 in accordance with the above control mode [D] of FIGS. 13A and 13B.

Although, in the above embodiment, the control is made by constantly monitoring $W_{IN}$ and $W_{OUT}$ by obtaining input and output currents or voltages, it is equally possible to monitor harmonics superimposed in the input current as a parameter representative of the relation between $W_{IN}$ and $W_{OUT}$ and to control to keep the monitored harmonic level below a suitable threshold for maintaining the relation $W_{IN}$ and $W_{OUT}$.

Second embodiment <FIGS. 18 to 27>

Figure 18:
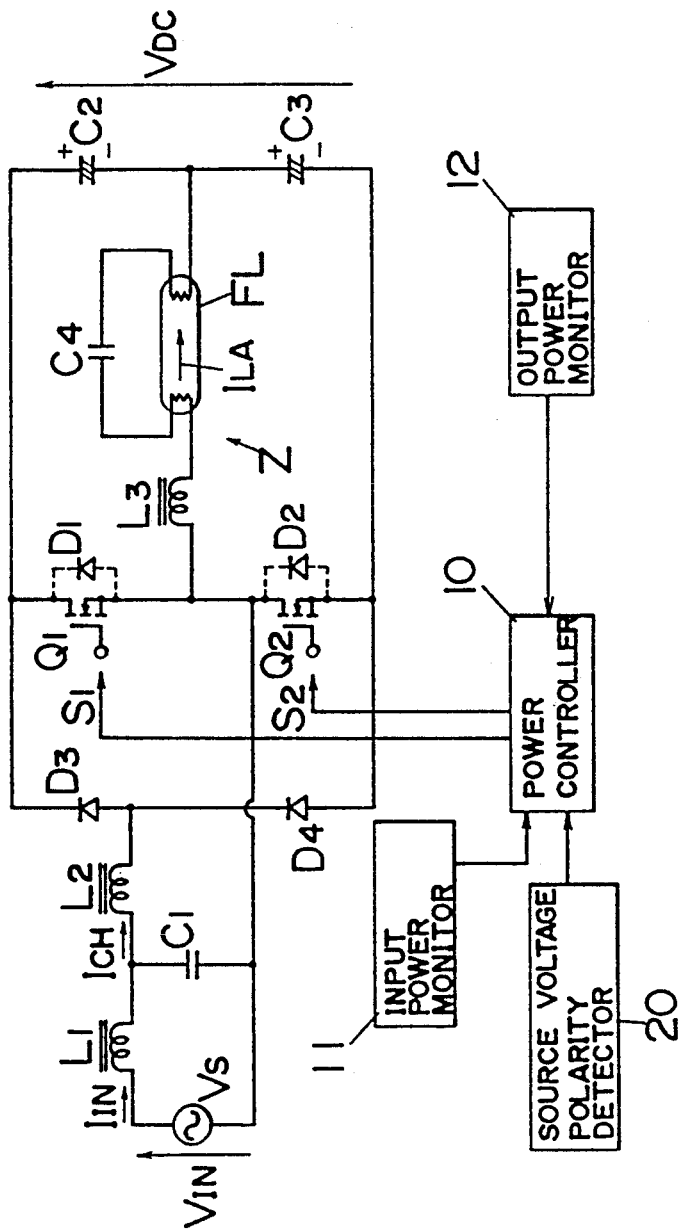
FIG. 18 is a circuit diagram illustrating a power supply in accordance with a second embodiment of the present invention.

Referring to FIG. 18, a power supply in accordance with a second embodiment of the present is shown to additionally include a source voltage polarity detector 20 which provides an output indicating of the polarity of the AC source voltage Vs to the power controller 10. The source voltage polarity detector is also applicable to the structure of all the embodiments of the present invention. The other circuit arrangement is identical to the above first embodiment except that MOSFET (Metal Oxide Semiconductor Field Effect Transistor) is utilized as first and second switching transistors $Q_1$ and $Q_2$. In this circuit, parasitic diodes intrinsic to MOSFETs are best utilized to form the first and second diode $D_1$ and $D_2$ for reducing the number of components of the circuit.

Figure 19:
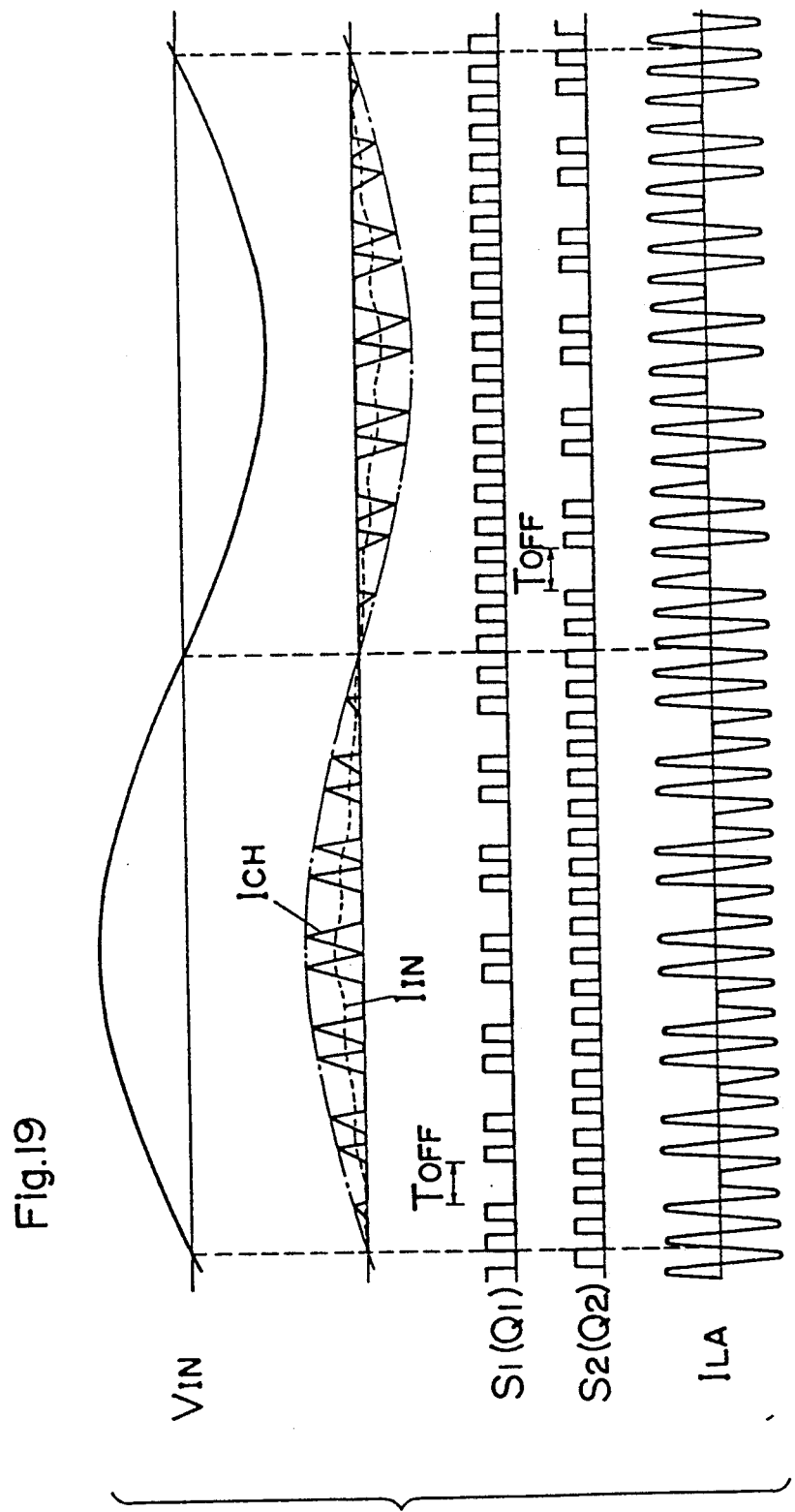
FIG. 19 is a waveform chart illustrating the operation of the circuit of FIG. 18.

This embodiment is contemplated to regulate the chopper input power $W_{IN}$ over a relatively wide range while causing less influence on the inverter output power $W_{OUT}$ by ceasing the chopper operation for a suitable time period while substantially keeping the inverter operation. In other words, one of the switching transistors $Q_1$ and $Q_2$ which is responsible for the chopper operation is periodically ceased or kept turned off while the other switching transistor is being kept to turn on and off. As previously discussed with reference to FIGS. 3 and 4, it is known that $Q_1$ is responsible for the chopper operation and $Q_2$ is responsible for the inverter operation during the positive half cycle of the AC source voltage Vs, and vice versa during the negative half cycle of the AC source voltage Vs. In this manner, the switching element responsible for the chopper operation will change between $Q_1$ and $Q_2$ in exact synchronism with the polarity reversal of the AC source voltage and therefore can be identified by the output of the polarity detector 20. Therefore, the power controller 10 can control to disabling one of the switching transistors $Q_1$ and $Q_2$ thus identified to be responsible for the chopper operation. As shown in FIG. 19, $Q_1$ and $Q_2$ are controlled to intermittently disabled for a suitable time interval in order to reduce $W_{IN}$ to a desired extent while keeping the resulting variation in the inverter output power $W_{OUT}$ at a minimum. That is, when $Q_1$ is disabled, for example, during the positive half cycle of the AC source voltage Vs, the inverter output current $I_{LA}$ is also ceased due to the fact that $Q_1$ is also responsible for the inverter operation. However, at this occurrence, $Q_2$ is still operating to effect the inverter operation such that the instantaneous inverter output power is reduced to one half only temporarily during the limited short interval where $Q_1$ is off, and therefore $W_{IN}$ can see only a less reduction over the half cycle of the AC source voltage Vs. In FIG. 19, $I_{CN}$ and $I_{IN}$ represent a chopped current and an input current to the chopper, respectively. Accordingly, it is found effective to use this control for compensation of the unbalanced condition $W_{IN} > W_{OUT}$ with less attendant variation in $W_{OUT}$. For example, this control is found particularly suitable to compensate for the unbalanced condition $W_{IN} > W_{OUT}$ which occurs at the time of lowering the light intensity, as described with reference to the first embodiment. That is, by intermittently ceasing the chopper operation for a suitable off time interval Torr within each half cycle of the input AC source voltage Vs, as shown in FIG. 19, the chopper input power $W_{IN}$ can be reduced to reestablish the balanced condition $W_{IN} = W_{OUT}$ also at the increased switching frequency without substantially causing the variation in $W_{OUT}$. It is noted at this time that, as shown in FIG. 19, when the off time interval $T_{OFF}$ are set to be evenly distributed over each half cycle of the input AC source voltage Vs, it is possible to obtain an input current $I_{IN}$ having a waveform analogous to that of the input voltage Vs, thereby reducing harmonics as much as possible and therefore maintaining an improved power factor. Although $W_{IN}$ can be controlled over a wide range by suitably varying the off time interval for ceasing the chopper operation, the off time interval should be selected in association with the design of the low pass filter 3 in order to avoid remarkable harmonics superposed in the input current which would otherwise lower the power factor.

Further, when the above control is combined with the previously mentioned frequency control having inherent characteristic of obtaining a greater change in $W_{OUT}$ with less change in $W_{IN}$, it is possible to vary the $W_{IN}$ and $W_{OUT}$ substantially independently, enabling a delicate control for equalizing $W_{IN}$ and $W_{OUT}$.

Figure 20:
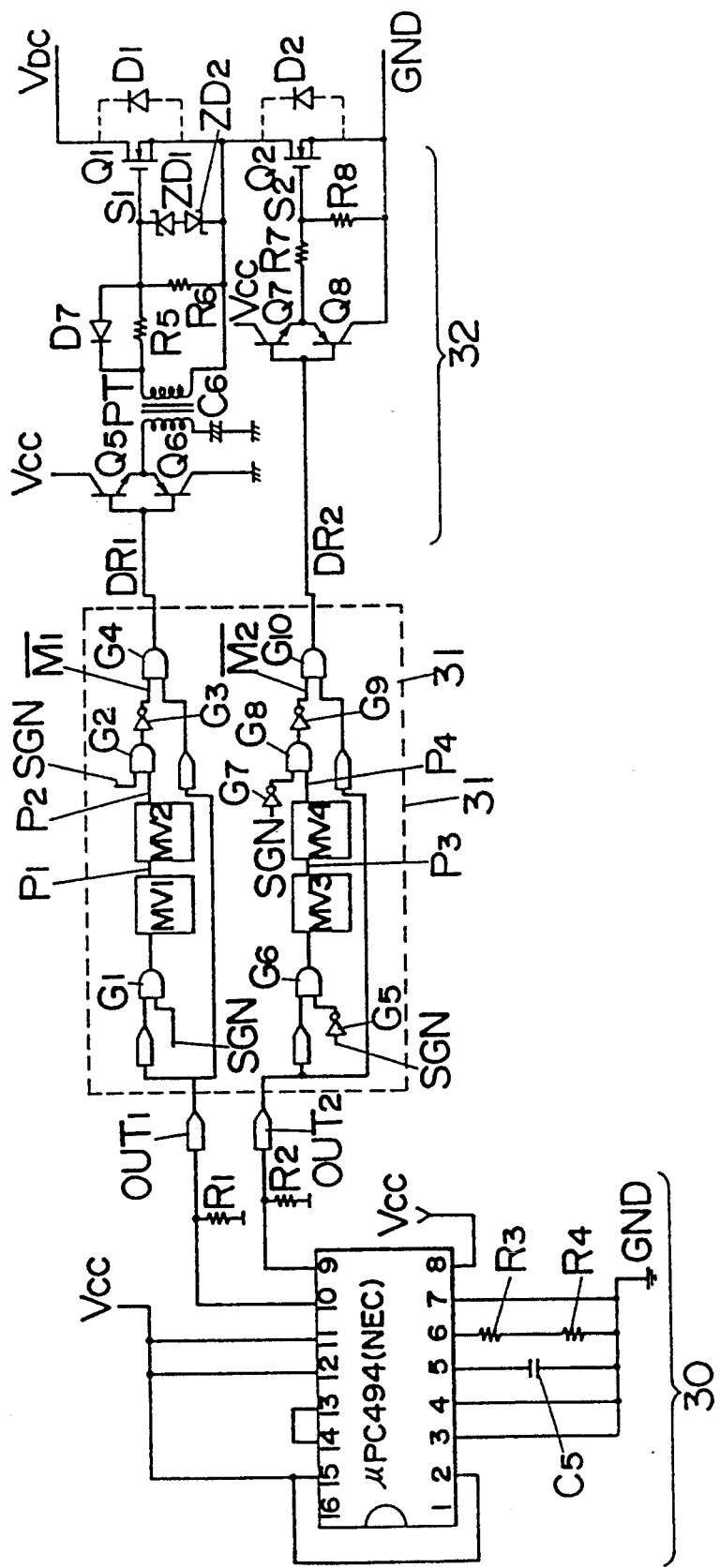
FIG. 20 is a circuit diagram illustrating a portion of a power controller forming the circuit of FIG. 18.
Figure 21:
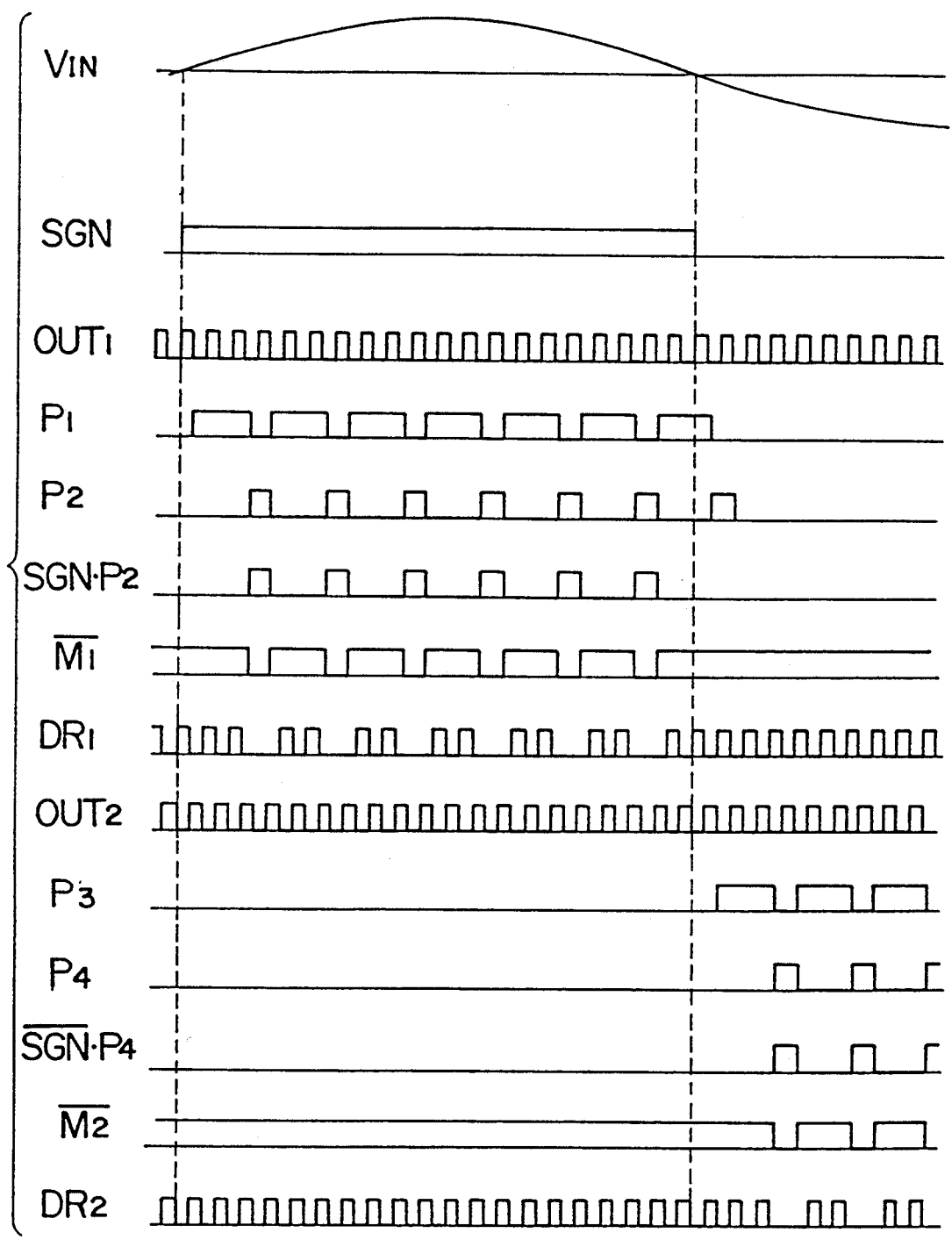
FIG. 21 is a waveform chart illustrating the circuit operation of FIG. 20.

FIG. 20 shows a circuit which form a portion of the power controller 10 to effect the above control of intermittently ceasing the chopper operation. The circuit includes an oscillator 30, a calibrator 31, and a switch generating first and second oscillatory outputs $OUT_1$ and OUT$_2$, as shown in FIG. 21, which are fed to the calibrator 32 together with a polarity signal SGN issued from the above souce voltage polarity detector 20. The first oscillatory output OUT$_1$ and the polarity signal SGN are input through an AND-gate G$_1$ to a mono-stable multivibrator MV$_1$ such that MV$_1$ is triggered to produce a signal P$_1$ at a trailing edge of the first oscillatory output OUT$_1$ when SGN is high or the input AC voltage Vs is positive. The signal P$_1$, which is set to have a predetermined width normally several times greater than that of the switching cycle, is then fed to a mono-stable multivibrator MV$_2$ to trigger the same for producing a signal P$_2$ having the pulse width greater than that of OUT$_1$. The signal P$_2$ is fed together with the polarity signal SGN to an AND-gate G$_2$ of which output is inverted at a NOT gate G$_3$ and is then fed to an AND-gate G$_4$ together with the first oscillatory signal OUT$_1$ so that AND-gate G$_4$ provides a driving signal DR$_1$ for driving the switching transistor Q$_1$. In this manner, during the positive half cycle of Vs, multivibrator MV$_2$ generates at a regular interval determined by multivibrator MV$_1$ the signal P$_2$ which negates a portion of the first oscillatory output OUT$_1$ at that interval for obtaining a resulting first drive signal DR$_1$, thus enabling to periodically cease the chopper operation. While, on the other hand, during the negative half cycle of the input AC sauce voltage Vs, the polarity signal SGN is inverted at NOT gates G$_5$ and G$_7$, respectively and is fed together with the second oscillatory output OUT$_2$ to the like logic circuit so as to trigger a mono-stable multivibrator MV$_4$ at a regular interval determined by a mono-stable multivibrator M$_3$ for generating a signal P$_4$ which negates the second oscillatory output OUT$_2$ and providing through an AND gate G$_{10}$ a second drive signal DR$_2$ for driving the switching transistor Q$_2$, thus enabling to periodically cease the chopper operation during the negative half cycle.

Figure 22:
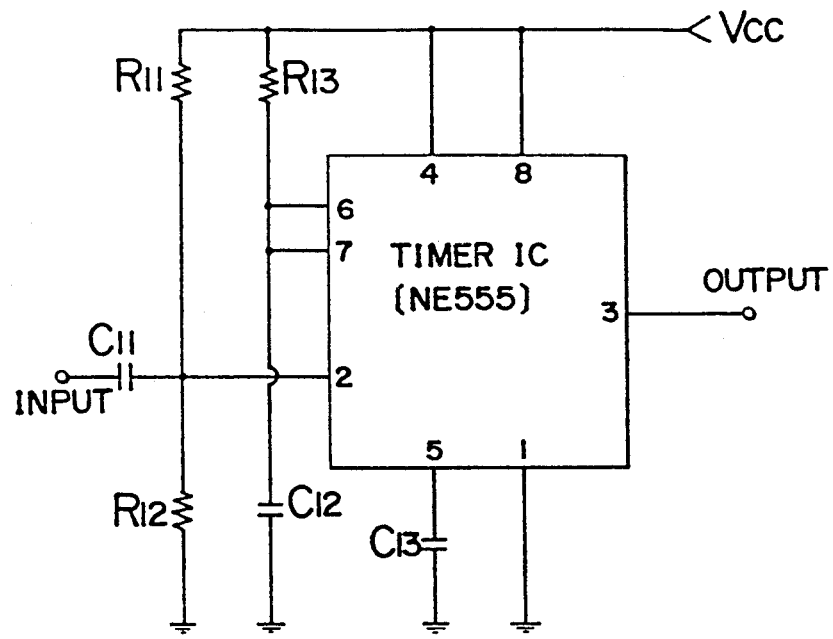
FIG. 22 is a diagram of a mono-stable multivibrator utilized in the circuit of FIG. 20.
Figure 23A:
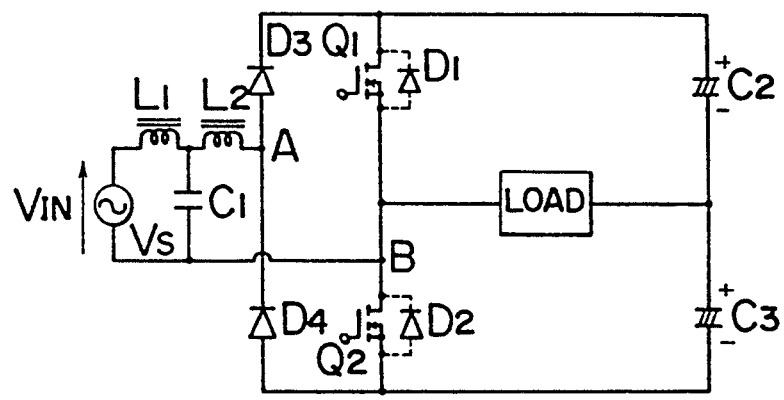
FIGS. 23A to 23D illustrate various power supply circuit arrangements which may be included in the present invention.
Figure 23B:
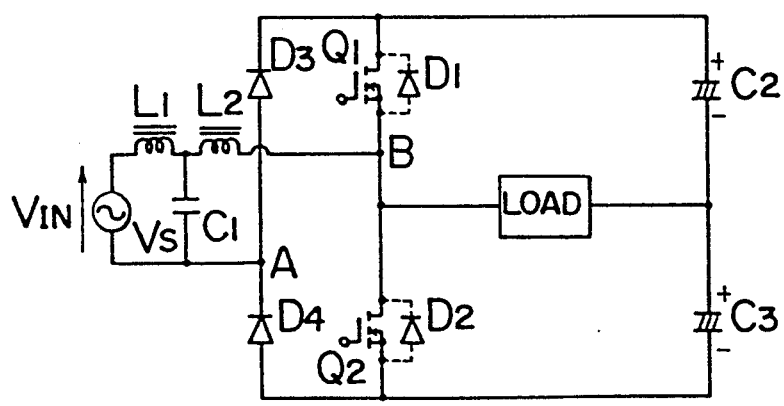
Figure 23C:
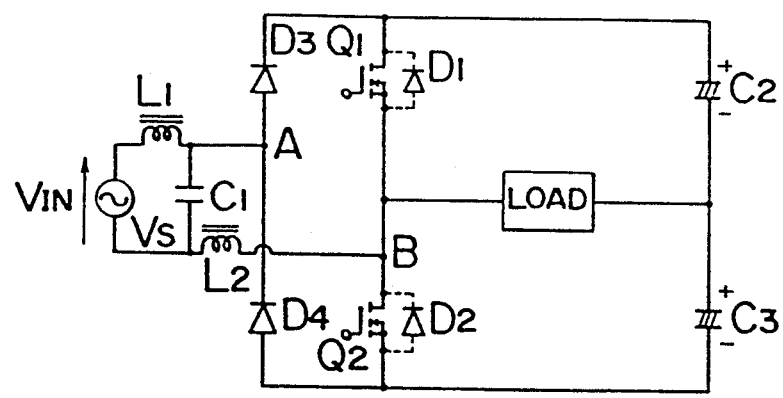
Figure 23D:
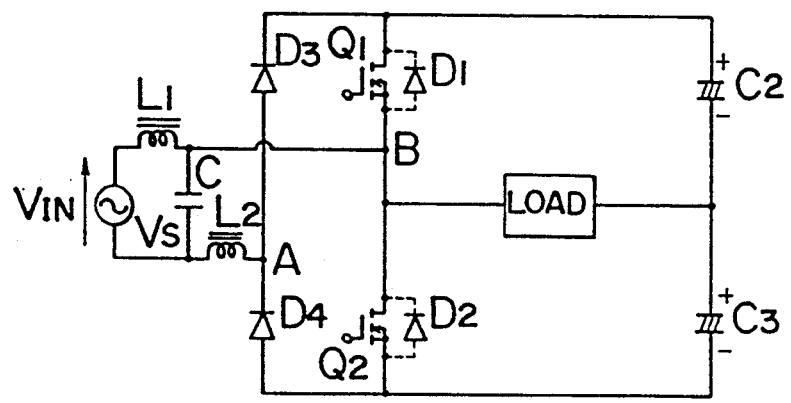

FIG. 22 shows a circuit diagram which is common to the multivibrators MV$_1$ to MV$_4$ utilized in the above logic. A timer IC [NE555, by Signetics] is included to receive an input at a trigger terminal [pin no.2] through a differential circuit of resistors R$_{11}$ and R$_{12}$ and capacitor C$_{11}$ such that the trigger terminal [pine no. 2] sees a voltage decrease as the input decrease. When the voltage at the trigger terminal is decreased below $\frac{1}{3}$ of a control voltage vcc applied between an power terminal [pin no.8] and a ground terminal [pin no.1], an output terminal [pine no.3] is trigger to provide a High-level signal and at the same time to make a discharge terminal [pin no.7] into a high impedance state. Also, when a threshold terminal [pin no.6] sees a voltage decrease down to below $\frac{2}{3}$ of Vcc, the power terminal [pin no.3] provides a Low-level signal and at the same time the discharge terminal [pin no.7] goes "High". A reset terminal [pin no.4] is connected to the power terminal [pin no.8] and a frequency control terminal [pin no.5] is connected to the ground terminal [pin no.1] through a decoupling capacitor C$_{13}$. The control voltage Vcc is applied to a series circuit of a resistor R$_{13}$ and a capacitor C$_{12}$ which is coupled to the threshold terminal [pin no.6] and to the discharge terminal [pin no.7] at the connection between R$_{13}$ and C$_{12}$ and forms a time constant circuit for the timer IC, thus operating the timer IC as the mono-stable multivibrator. That is, when the trigger terminal [pin no.2] goes "Low-level", the output terminal [pin no.3] is triggered to provide "High-level" signal for a time period determined by C$_{12}$ and R$_{13}$ or until a voltage at the threshold terminal [pin no.6] is dropped to a threshold voltage ($=\frac{2}{3}$ Vcc), during which period the High-level signal at the output terminal is maintained until a voltage at capacitor C$_{12}$ reaches the threshold voltage even when the input terminal (pin no.2) see a voltage change. It is noted at this time that a time constant of C$_{12}$ and R$_{13}$ is set to be greater for the multivibrators MV$_1$ and M$_3$ than for MV$_2$ and MV$_4$ so as to obtain the output signals P$_1$ to P$_4$ of differing pulse widths, as seen in FIG. 21.

Figure 24:
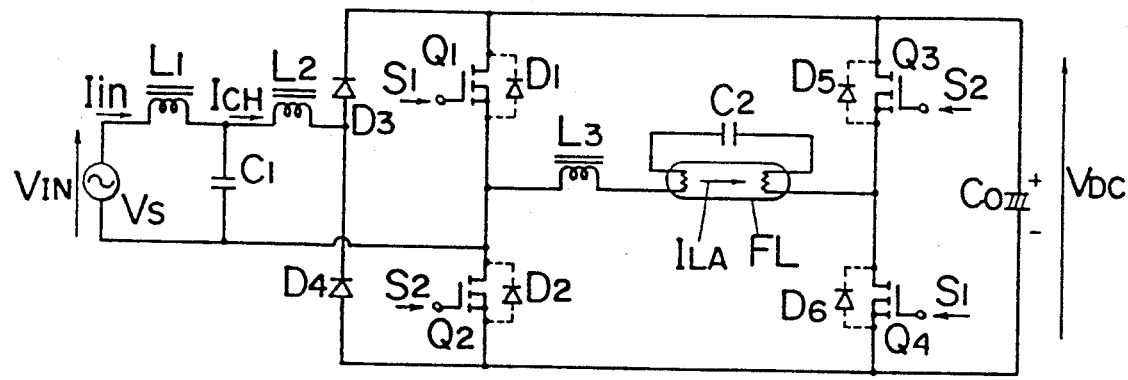
FIG. 24 illustrate another power circuit which may be included in the present invention.

Although the above control scheme of intermittently ceasing the chopper operation is described with reference to the chopper-and-inverter circuit of FIG. 18, it is of course applicable to like circuits, as illustrated in FIGS. 23A to 23D, which have different connection points [A] and [B] between the chopper and the AC voltage supply, and also to a circuit of FIG. 24 in which another pair of switching transistors Q$_3$ and Q$_4$ is added to form an inverter of full-bridge configuration with Q$_1$ and Q$_2$, and in which a smoothing capacitor C$_0$ is connected across Q$_3$ and Q$_4$ to provide an DC voltage to the inverter. In the circuit of FIG. 24, Q$_3$ and Q$_4$ are driven in synchronism respectively with Q$_2$ and Q$_1$ by the same drive signals S$_2$ and S$_1$ to effect the same operation as in the circuit of FIG. 18 except that the inverter produces an output voltage of a level approximately twice that of the circuit of FIG. 18.

Figure 25:
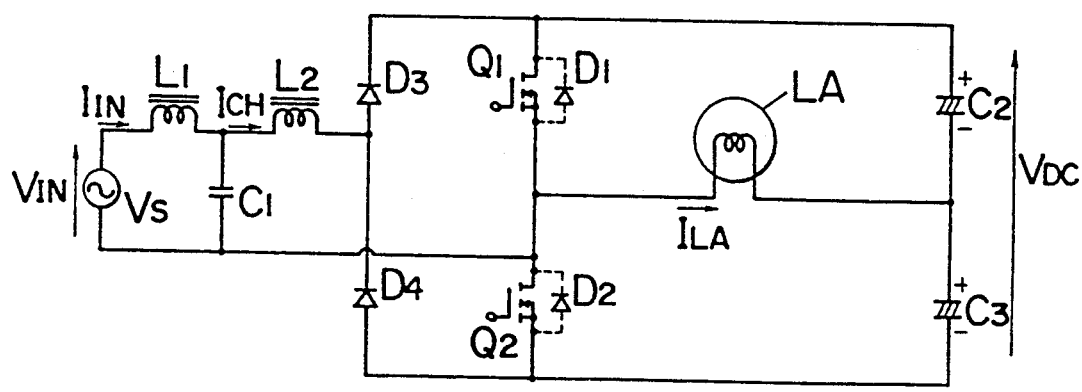
FIG. 25 illustrates a case in which the power supply is utilized to drive an incandescent lamp.
Figure 26:
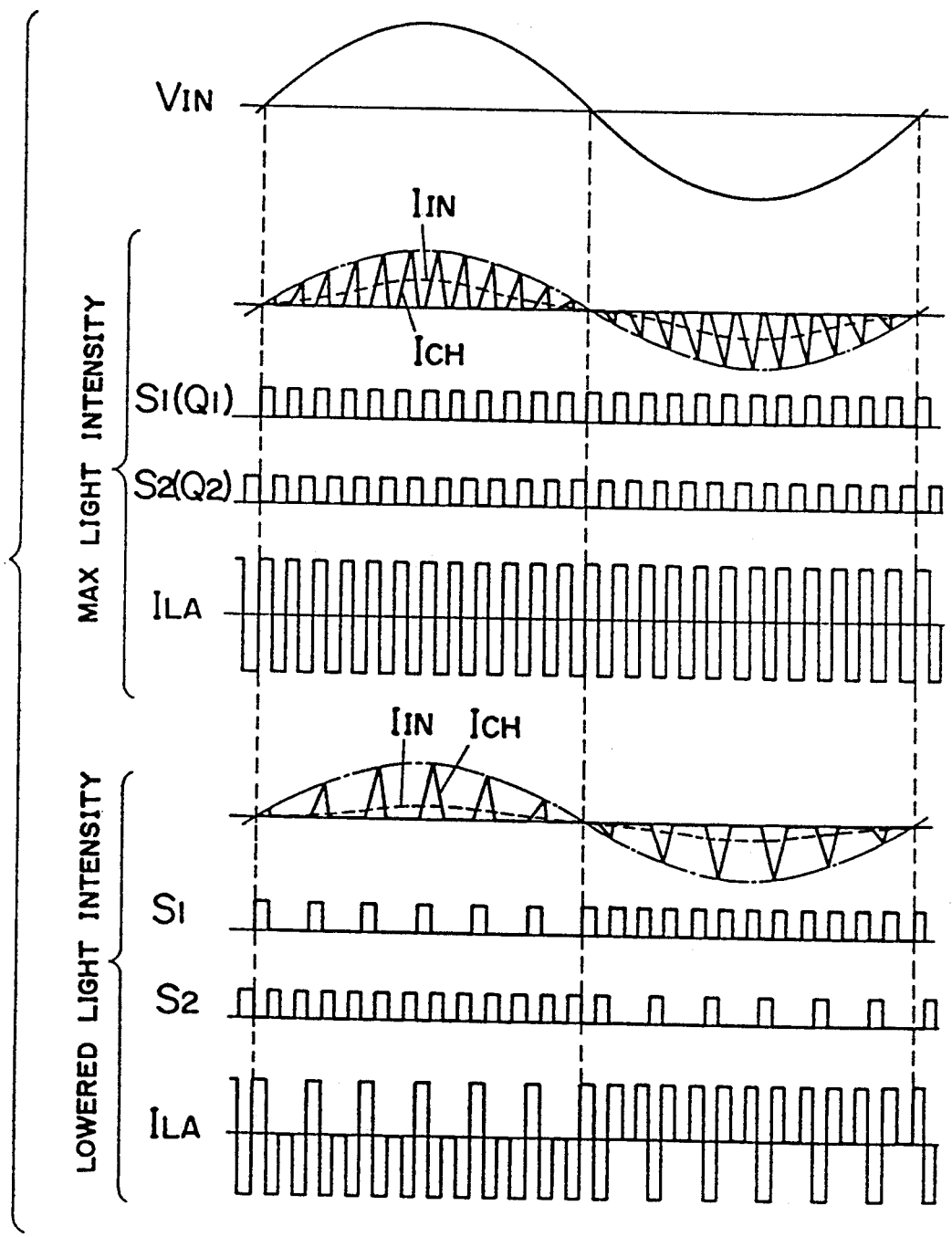
FIG. 26 illustrates several waveforms explaining the circuit operation of FIG. 25 in one control mode.

Further, the above control is also found effective to drive an incandescent lamp LA with the like inverter and chopper circuit, as shown in FIG. 25. In this operation mode, the inverter provides to the incandescent lamp a lamp current I$_{LA}$ having a rectangular waveform, as shown in FIG. 26 since there is no resonance circuit in the load. For effecting a dimmer control of the lamp LA, it is found effective to use the above control of intermittently ceasing the chopper operation in place of controlling the switching frequency since the frequency control has no effect on the lamp current I$_{LA}$ for the incandescent lamp LA. That is, when the lamp LA is required to be dimmed, for example, from a max light intensity condition as shown in the upper part of FIG. 26, one of the switching transistors Q$_1$ and Q$_2$ responsible for the chopper operation is controlled to be intermittently disabled, as shown in the lower part of FIG. 26, so as to reduce an input current to the chopper or the chopper input power W$_{IN}$, thereby correspondingly reducing a DC voltage developed at capacitors C$_2$ and C$_3$. Therefore, the input power to the inverter is also decreased to correspondingly reduce the inverter output power W$_{OUT}$ or the light intensity as desired. Thus, the dimmer control for the incandescent lamp LA can be successfully in the power supply of the present invention by controlling to intermittently cease the chopper operation. It is noted at this time that W$_{IN}$ and W$_{OUT}$ can be substantially balanced in this dimmer control with or without the control of the duty ratio.

Figure 27:
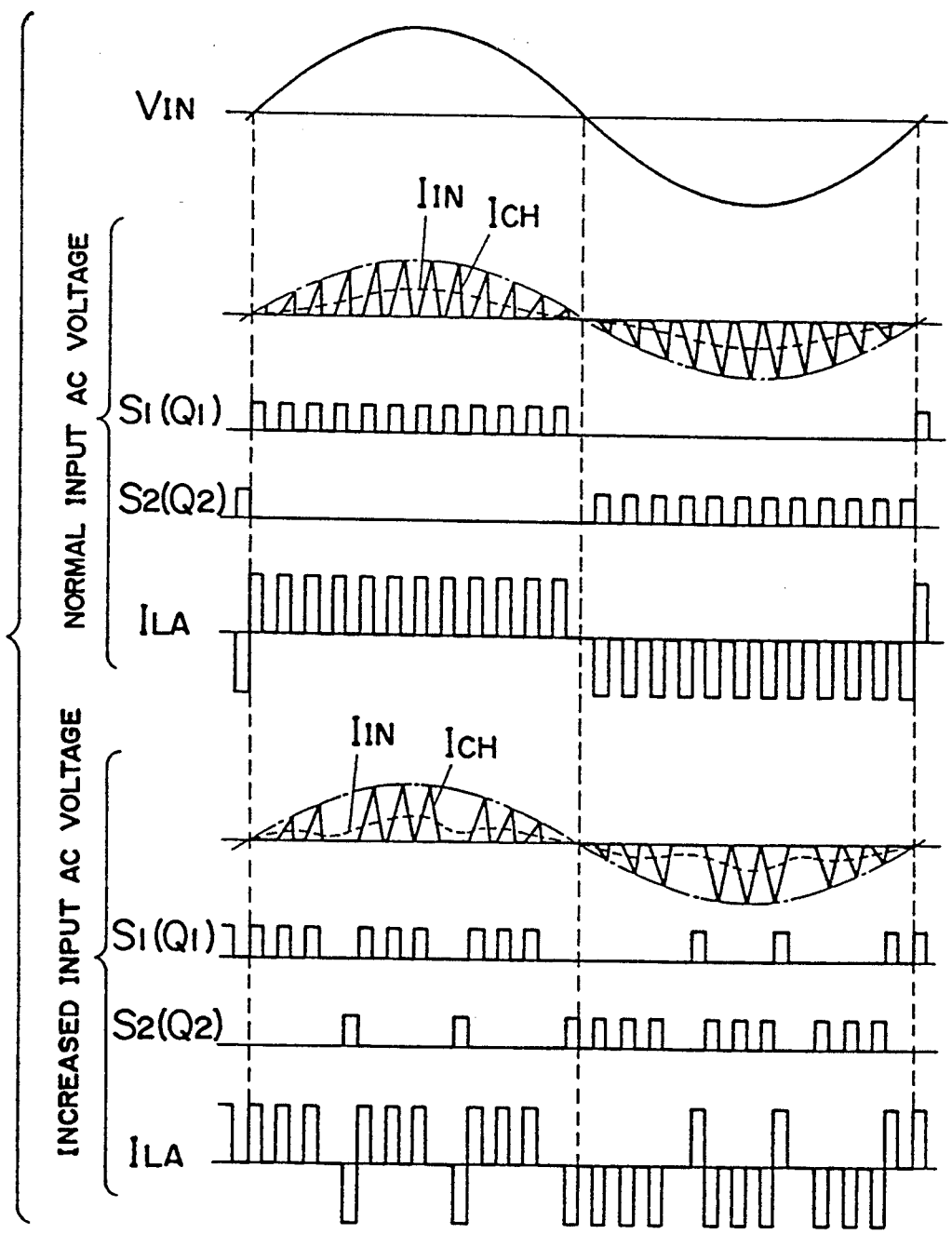
FIG. 27 illustrates several waveforms explaining the circuit operation of FIG. 25 in another control mode.

Furthermore, to drive the incandescent lamp LA with the circuit of FIG. 25, it is also possible to control Q$_1$ and Q$_2$ in a manner, as shown in the upper part of FIG. 27, to operate only Q$_1$ during the positive half cycle of the input AC source voltage V$_{IN}$ and only Q$_2$ during the negative half cycle of V$_{IN}$. In this mode, the power circuit provides a lamp current I$_{LA}$ in the form of repeating pulses of which polarity is reversed in synchronism with the polarity reversal of V$_{IN}$ such that lamp current I$_{LA}$ has an effective value which is one half of the peak value. So long as the input AC source voltage V$_{IN}$ is maintained at a fixed level, the power supply operates in the manner, as shown in the upper part of FIG. 27 to drive the lamp LA appropriately while maintaining a balanced condition $W_{IN}=W_{OUT}$. When by some reason the AC source voltage is increased, a control can be made, as shown in the lower part of FIG. 27, to intermittently disable $Q_1$ and $Q_2$ respectively in the positive and negative half cycles of $V_{IN}$ so as to compensate for the input AC voltage increase and keep the input power $W_{IN}$ at a fixed level irrespective of the input AC voltage increase. During this control of reducing the input power, it is also controlled, as shown in the lower part of FIG. 27, to turn on $Q_2$ immediately after $Q_1$ is turned off within the positive half cycle of $V_{IN}$ and to likewise turn on $Q_2$ immediately after $Q_2$ is turned off within the negative half cycle of $V_{IN}$, whereby maintaining the effective value of the lamp current $I_{LA}$ to be one half of the peak value and therefore maintaining the inverter output power $W_{OUT}$ constant at a desired level. With this consequence, the output power or the light intensity of the lamp can be kept free from the variation possible in the input AC source voltage.

Third embodiment <FIGS. 28 to 46>

Figure 28:
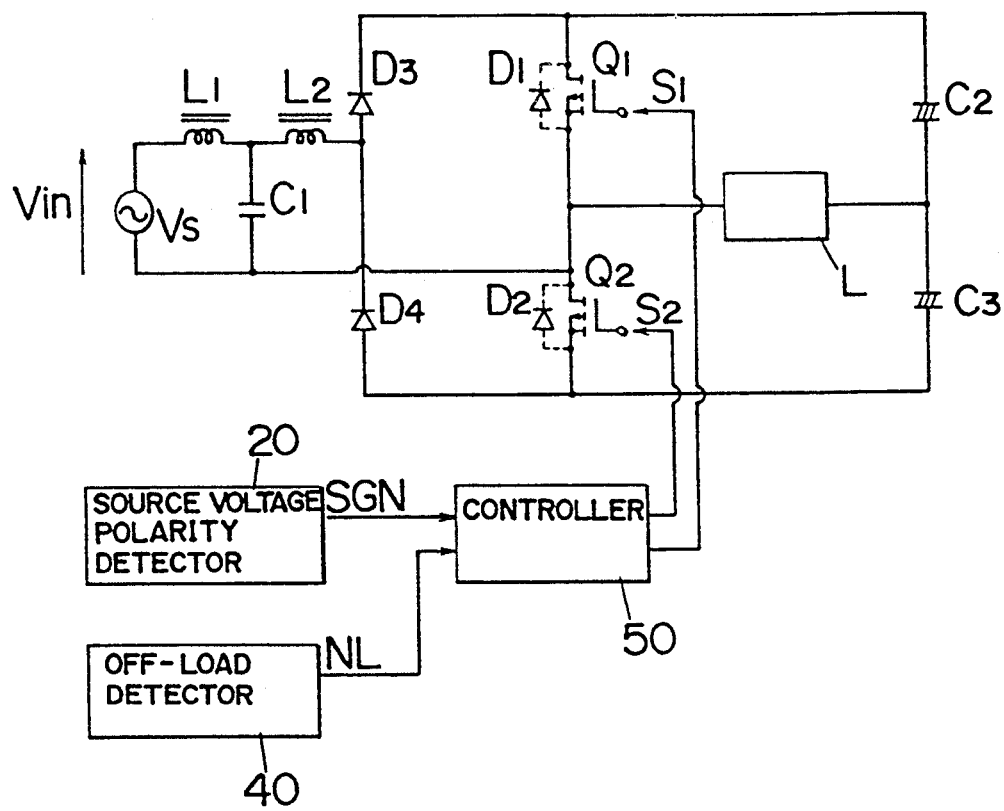
FIG. 28 is a circuit arrangement of an inverter AC power supply in accordance with a third embodiment of the present invention.
Figure 29:
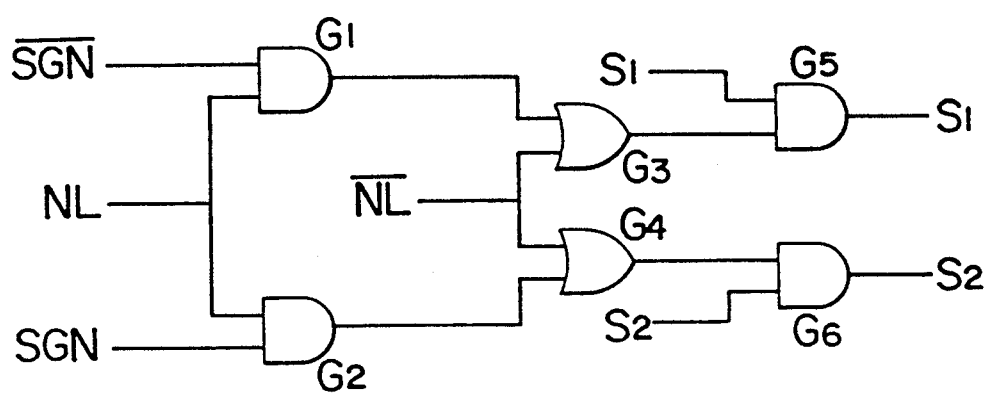
FIG. 29 is a diagram illustrating a controller logic utilized in the power supply of FIG. 28.

A third embodiment of the present invention is contemplated to additionally include means to cease only the chopper operation when the load is disconnected in order to avoid undue voltage increase or power consumption at the chopper which would lead to the breakage of the circuit components, particularly the switching transistors and the capacitors which store input energy and provide the inverter input. As shown in FIG. 28, an inverter AC power supply in accordance with the present embodiment includes, in addition to the like chopper and inverter circuit as discussed in the previous embodiments, an off-load detector 40 for detecting an off-load condition, a like source voltage polarity detector 20 as utilized in the second embodiment, and a controller 50. The off-load detector, as can be noted, is applicable to all the embodiments of the present invention. Although the controller 50 effects the above power control of balancing $W_{IN}$ and $W_{OUT}$ in cooperation with an input power monitor and an output power monitor as discussed in the first embodiment, duplicate explanation of such power control is avoided in the following description and drawings. The controller 50 is configured in the present embodiment to control the switching transistors $Q_1$ and $Q_2$ in accordance with detected results from detectors 20 and 40 so as to disable the chopper operation so long as the load L is disconnected, yet keeping the inverter operation to make the inverter ready for providing a load current as soon as the load is disconnected. With this consequence, it is readily possible to detect the re-connection of the load by monitoring such load current to thereby facilitate the design of restarting the load. As previously discussed, $Q_1$ and $Q_2$ in the chopper/inverter circuit of FIG. 28 can be identified by the polarity sensor 20 as to whether or not they are currently responsible for the chopper operation. Accordingly, the controller 50 can, in response to the outputs from the individual detectors 20 and 40, control to disable $Q_1$ in the positive half cycle and $Q_2$ in the negative half cycle of the input AC source voltage $V_{IN}$ for disabling the chopper operation while allowing the inverter operation. In detail, the polarity detector 20 is configured to provide a polarity signal SGN which goes "High" when $V_{IN}>0$ and goes "Low" when $V_{IN}<0$. The off-load detector 40 is also configured to provide a load signal NL which goes "High" when no load condition is detected and otherwise remains "Low". The controller 50 include a logic, as shown in FIG. 29, in which $S_1$ and $S_2$ are drive signals generated from an oscillator (not shown) provided in the controller 50 to drive $Q_1$ and $Q_2$, respectively. In operation, when the load signal NL is low as indicative of that the load is connected, OR-gates $G_3$ and $G_4$ are both operative to provide "High-level" output such that AND-gates $G_5$ and $G_6$ are both enabled to pass the drive signals $S_1$ and $S_2$, irrespective of the polarity signal SGN, whereby maintaining the normal operation of effecting the chopper and inverter operations. When the load signal NL goes "High-level" as indicative of that the load is disconnected, OR-gates $G_3$ and $G_4$ will be made in the same condition as AND-gates $G_1$ and $G_2$ to effect the followings:

1) When the polarity signal SGN is "High" as indicative of $V_{IN}>0$, AND-gate $G_2$ goes "High" to thereby provide $S_2$ from AND-gate $G_6$ for enabling to turn on and off $Q_2$ or keeping the inverter operation. At this condition, however, AND-gate $G_1$ goes "Low" to render AND-gate $G_5$ "Low", ceasing to provide $S_1$ and therefore disabling the chopper operation; and 2) When SGN goes "Low" as indicative of $V_{IN}<0$, AND-gate $G_1$ turns to have "High-level" output to thereby allow AND-gate $G_5$ to output $S_1$ for enabling the inverter operation. At this condition, AND-gate $G_2$ goes "Low" to thereby keep the output of AND-gate $G_6$ "Low", thus inhibiting to provide $S_1$ to $Q_1$ and therefore disabling the chopper operation.

Figure 30:
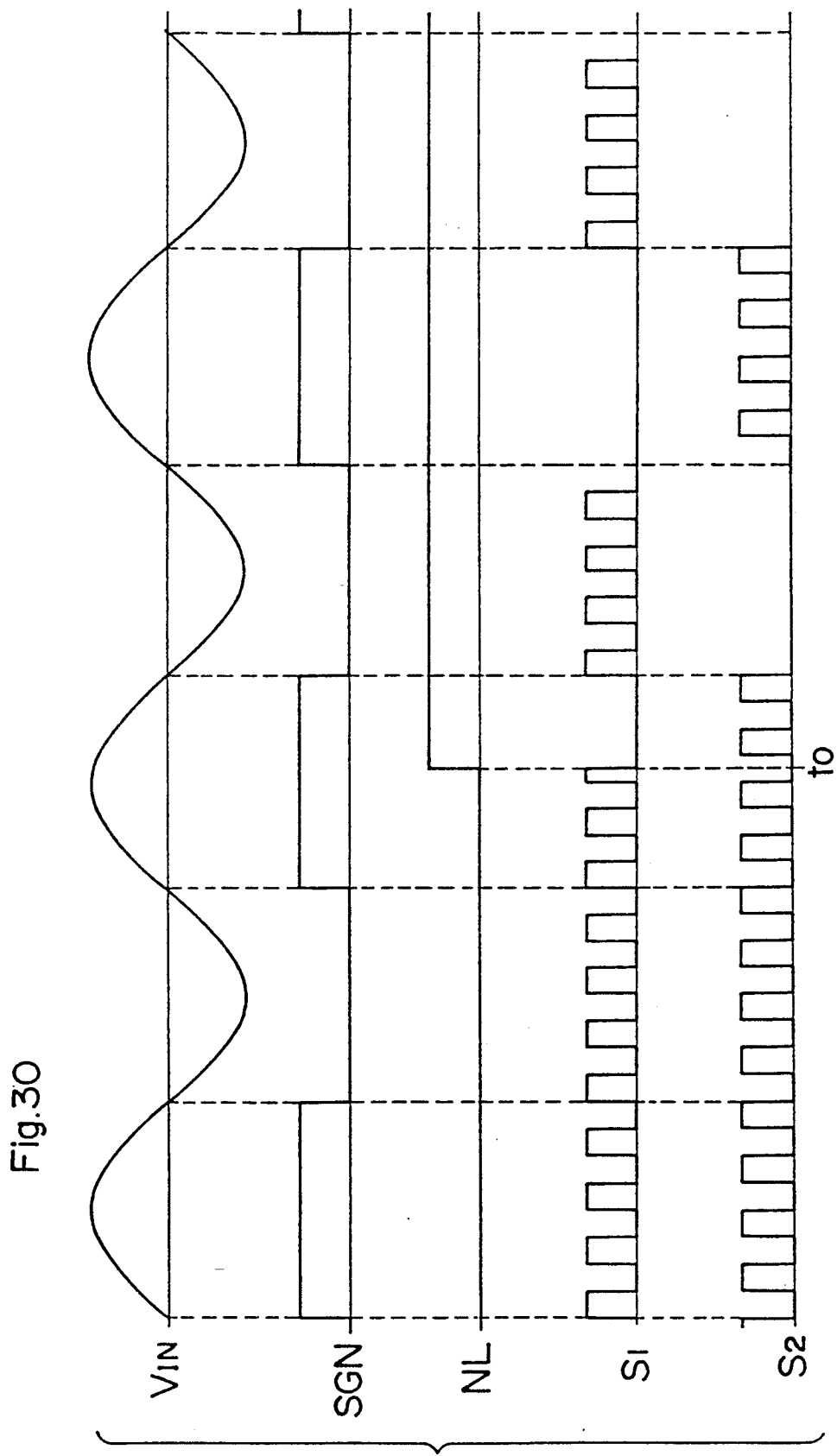
FIG. 30 illustrate several waveforms explaining a control operation of the above power supply.

The above control scheme is seen in FIG. 30 in terms of waveforms at the individual outputs, from which it can be confirmed that so long as the load signal NL remains "Low", $S_1$ and $S_2$ are generated to effect the chopper and inverter operations irrespective of the polarity signal SGN level, and that after NL goes high (at time $t_0$) the output of $S_1$ is inhibited when SGN is "High" and the output of $S_2$ is inhibited when SGN is "Low". In the figure, $S_1$ and $S_2$ are depicted to have a relatively long cycle for illustration purpose only, but are in fact to have a much shorter cycle than illustrated.

Figure 31:
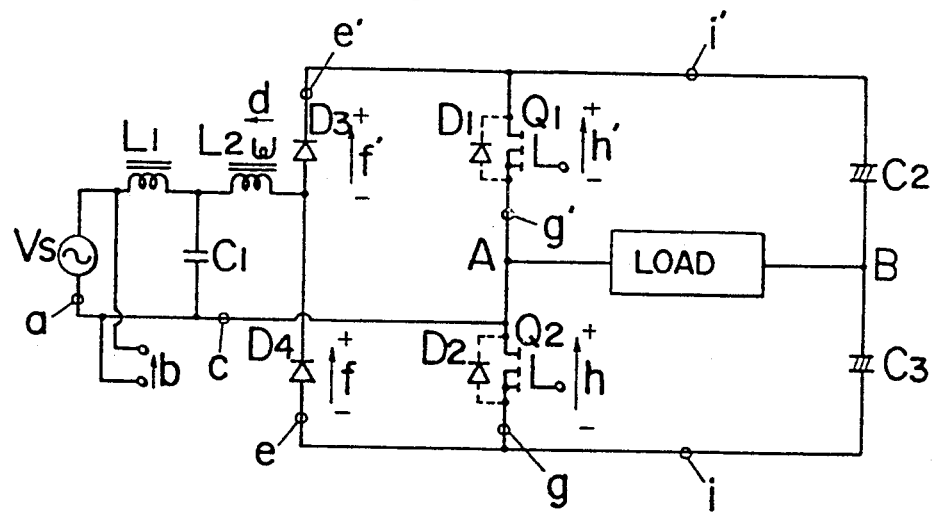
FIG. 31 is a circuit diagram of the above power supply illustrating several points for detection of the source voltage polarity.

The polarity detector 20 is coupled to the chopper/inverter circuit to detect the instantaneous polarity of the input AC voltage by monitoring currents or voltages at suitable points which may include, for example, points designated in FIG. 31 at:

(a) for input AC current;
(b) for input AC voltage;
(c) for chopper current;
(d) for voltage at inductor $L_2$ for chopper operation by means of an additional secondary winding, for instance;
(e),(e') for current through $D_4$ or $D_3$;
(f),(f') for voltage across $D_4$ or $D_3$;
(g),(g') for current through $Q_2$ or $Q_1$;
(h),(h') for voltage across $Q_2$ or $Q_1$; and
(i),(i') for load current within the inverter circuit.

The points (a),(c),(e),(e'),(g),(g'),(i),(i') are for monitoring the currents which are not present in the off-load condition, and are therefore found only effective to detect an on-load condition and not the off-load condition. Also point (d) is found only effective only in the on-load condition and not in the off-load condition, since the intended voltage will not develop across $L_2$ in the absence of a current therethrough. While, on the other hand, (h),(h') is found effective in the off-load condition but not in the on-load condition since the voltage across $Q_1$ or $Q_2$ will change depending upon the polarity of the input AC voltage at the off-load condition but will be of rectangular wave synchronized with the drive signal $S_1$ or $S_2$ having no relation to the polarity of the input AC voltage. With this consequence, Therefore, points (b), (e), or (e') is found suitable to monitor the polarity both in the off-load and on-load conditions, although it may of course possible to use different points for monitoring the polarity separately in the on-load condition and in the off-load condition.

Figure 32A:
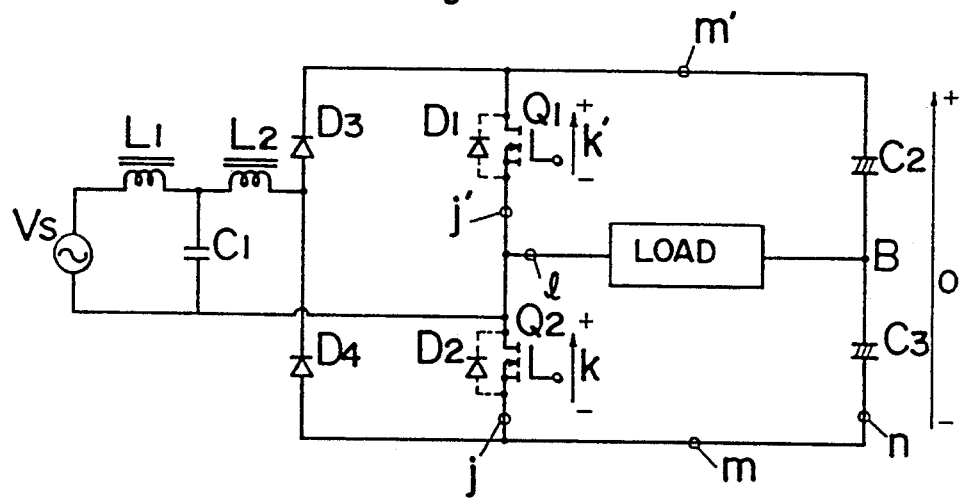
FIGS. 32A and 32B are circuit diagrams of the above power supply respectively illustrating several points for detection of off-load condition.
Figure 32B:
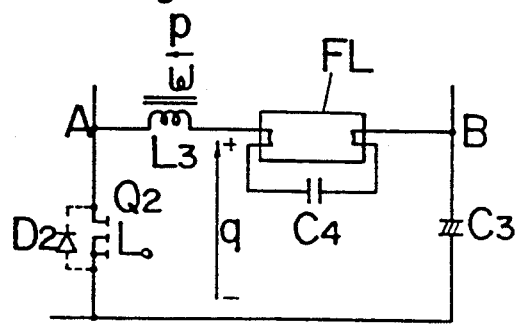

The off-load detector 40 is coupled to the chopper-/inverter circuit or the load by monitoring currents or voltages at suitable points which may include, for example, points illustrated in FIG. 32A and 32B at:

(j),(j') for current through $Q_2$ or $Q_1$;

(k),(k') for voltage across $Q_2$ or $Q_1$;

(l) for load current on the load side;

(m),(m') for load current within the inverter;

(n) for current through $C_3$;

(o) for voltage across $C_2$ and $C_3$;

(p) for voltage across $L_3$ in the load circuit through additional secondary winding; and (q) for voltage at one end of lamp FL.

The above points are effective to detect not only the off-load condition but also the on-load condition. This is because that even after the chopper operation is suspended in response to the off-load detection, the inverter operation is controlled to be still operating such that, as soon as the load is reconnected, the inverter can immediately provide through the active one of $Q_1$ and $Q_2$, the load and $C_2$ and $C_3$ a load current with a corresponding voltage change by which the on-load condition can be detected. Although the above points are effective for monitoring both the off-load and on-load condition, the off-load condition alone may be detected by the use of a thermosensor monitoring a temperature of the load or switching elements or by the use of an optical sensor monitoring a light energy from the lamp FL in case it is connected as the load.

Figure 33:
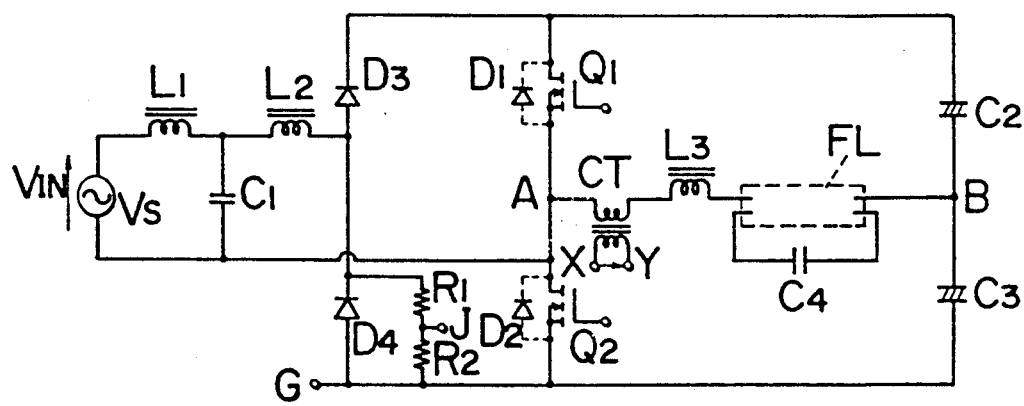
FIG. 33 is a circuit diagram of the above power supply illustrating suitable points for detection of the source voltage polarity and the off-load condition.

FIG. 33 illustrates one example for detecting the source voltage polarity and the off-load condition in the above chopper/inverter circuit. The polarity is detected by monitoring a voltage across diode $D_4$ at [J] by the use of a voltage divider of $R_1$ and $R_2$, and the off-load condition is detected by monitoring a load current at [X-Y] by the use of a current transformer CT inserted in series with the load between the inverter output ends A and B. When the load is disconnected to open the inverter outputs ends A and B, a voltage [X-Y] at a secondary winding of CT is decreased to zero for indicate the off-load condition. At this off-load condition, $Q_1$ and $Q_2$ are controlled to be selectively disabled depending upon the input AC source voltage polarity detected at [J] ($Q_1$ while $V_{IN}>0$, $Q_2$ while $V_{IN}<0$) for ceasing the chopper operation while keeping the inverter operation, as discussed hereinbefore. When the load is reconnected, the load current is caused to flow between the inverter output ends A and B from either of $C_2$ or $C_3$, providing a corresponding voltage at [X-Y] to thereby enabling the detection of the on-load condition and restart of the circuit in a suitable manner.

Figure 34:
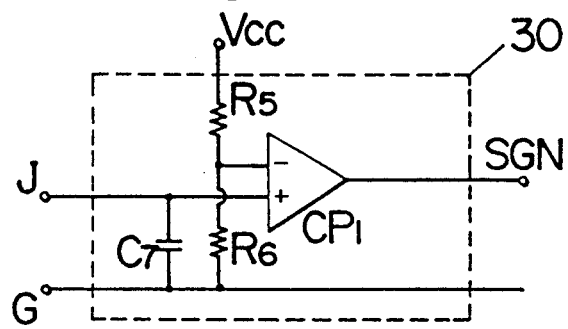
FIG. 34 is a diagram illustrating an off-load detector for the circuit of FIG. 33.

FIG. 34 illustrates one example of the source voltage polarity detector 20 for use with the circuit of FIG. 33. The detector 20 has inputs connected to points [J] and [G] in the circuit of FIG. 33 and includes a capacitor $C_7$. When the source voltage $V_{IN}>0$, diode $D_4$ sees a high reverse bias which is divided by resistors $R_1$ and $R_2$ to provide at [J] a corresponding voltage by which capacitor $C_7$ is charged to a certain level above a reference voltage determined by resistors $R_5$ and $R_6$ such that a comparator $CP_1$ outputs the "High-level" polarity signal SGN. When, on the other hand, $V_{IN}<0$, diode $D_4$ sees a small forward bias so that capacitor $Q_7$ is discharged to have a corresponding voltage level at the input of comparator $CP_1$ lower than the reference voltage, whereby the "Low-level" polarity signal SGN is output from comparator $CP_1$.

Figure 35:
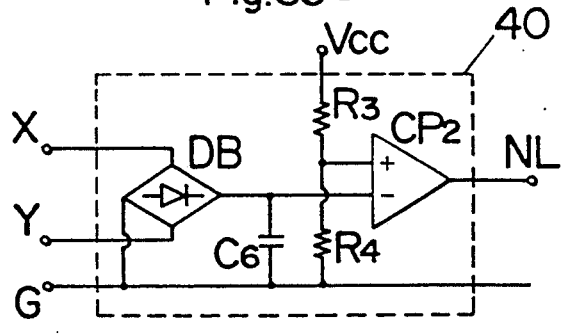
FIG. 35 is a diagram illustrating a source voltage polarity detector for the circuit of FIG. 33.

FIG. 35 illustrates one example of the off-load detector 40 adapted in use to the above circuit of FIG. 33. During the on-load condition, the current transformer CT generates between points [X-Y] an alternating voltage which is applied through a diode bridge rectifier DB to charge a capacitor $C_6$ to a level higher than a reference voltage determined by resistors $R_3$ and $R_4$ such that a comparator $CP_2$ provides the "Low-level" load signal NL. Upon the off-load condition, no voltage is developed between [X-Y] and therefore that no current is supplied to capacitor $C_6$ so that capacitor $C_6$ will be discharged down below the reference voltage, whereby comparator $CP_2$ turns to output the "High-level" load signal NL. To expedite the discharging of $C_6$ at the off-load condition, $C_6$ may be connected in parallel with additional discharging capacitor or may have less capacitance.

Figure 36:
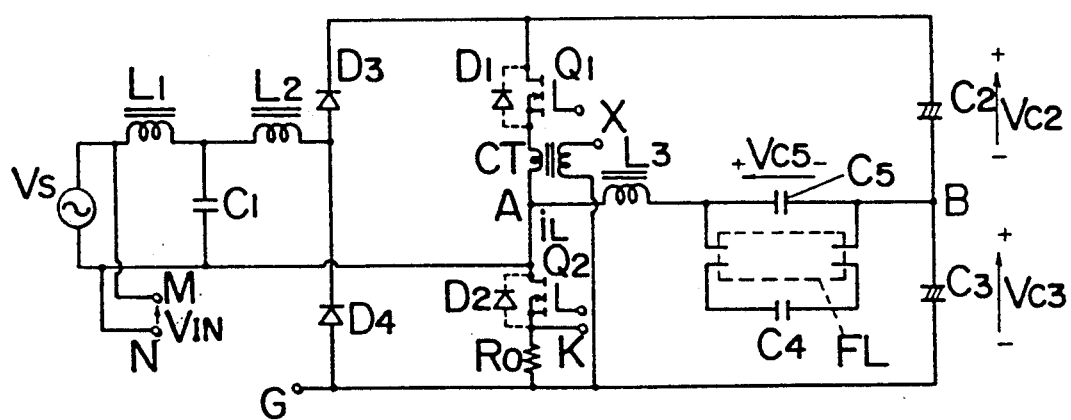
FIG. 36 is a diagram illustrating another points in the above circuits for detection of the source voltage polarity and the off-load condition.
Figure 37:
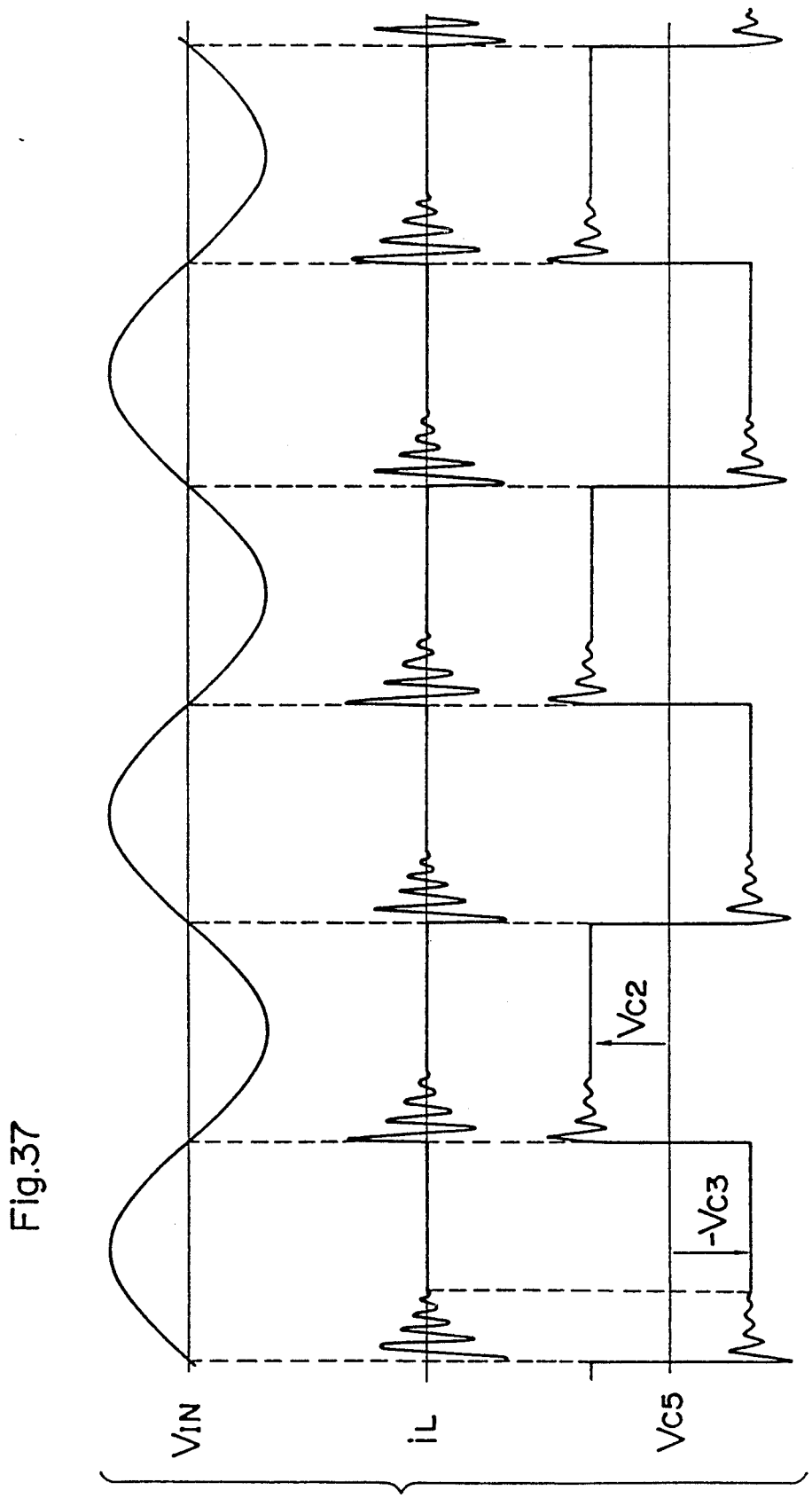
FIG. 37 illustrates waveforms at points in the circuit of FIG. 36.

FIG. 36 illustrates another preferred set of points for detection of the source voltage polarity and the off-load condition in the like chopper/inverter circuit when the circuit is used for driving the load including a series resonance circuit of an inductor $I_{L4}$ and a capacitor $C_5$ connected in parallel with the lamp FL. In this modification, the voltage polarity is detected by monitoring input AC voltage $V_{IN}$ between points [M-N] while the off-load condition is detected by monitoring current through $Q_1$ by the use of a current transformer CT as well as by monitoring a current through $Q_2$ by a resistor $R_0$. When the lamp FL is disconnected as indicated in the figure, although a current will flow through the series resonance circuit of $L_3$ and $C_4$ between the inverter output ends A and B, such resonance current is substantially a reactive current hardly consuming the output power, thus causing also the off-load condition. However, as seen from FIG. 37 illustrating waveforms for input AC voltage $V_{IN}$, current $i_L$ through inductor $L_3$, voltage $V_{c5}$ at capacitor $C_5$, the circuit of FIG. 36 will see a current for a short time interval each time the voltage polarity is reversed, which invalidates to detect reconnection of the load simply by monitoring the current through the switching transistors. To avoid this inconvenience and assure reliable reconnected load detection, it is preferred either to stop the detection for a time interval in which such current continues or to average such current over an extended period for valid comparison with a reference value.

Figure 38:
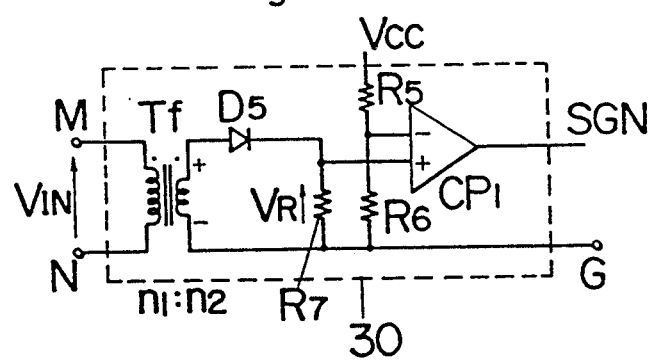
FIG. 38 is a diagram illustrating a source voltage polarity detector for the circuit of FIG. 36.

FIG. 38 shows one example of the source voltage polarity detector 20 in which the input AC voltage $V_{IN}$ received at terminals [M-N] is step down at a transformer Tf and is rectified by diode $D_5$ to provide at resistor $R_7$ a corresponding voltage $V_R$ which is to be compared at a comparator $CP_1$ with a reference voltage determined by resistors $R_5$ and $R_6$. When $V_{IN}>0$, a high voltage $V_R$ is developed at $R_7$ which is greater than the reference voltage so that $CP_1$ outputs the "High-level" polarity signal SGN. When $V_{IN}<0$, no voltage is developed at $R_7$ so that $CP_1$ outputs the "Low-level" polarity signal SGN. It is noted at this time that, although the reference voltage is required to be as low as possible in the sense of balancing the "High-level" period and the "Low-level" period of the polarity signal SGN, it is preferably set to be a certain high level enough for discriminating a possible noise in the detector and therefore assuring a reliable detection, since a noise voltage at $R_7$ might cause $CP_1$ to erroneously output the "High-level" signal SGN.

Figure 39:
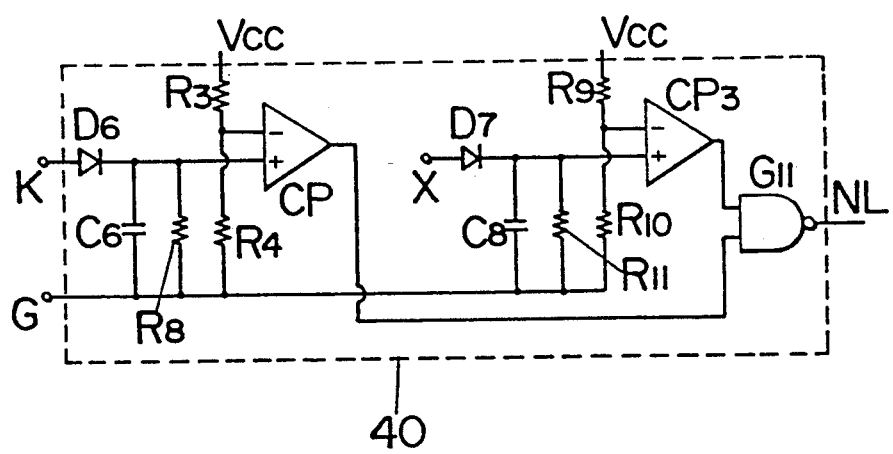
FIG. 39 is a diagram illustrating an off-load detector for the circuit of FIG. 36.

FIG. 39 illustrates one example of the off-load detector 40 utilized in the circuit of FIG. 36. While the load is connected to flow a current through transistor $Q_1$ (or diode $D_1$), the current transformer CT generates between a point [X] and a ground [G] an alternating voltage which is applied as being rectified by a diode $D_7$ to charge a capacitor $C_8$ to a level higher than a reference voltage determined by resistors $R_9$ and $R_{10}$ such that a comparator $CP_3$ provides a "High-level" output. Also in the on-load condition, transistors $Q_2$ [or diode $d_2$] sees a current which provides a corresponding AC voltage between a point [K] and the ground [G] which voltage is then rectified through diode $D_6$ to charge a capacitor $C_6$ to a level higher than a reference voltage determined by resistors $R_3$ and $R_4$ such that a comparator $CP_2$ provides a "High-level" output.

When, on the one hand, the load is disconnected to discontinue a current through $Q_1$ (or $d_1$), capacitor $C_8$ will discharge through resistor $R_{11}$ down to a voltage below the reference voltage at $CP_3$, thereby producing a "Low-level" output from $CP_3$. Also in the off-load condition, no current flows through $Q_2$ (or $d_2$), capacitor $C_6$ will discharge through resistor $R_8$ down to a voltage below the reference voltage at $CP_2$, thereby producing a "Low-level" output from $CP_2$. The outputs from $CP_2$ and $CP_3$ are gated at NAND-gate $G_{11}$ to finally provide the load signal NL which goes "High" when any one of the outputs from $CP_2$ and $CP_3$ is "Low", and which goes "Low" only when both outputs are "High", thus assuring reliable off-load and on-load or reconnected load detection.

Figure 40:
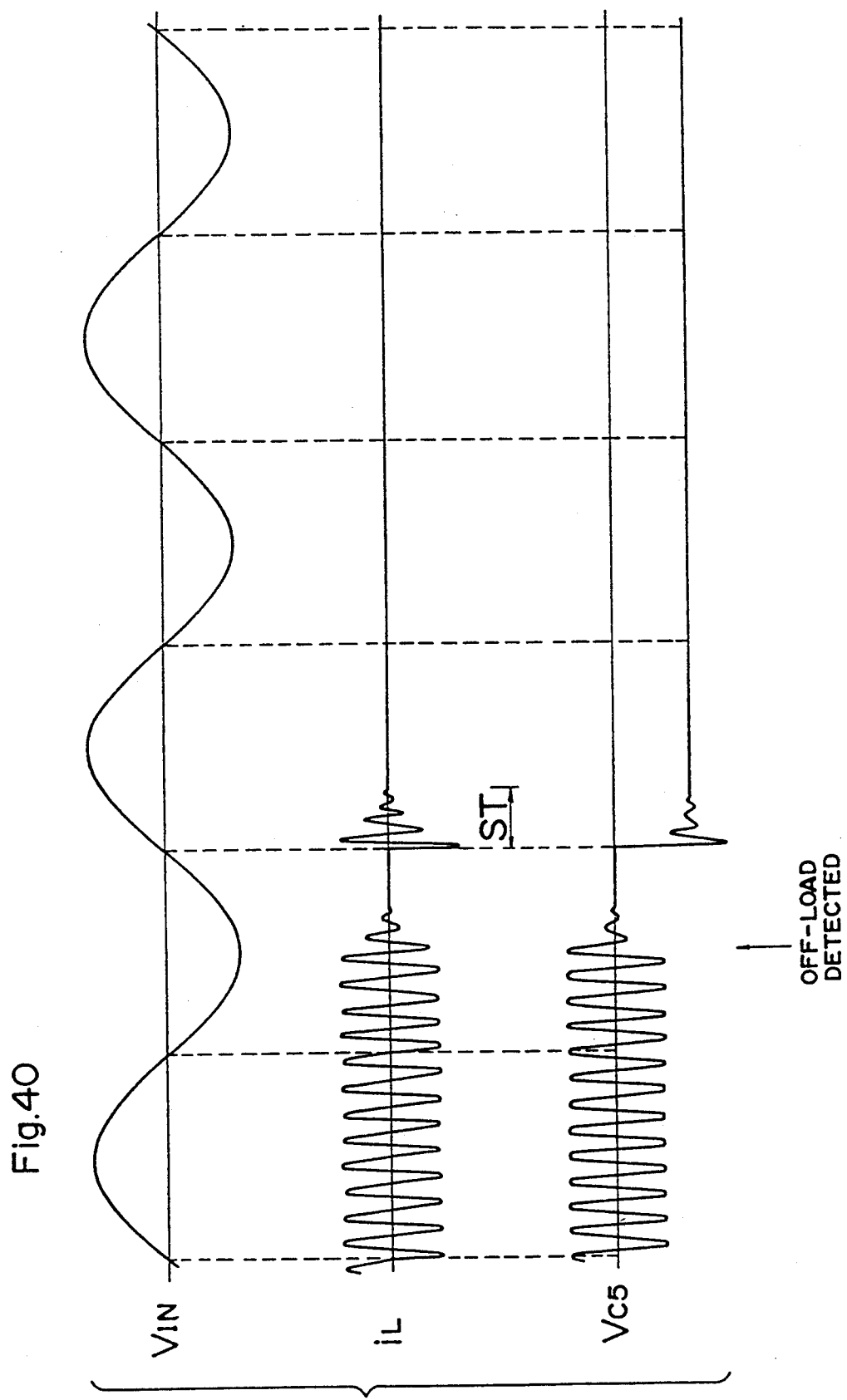
FIG. 40 illustrates waveforms at points in the circuit of FIG. 36 seen in another operational mode for detection of a re-connected load condition.

Further, for detecting the re-connection of the load in the circuit of FIG. 36, it may be also effective to operate only one of switching transistor $Q_1$ and $Q_2$ after detection of the off-load. For example, when only $Q_2$ is kept to turn on and off at $V_{IN}>0$, with $Q_1$ is disabled or kept turned off irrespective of the input voltage polarity, capacitor voltage $V_{C5}$ at $C_5$ is kept constantly equal to capacitor voltage $(-V_{C3})$ at $C_3$ and a current will flow only for a short time period ST after the first reversal of voltage polarity following the detection of the off-load condition, as seen in FIG. 40, and no current fill flow until the load is reconnected. With the scheme, therefore, the reconnected condition can be detected by monitoring a current in the circuit only at one point and simply by ignoring the current appearing within such initial short time period ST subsequent to the first polarity reversal of the input voltage, which makes it possible to simplify a control circuit arrangement. Although the above scheme is not capable of detecting the re-connected load condition while $V_{IN}<0$, such condition can be detected successfully in the subsequent half cycle $V_{IN}>0$ and such delay is of no consequence in the actual use. It is of course equally possible to keep only operative $Q_1$ in contrast to the above explanation. It should be noted at this time that the above control scheme is also applicable to the circuit of FIG. 28.

Figure 41:
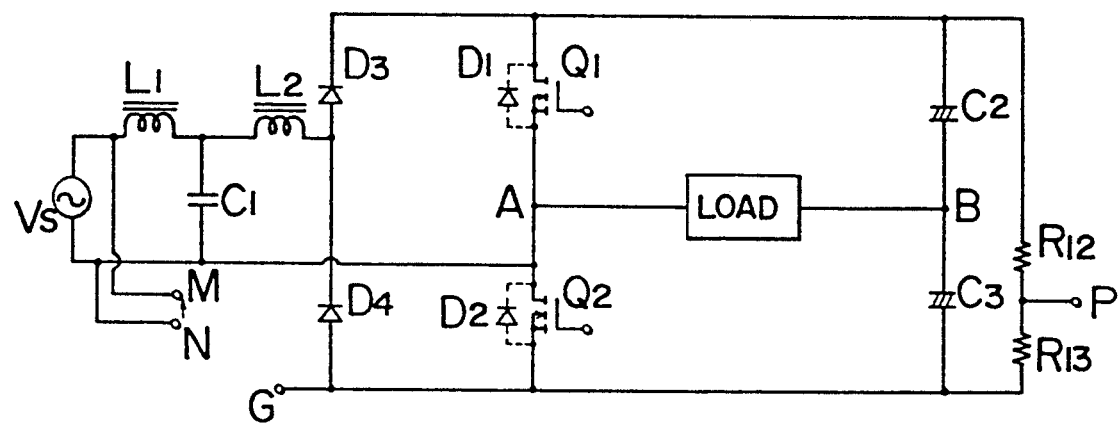
FIG. 41 is a circuit diagram illustrating further modification for detection of the off-load condition.

Referring to FIG. 41, a further arrangement is shown for detection of the input voltage polarity and the off-load condition in the like chopper/inverter circuit. The input voltage polarity is detected at points [M-N] in the same manner as described hereinbefore with reference to FIG. 38. In this modification, a voltage divider of resistors $R_{12}$ and $R_{13}$ is coupled across the series circuit of capacitors $C_2$ and $C_3$ so as to provide a monitor output voltage between points {P-G} for detection of the off-load condition and the reconnected load condition by that voltage. Upon occurrence of off-load condition, the chopper output will be all stored in capacitors $C_2$ and $C_3$ without being consumed by the load to thereby correspondingly increase capacitor voltage and the monitor voltage [P-G]. Therefore, the off-load condition can be easily detected by the increase in the monitor voltage. At this occurrence, the chopper operation is inhibited by controlling to disable one of $Q_1$ and $Q_2$ currently responsible for the chopper operation as identified by the polarity signal SGN, as explained hereinbefore. When the load is reconnected, one of capacitors $C_2$ and $C_3$ will provide a current through active one of $Q_1$ and $Q_1$ to the load and therefore sees a voltage drop which results in a corresponding voltage drop at [P] by which the re-connected load condition can be easily detected.

Figure 42:
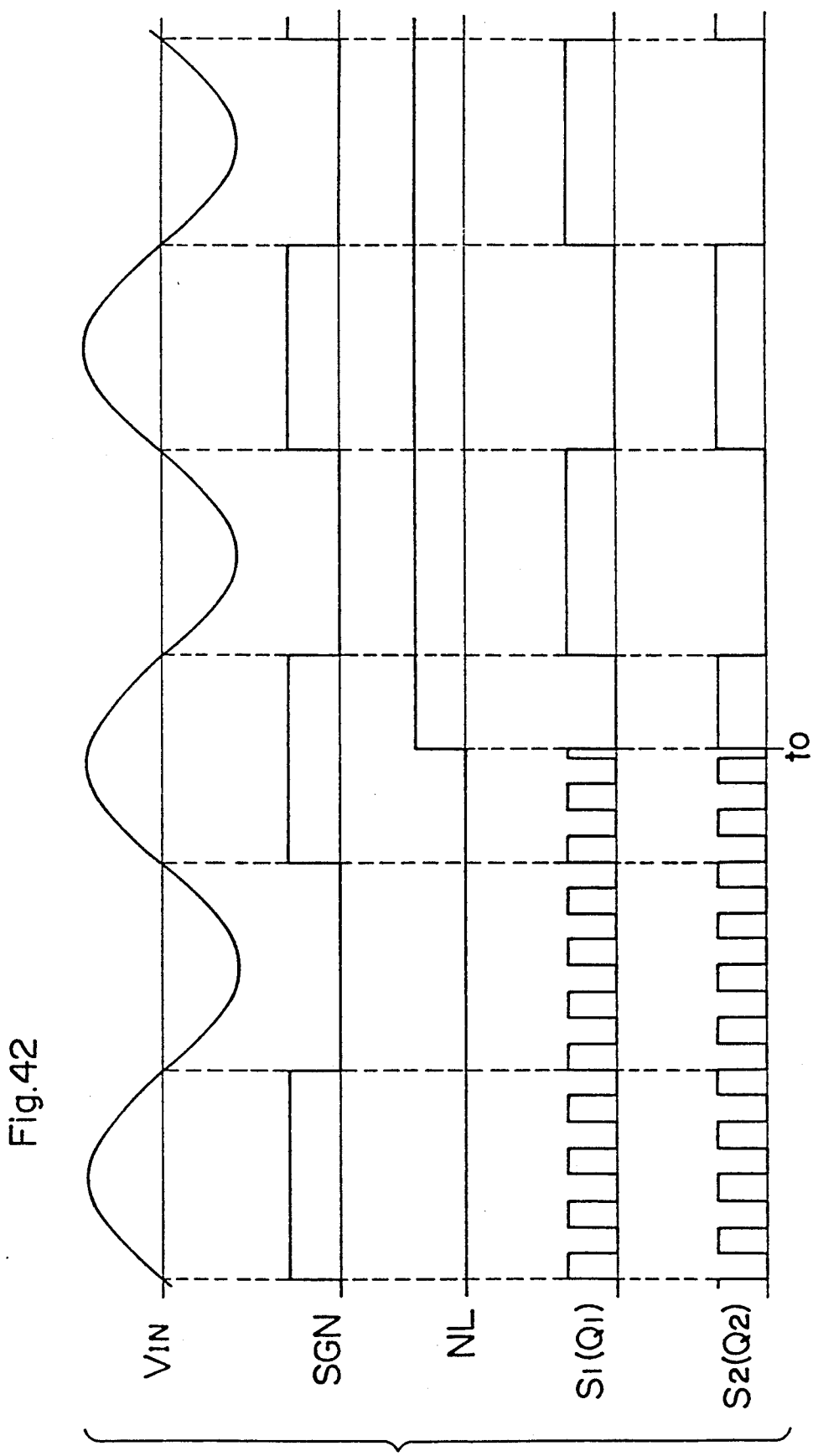
FIG. 42 is a waveform chart illustrating a control operation of FIG. 41.
Figure 43:
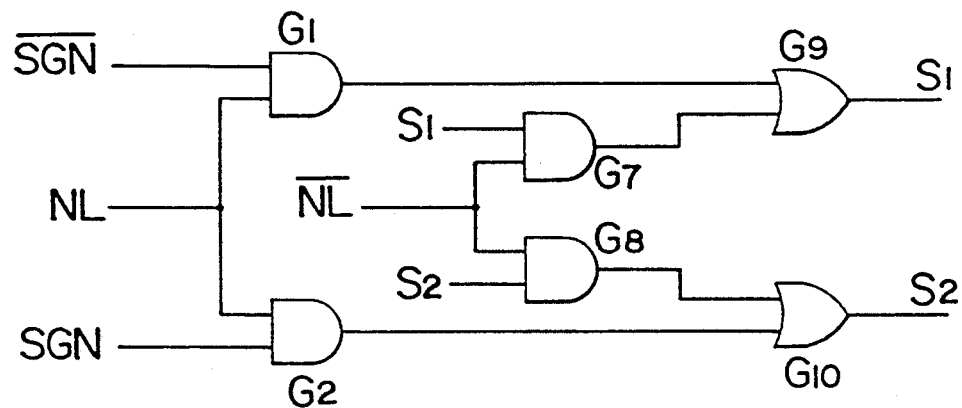
FIG. 43 is a logic circuit for obtaining drive signals for the control operation of FIG. 42.

As shown in FIG. 42, during the off-load condition [starting from $t_0$] in which the chopper operation is controlled to be disabled by turning off the corresponding one of the switching transistors responsible for the chopper operation [i.e., $Q_1$ in positive half cycle and $Q_2$ in the negative half cycle of $V_{IN}$], it may be effective to keep on the other switching transistor responsible only for the inverter operation [i.e., $Q_2$ in the positive half cycle and $Q_1$ in the negative half cycle of $V_{IN}$] rather than to turn on and off. With this control, power requirement for driving the switching transistors can be reduced, particularly in the circuit utilizing power MOSFET as $Q_1$ and $Q_2$ which requires charging and discharging at gate each time it is turned on and off. Also in this control, drive signals $S_1$ and $S_1$ (for $Q_1$ and $Q_2$) are apparently to be inverted signal of the polarity signal SGN during the off-load condition, as seen in the figure. Such drive signals $S_1$ and $S_2$ can be generated by a logic circuit of FIG. 43. It should be noted in this connection that this control can be well adapted to the circuits of FIGS. 28, 33, and 36.

Figure 44:
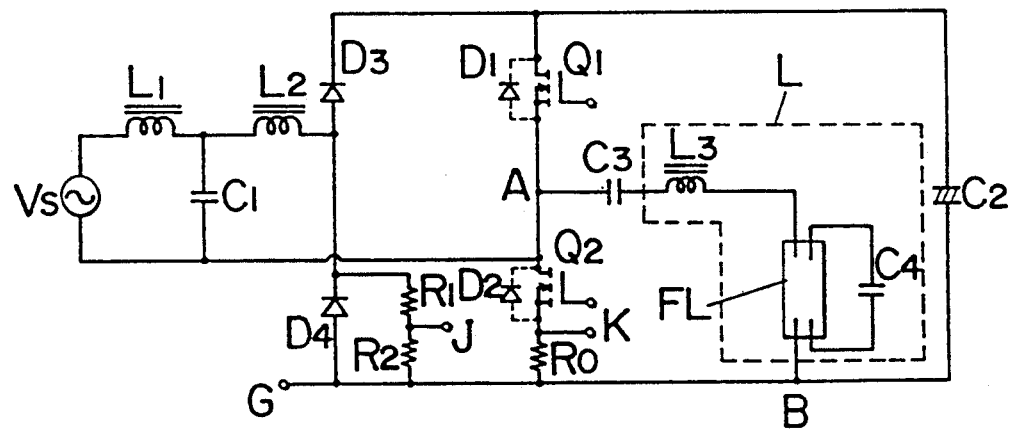
FIG. 44 is a circuit diagram illustrating a modified chopper/inverter circuit which may form the power supply of the present invention.

FIG. 44 illustrates a further arrangement for detection of the input AC voltage polarity and the off-load condition with regard to a modified chopper/inverter circuit. The modified circuit is similar in configuration to that of FIG. 28 except for particular capacitor location in the inverter. For an easy understanding purpose like numerals are repeated to designate like components serving like circuit operations. In this modified circuit, capacitors $C_2$ and $C_3$ are connected in circuit to provide a DC voltage to the input of the inverter. Capacitor $C_2$ is a smoothing capacitor connected across the across a series pair of first and second transistors $Q_1$ and $Q_2$, while capacitor $C_3$ is connected in series with the load L across the first transistor $Q_2$.

In operation, when transistor $Q_1$ is on while transistor $Q_2$ is off during a positive half cycle of the input AC voltage, the voltage source VS flows a current of increasing magnitude through inductor $L_2$, third diode $D_3$, transistor $Q_1$ and back to the voltage source VS to store energy into the inductor $L_2$. At the same time, transistor $Q_1$ also acts to flow a current from capacitor $C_2$, through $Q_1$, capacitor $C_3$, load L, and back to capacitor $C_2$ to provide a load current in one direction. Subsequently, when transistor $Q_1$ is off and in stead transistor $Q_2$ is on within the same positive half cycle, inductor $L_2$ releases its energy through third diode $D_3$, capacitor $C_2$, diode $D_2$, and voltage source VS to accumulate a smoothed DC voltage into capacitor $C_4$. At this occurrence, transistor $Q_2$ operates to flow a current from capacitor $C_3$, $Q_2$, load L, and back to $C_3$, thus providing a load current in the opposite direction.

During the negative half cycle of the input AC voltage, when transistor $Q_1$ is off while transistor $Q_2$ is on, the voltage source Vs flows a current through $Q_2$, fourth diode $D_4$, inductor $L_2$ back to Vs to store energy into inductor $L_2$. At this occurrence, transistor $Q_2$ operates to flow a load current in one direction from capacitor $C_3$, $Q_2$, and load L. Subsequently when transistor $Q_1$ is on and in stead $Q_2$ is off, inductor $L_2$ release its energy through Vs, first diode $D_1$, capacitor $C_2$, fourth diode $D_4$ and back to inductor $L_2$ for charging capacitor $C_2$, while inductor $L_2$ also supplies a current through Vs, capacitor $C_3$, load L, diode $D_4$. At the same time, transistor $Q_1$ operates to flow a load current in the opposite direction from capacitor $C_2$, through $Q_1$, capacitor $C_3$, and load L. In this manner, switching transistors $Q_1$ and $Q_2$ repeat alternately conductive and nonconductive for effecting the inverter operation of applying a high frequency AC voltage to load L while at the same time effecting the chopper operation of charging capacitors $C_2$ and $C_3$ through inductor $I_{L4}$ and diode-bridge rectifier of $D_1$ to $D_4$ in such a way as to provide the smoothed voltage to the inverter input. Accordingly, it is confirmed in this modified circuit that $Q_1$ is responsible for the chopper and inverter operations and $Q_2$ is responsible only for the inverter operation during the positive half cycle and vice versa in the negative half cycle of the input AC voltage. Further, in the modified chopper/inverter circuit, coupling capacitor $C_3$ is selected to have capacitance larger enough than capacitor $C_4$, which is connected in parallel with lamp FL to effect preheating the filament thereof as well as to form a resonance circuit with inductor $L_3$ in the load, so that it will not influence the resonance circuit. As is known from the above discussion, coupling capacitor $C_3$ acts to provide a DC voltage to the inverter input when $Q_2$ is on and also acts to filter a dc component in the load current, and therefore can have less capacitance relative to smoothing capacitor $C_2$. For example, the circuit may be designed to have $C_2 = 100$ μF, $C_3 = 0.47$ μF, $C_4 = 0.0015$ μF when $L_2 = 0.5$ mH, $L_3 = 0.45$ mH are selected for driving a fluorescent lamp [FCL-32EX/30, by Matsushita Denshi Kogyo, Japan] at a switching frequency of 40 KHz from the input voltage of 100 V.

The above modified circuit may be controlled in the same manner as discussed with reference to FIG. 30 or FIG. 37 for ceasing the chopper operation upon detection of the off-load condition while keeping the inverter active for detection of re-connected load condition. In this respect, it may be preferred to keep operating only $Q_1$ after the off-load condition for reliable detecting the re-connection of the load, in view of that, even when $Q_2$ is kept operating in the off-load condition in an attempt to provide a load current from $C_3$ for detection of re-connection of load, $C_3$ of less capacitance may be exhausted by natural discharging in the off-load condition and may fail to provide the load current.

Figure 45:
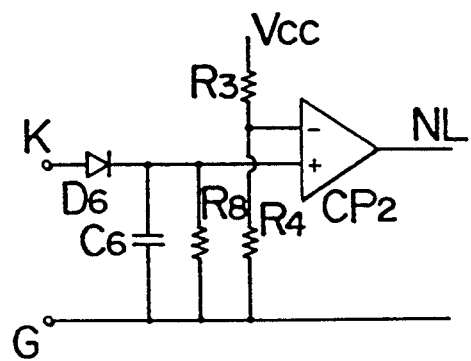
FIG. 45 is a diagram of an off-load detector for use in the circuit of FIG. 44.

The input voltage polarity of the above circuit can be detected by monitoring a voltage between points [J-G] with a like detector circuit as shown in FIG. 34. The off-load condition can be also detected by monitoring a voltage across a resistor $R_0$ inserted in series with $Q_2$ with the use of a detector circuit as shown in FIG. 45.

It is noted at this time the above modified chopper/inverter circuit can be equally utilized in the previous embodiments without causing any substantial problem in the control of equalizing the chopper input power $W_{IN}$ and the inverter output power $W_{OUT}$.

Figure 46:
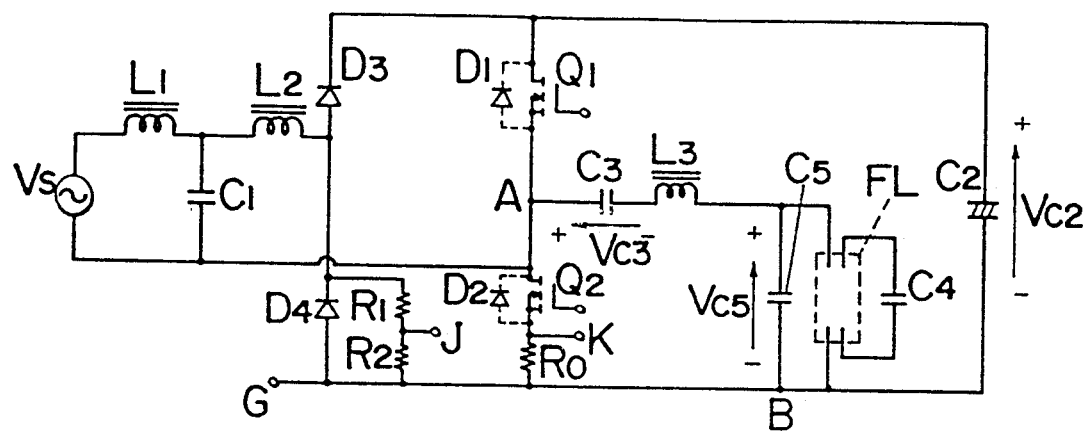
FIG. 46 is a circuit diagram illustrating another modified chopper/inverter circuit which may form the power supply of the present invention.

FIG. 46 illustrates another modified chopper/inverter circuit in which an additional resonance capacitor $C_5$ is connected across the lamp FL. For reliably detecting the re-connection of the load with this circuit, it is also effective to keep operating only $Q_1$ during the negative half cycle of the input AC voltage. Otherwise, $Q_2$ would operate to discharge $C_3$ and $C_5$ substantially entirely, failing to provide a load current at the subsequent re-connection of the load, thus failing to detect the re-connected load condition. Furthermore, if $C_3$ and $C_5$ have been exhausted, they would be charged at the conduction of $Q_1$ to thereby generate an erroneous load current leading leads to false detection of the re-connected condition such that the control has to be required to ignore such false current by additional scheme as discussed previously with reference to FIGS. 36 and 37. However, by keeping only $Q_1$ operative in the negative half cycle of the input AC voltage over the off-load condition, $C_3$ and $C_5$ can be charged in a manner as to have a relation $V_{C3} + V_{C5} = V_{C2}$ so that a load current will not flow until the load is reconnected, thus making it possible to detect the reconnected load condition by monitoring a load current flowing through the switching transistor.

It is noted at this time that the various controls described in the above for detection of the re-connected load condition can be equally applicable to all the circuits of the present invention including those of FIGS. 23 and 24.

Fourth embodiment <FIGS. 47 to 56>

Figure 47:
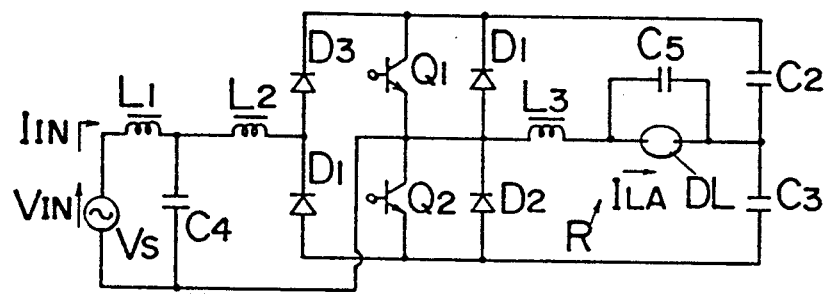
FIG. 47 is circuit diagram of the power supply in accordance with a fourth embodiment of the present invention with a power controller removed therefrom.

The power control of the present invention is also applicable to cases where the above chopper/inverter circuit is required to provide a relatively low frequency voltage or current of generally rectangular waveform of less high frequency component resulting form the high frequency switching of $Q_1$ and $Q_2$. For instance, when the circuit is utilized to drive a discharge lamp DL by a relatively low frequency load current of generally rectangular waveform of less high frequency component, as shown in FIG. 49 in order to avoid acoustic resonance which would occur when the lamp is driven by a high frequency current. FIG. 47 illustrates a circuit arrangement for producing the low frequency load current which is identical in configuration to the previous embodiment but in which $Q_1$ and $Q_2$ are controlled somewhat differently. That is, as shown FIG. 48, $Q_1$ turns on and off at a high frequency while $Q_2$ is kept turned off during the positive half cycle of the input AC voltage $V_{IN}$ and vice versa during the negative half cycle of $V_{IN}$ so as to provide an inverter output v a train of high frequency pulses of which polarity is reversed at a low frequency or in synchronism with the low frequency input AC voltage $V_{IN}$. The circuit includes a bypass capacitor $C_5$ which is connected across the lamp DL to pass therethrough substantially all of high frequency component of the inverter output V, thereby applying to the lamp DL a load current $I_{LA}$, as shown in FIG. 49, which sees only a slight amount of the high frequency component and presents a generally rectangular waveform having the same low frequency of the input AC voltage $V_{IN}$. With this result, the lamp DL can be driven without causing the acoustic resonance leading to unstable arc and eventually to flickering or extinction of the lamp.

Figure 49:
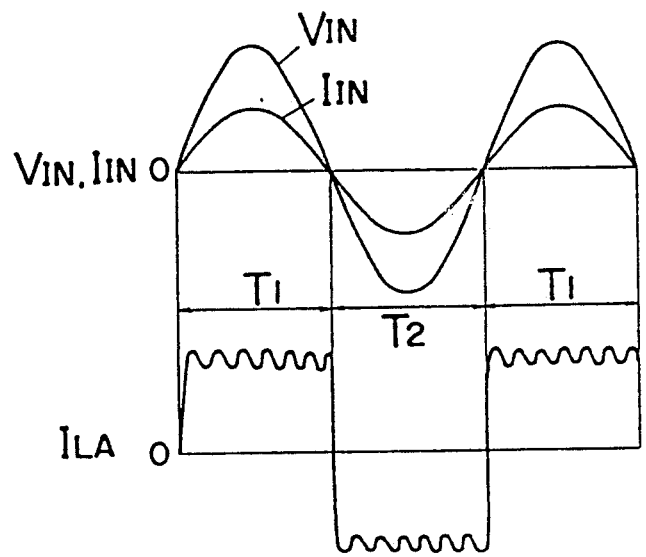
FIG. 49 is a waveform chart illustrating a load current obtained in the circuit of FIG. 47.
Figure 50:
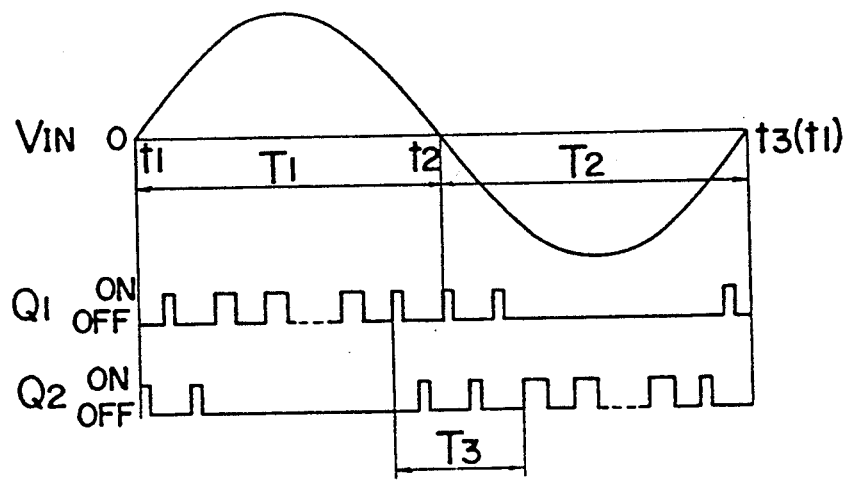
FIG. 50 is a waveform chart illustrating another preferred operation of FIG. 47.
Figure 51:
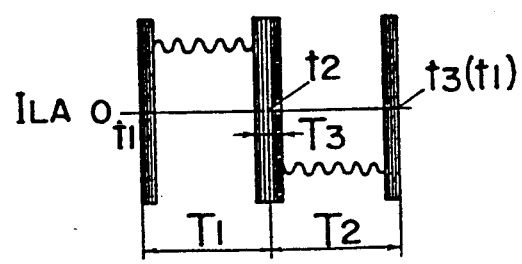
FIG. 51 is a waveform chart illustrating a composite load current obtained in the control of FIG. 50.

FIG. 50 illustrates another scheme of driving $Q_1$ and $Q_2$ of the circuit of FIG. 47 in order to obtain a load current of FIG. 51. The load current is characterized to comprise a low frequency part of generally rectangular waveform of FIG. 49 alternated by high frequency part which appear for a limited time interval $T_3$ around each polarity reversal of the input AC voltage $V_{IN}$. Such composite current $I_{LA}$ is found advantageous to operate the lamp DL stably while preventing the unacceptable acoustic resonance. For generating the composite current $I_{LA}$, the circuit is controlled to operate only one of $Q_1$ and $Q_2$ selectively depending upon the polarity of the input AC voltage $V_{IN}$ [$Q_1$ for time period $T_1$ of $V_{IN}>0$, $Q_2$ for time period $T_2$ of $V_{IN}<0$] as discussed in the above with reference to FIG. 48, and at the same time to turn on and off alternately for the limited time interval $T_3$ around the polarity reversal of $V_{IN}$.

Figure 52:
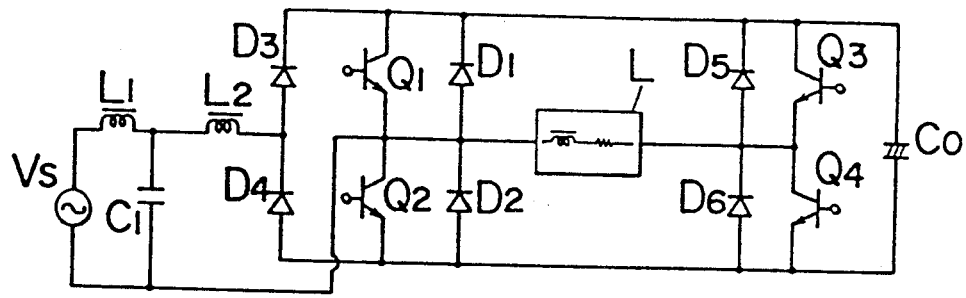
FIG. 52 is a circuit diagram illustrating another circuit of the power supply similar to FIG. 47 but operated differently :, for obtaining the like load current as in FIG. 49.
Figure 53:
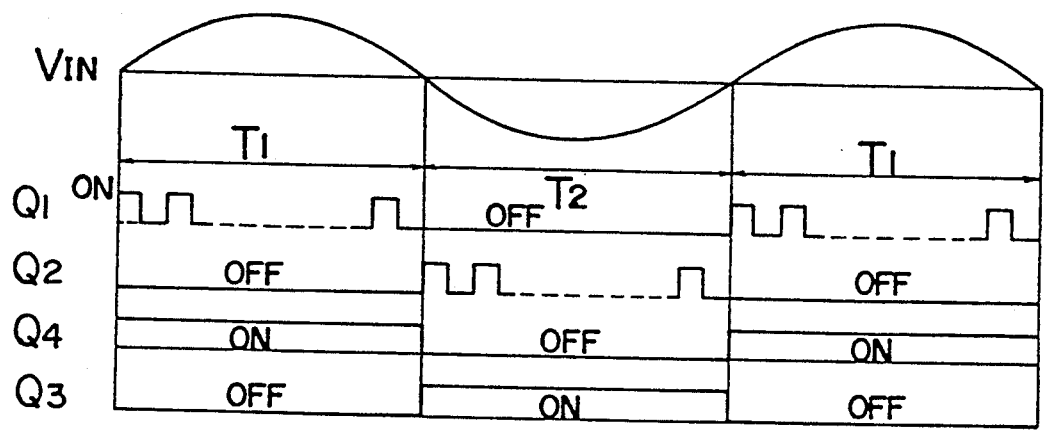
FIG. 53 is a waveform chart illustrating the operation of the circuit of FIG. 52.

FIG. 52 illustrates another chopper/inverter circuit for providing a train of high frequency output pulses of which polarity is reverse at a low frequency in synchronism with the input AC voltage. The circuit comprises four switching transistors $Q_1$ to $Q_4$ connected in full-bridge configuration and a smoothing capacitor $C_0$ connected in parallel across the series pair of transistors $Q_3$ and $Q_4$. A load L is illustrated as an inductive load having an inductor and resistor. As shown in FIG. 53, during a first time period $T_1$ or the positive half cycle of $V_{IN}$, $Q_1$ is driven to turn on and off at a high frequency and $Q_4$ is kept turned on, while the other diagonally opposed $Q_2$ and $Q_3$ are kept turned off. In the subsequent time period $T_2$ corresponding to the negative half cycle of $V_{IN}$, $Q_2$ is driven to turn on and off at the same high frequency with $Q_3$ kept turned on, while $Q_1$ and $Q_4$ are kept turned off. Whereby, the inverter can provide to the load a resulting output in the form of a high frequency pulse train of which polarity is reversed at the low frequency in synchronism with the input AC voltage. In this circuit having the full-bridge transistor configuration, the load L can receive a full voltage of the $C_0$ which almost doubles that obtained in the circuit of FIG. 47. Thus, the above circuit is particularly effective where it is required a high load voltage. In the above control of FIG. 53, $Q_3$ and $Q_4$ are driven in synchronism with $V_{IN}$, however, they can be driven to turn on and off at the same high frequency in synchronism with $Q_2$ and $Q_1$, respectively. In such case, upon turning off of $Q_1$ and $Q_4$ an energy stored in the inductor of the load L will flow through a closed loop of diode $D_5$, capacitor $C_0$, diode $D_2$, and load L, and upon turning off of $Q_2$ and $Q_3$ the energy will from the inductor through another closed loop of diode $D_1$, capacitor $C_0$, diode $D_6$, and the load L. Further, it is equally possible to operate $Q_1$ and $Q_2$ to turn on and off alternately over the full period of $T_1$ and $T_2$, while operating $Q_3$ and $Q_4$ in synchronism with $V_{IN}$.

Figure 48:
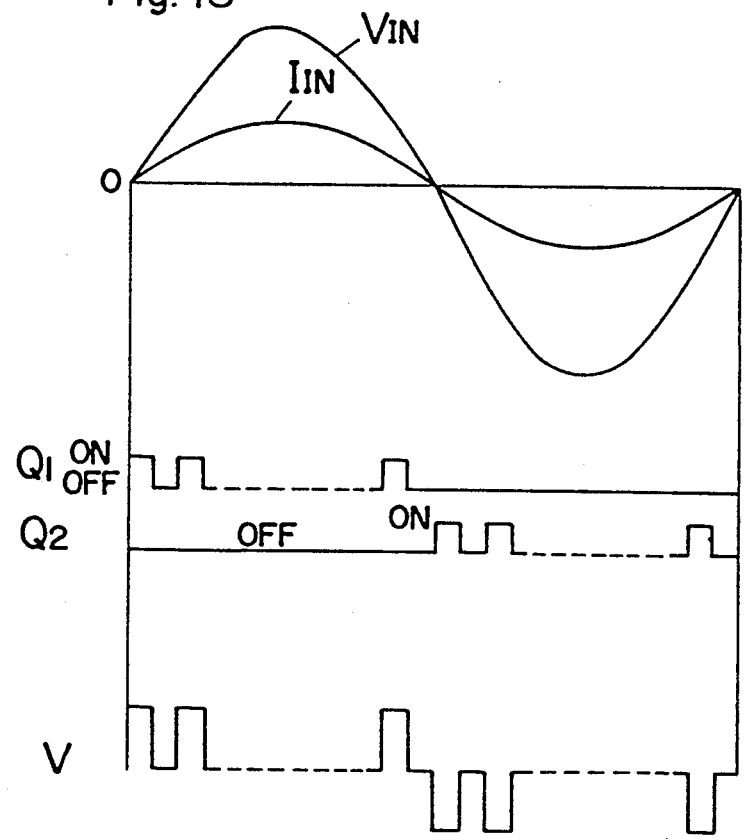
FIG. 48 is a waveform chart illustrating one preferred operation of the circuit of FIG. 47.
Figure 54:
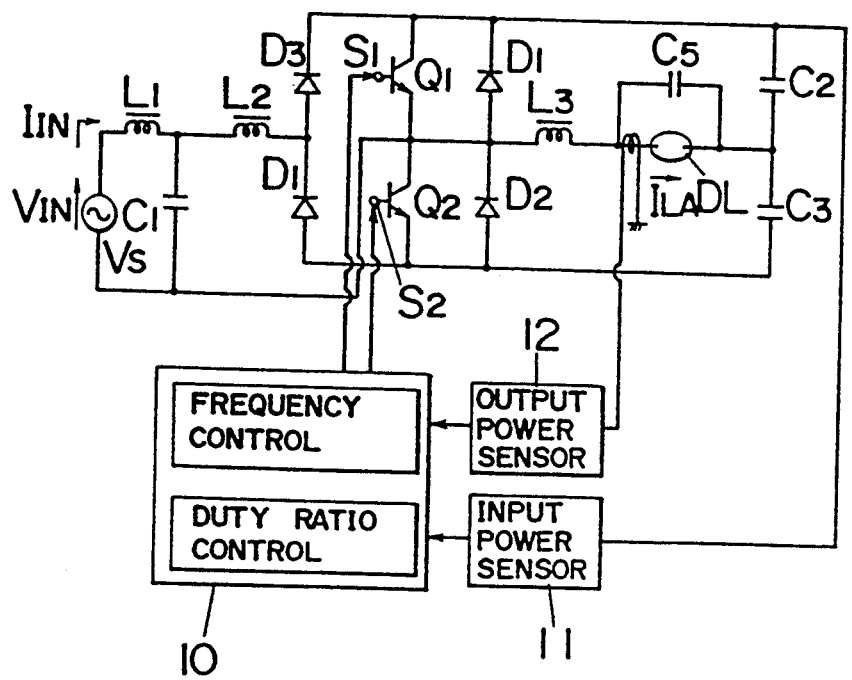
FIG. 54 is a circuit diagram of the power supply circuit in accordance with a fourth embodiment of the present invention.
Figure 55A:
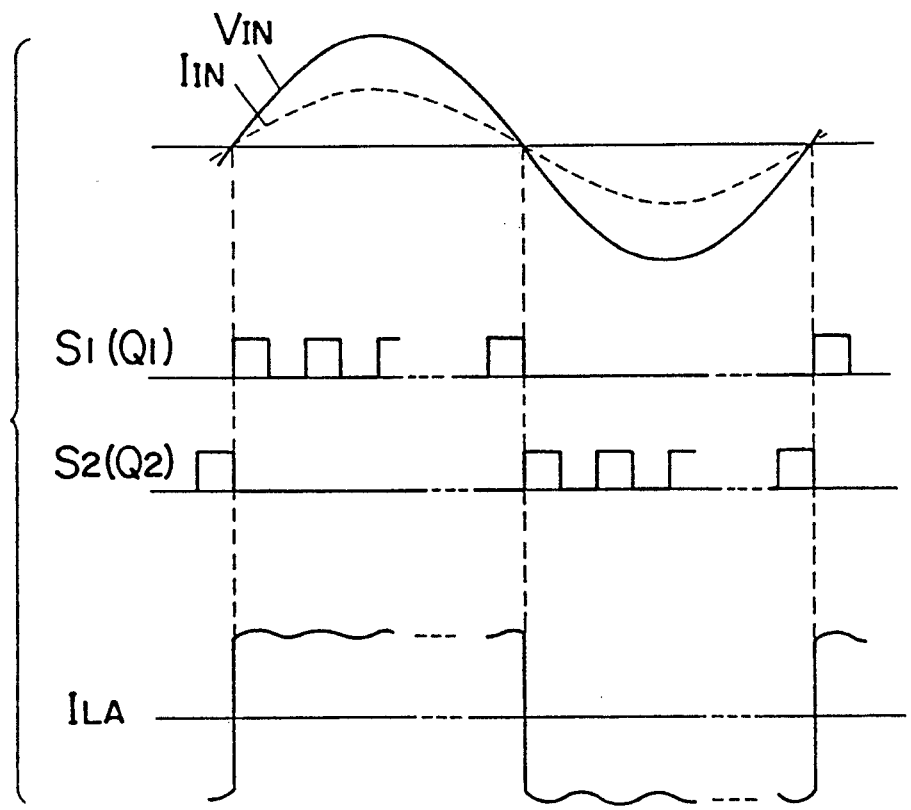
FIGS. 55A and 55B are waveform charts illustrating the operations of the circuit of FIG. 54.
Figure 55B:
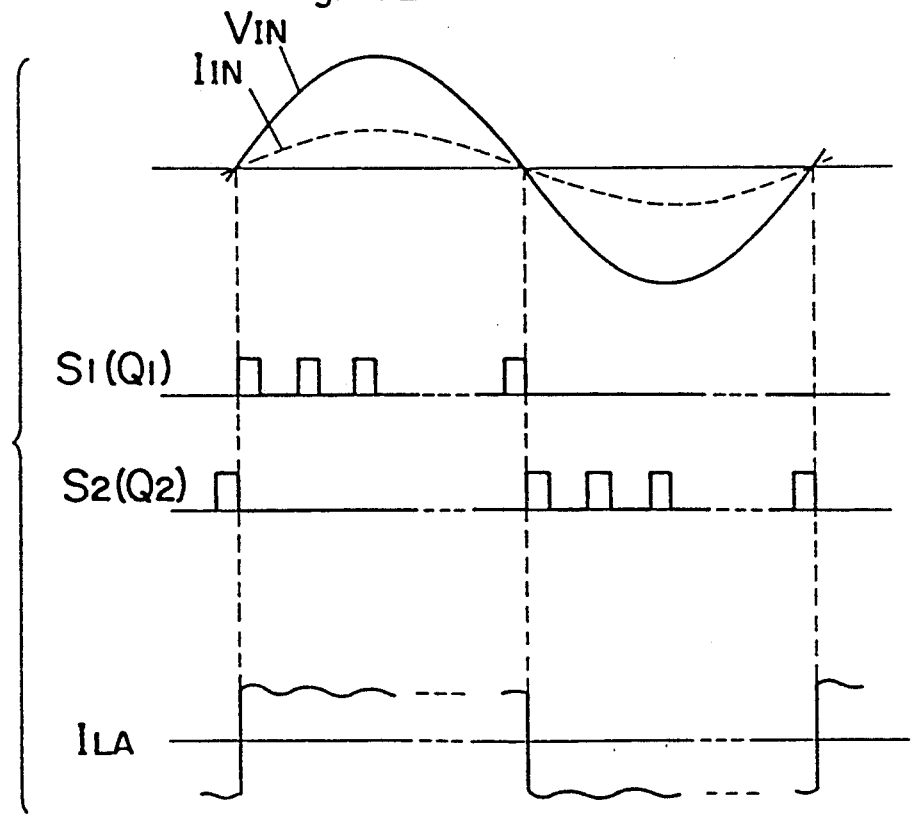

FIG. 54 illustrates an arrangement for balancing the chopper input power $W_{IN}$ and the inverter output power $W_{OUT}$ with regard to the like chopper/inverter circuit of FIG. 47 operating in the like manner of FIGS. 48 or 50 to provide an output of FIGS. 49 or 51. To this end, a power controller 10 is included in combination with an input power sensor 11 and an output power sensor 12. The input power sensor 11 is connected in circuit to monitor a DC voltage across capacitors $C_2$ and $C_3$ which is the function of the chopper output voltage and therefore indicative of the chopper input power $W_{IN}$. The output power sensor 12 is connected in circuit to monitor a load current as indicative of the inverter output power $W_{OUT}$. Due to the inclusion of a bypass capacitor $C_5$ connected across the discharge lamp DL for bypassing high frequency component as mentioned previously in the circuit of FIG. 47, the load including inductor $L_3$ and capacitor $C_5$ will have a natural frequency $f_c$ rather smaller than and spaced from a switching frequency f at which $Q_1$ and $Q_2$ are driven to provide a train of rectangular pulses within each half cycle of $V_{IN}$. For instance, $f_c = 10 \sim 20$ KHz at $f = 40$ KHz. Accordingly, $W_{OUT}$ will show a rather gradual change with a change in the switching frequency f within an operational range relative to the case where $f_c$ is close to f [for example, $f_c = 30$ KHz and $f = 40$ KHz], as seen in FIG. 5A, for providing a high frequency alternating output. This means that only less difference between $W_{IN}$ and $W_{OUT}$ is caused when varying the switching frequency f in order to regulate $W_{OUT}$ or $W_{IN}$ for dimmer control or compensation for an input AC voltage variation. Therefore, when required to balancing $W_{IN}$ and $W_{OUT}$ in accordance with the control schemes of FIGS. 10 to 14, the amount of variation in the switching frequency f as well as duty ratio D can be retained rather small, thereby facilitating the control of balancing the $W_{IN}$ and $W_{OUT}$. For example, when it is required to dim the lamp DL from a maximum light intensity condition of FIG. 55A to a reduced light intensity condition of FIG. 55B, the balancing of $W_{IN}$ and $W_{OUT}$ can be re-established also at the dimmed condition by controlling both of the switching frequency f and duty ratio D in accordance with the control scheme as described with reference to FIGS. 13A and 13B but with less variations in f and D. It is noted at this time that, as shown in FIGS. 55A and 55B, the resulting output current $I_{LA}$ from the circuit of FIG. 54 can be shaped to have generally rectangular waveform from which high frequency components have been removed by the bypass capacitor $C_5$ and have a low frequency in synchronism with the input AC voltage $V_{IN}$.

Figure 56A:
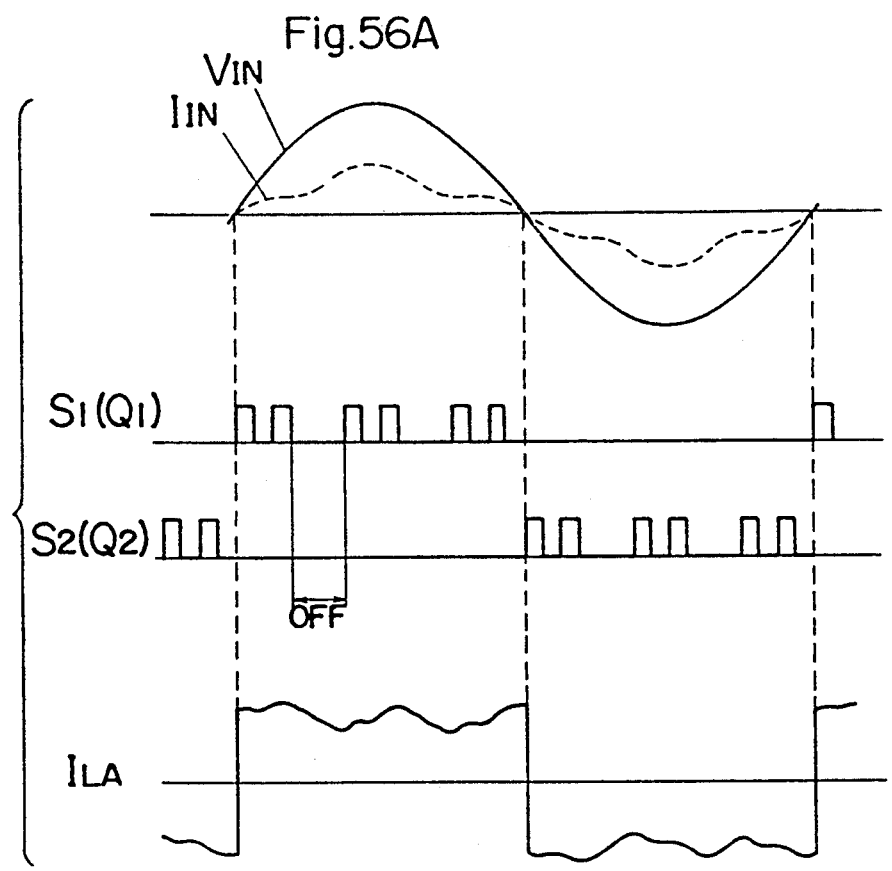
FIGS. 56A and 56B are waveform charts illustrating the operations of the circuit of FIG. 54.
Figure 56B:
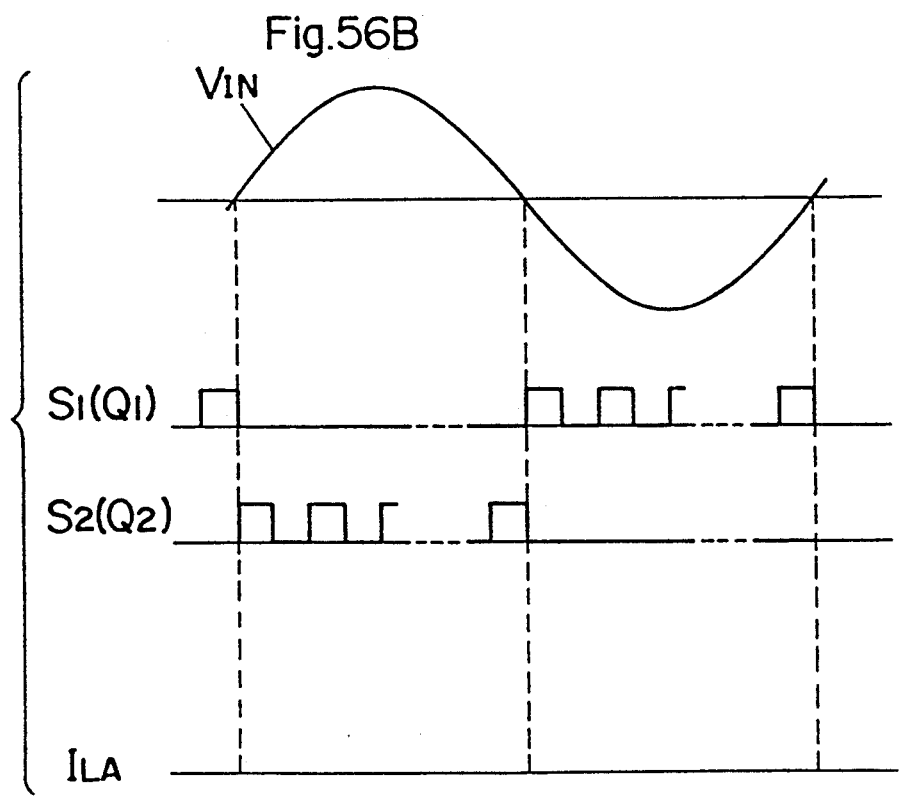
Figure 57A:
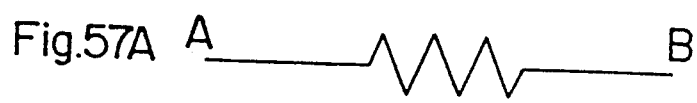
FIG. 57A to 57D illustrates various loads which may be adapted to be driven by the power supply of the present invention.
Figure 57B:
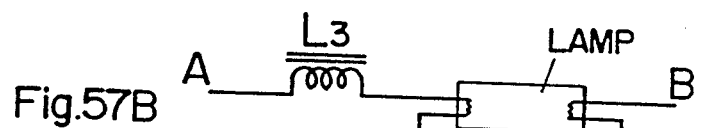
Figure 57C:
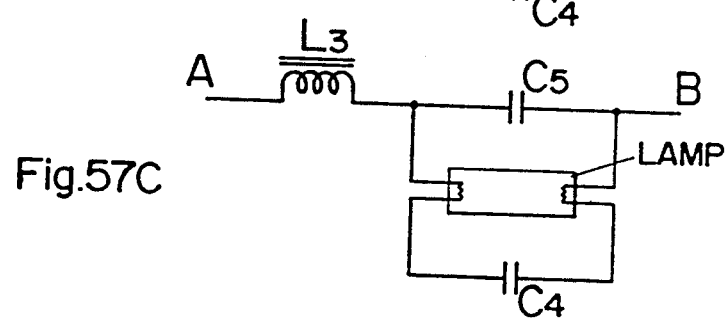
Figure 57D:
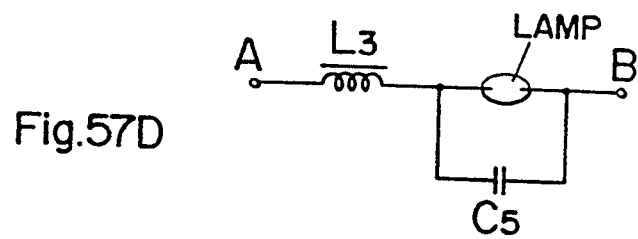

Also with regard to the above circuit of FIG. 54 operating to provide the low frequency output of generally rectangular waveform, it is equally possible to combine the previously mentioned control of intermittently ceasing the chopper operation to regulate the chopper input power $W_{IN}$ relatively independently of the inverter output power $W_{OUT}$, as discussed in the second embodiment. In this case, as shown in FIG. 56A, one of $Q_1$ and $Q_1$ currently responsible for chopper operation is disabled periodically at a regular interval to reduce $W_{IN}$. Further, it is also possible to combine the control of detecting the off-load and reconnected load conditions as discussed in the third embodiment of the present invention, in which case, one of $Q_1$ and $Q_2$ responsible for the chopper operation is likewise disabled upon detection of the off-load condition, as shown in FIG. 56B, while the other one of $Q_1$ and $Q_2$ is kept operative so that the circuit is ready for provide a load current as soon as the load is reconnected.

In the above embodiments and modifications, although the load is mainly shown to comprise a lamp with inductor and capacitor for easy understanding purposes, the present invention should not be understood to be limited thereto and is equally effective to drive various loads including a resistive load and other inductive loads as exemplary shown in FIGS. 57A to 57D.

What is claimed is:

1. A power supply, comprising:
   a source of AC voltage;
   a chopper circuit, including
   (a) a pair of first and second switching elements operatively connected to said AC voltage source, and
   (b) capacitor means, operatively connected to the first and second switching elements, for smoothening a periodically interrupted voltage from said AC voltage source through the first and second switching elements so as to provide a resulting smoothened DC voltage thereat;
   an inverter circuit means, including the first and second switching elements in common with said chopper circuit, for driving the first and second switching elements to turn on and off so as to provide from the DC voltage of the capacitor means an AC voltage to a load connected to said inverter circuit means at first and second load connection points; and
   power control means, operatively connected to inputs of the first and second switching elements, for varying at least one of a switching frequency and a duty ratio for the first and second switching elements so as to provide the periodically interrupted voltage from said AC voltage source by turning on and off the first and second switching elements in accordance with a chopper input power and an inverter output power, said power control means equalizing the chopper input and inverter output powers.

2. A power source as set forth in claim 1, further comprising:
   an input power sensor means, operatively connected to said chopper circuit and said power control means, for monitoring the chopper input power supplied to said chopper circuit; and
   an output power sensor means operatively connected to said inverter circuit means and said power control means for monitoring the inverter output power from said inverter circuit means to the load.

3. A power source as set forth in claim 2, wherein said power control means varies said switching frequency and duty ratio together in combination for equalizing the chopper input power and the inverter output power while maintaining one of the chopper input and inverter output powers substantially at a fixed level.

4. A power source as set forth in claim 2, wherein said power control means drives the first and second switching elements so as to temporarily cease operation of said chopper circuit for regulating the chopper input power supplied from said AC source voltage, and at the same time to vary at least one of the switching frequency and duty ratio.

5. A power source as set forth in claim 1, wherein said power means drives the first and second switching elements so as to temporarily cease operation of said chopper circuit while keeping operation of said inverter circuit means active for regulating the chopper input power supplied from said AC source voltage, and at the same time to vary at least one of the switching frequency and duty ratio.

6. A power source as set forth in claims 4 or 5, wherein said power control means includes a source voltage polarity detector for identifying which of the first and second switching elements currently receives a forward bias from said AC voltage source and acts for operation of both said chopper circuit and inverter circuit means, said power control means operating to temporarily cease operating one of the first and second switching elements identified as responsible for both operations of said chopper and inverter circuit means while keeping the other switching element active, thereby regulating the chopper input power supplied from said AC source voltage and at the same time varying at least one of the switching frequency and duty ratio.

7. A power source as set forth in claim 1, wherein
   said power control means drives the first and second switching elements connected in series across said AC voltage source so as to alternately turn on and off at a high frequency for switching the DC voltage to provide a high frequency AC voltage, and
   said chopper circuit includes a diode bridge fullwave rectifier means for providing the DC voltage from said AC source voltage, the rectifier incorporating a first pair of series connected first and second diodes and a second pair of series connected third and fourth diodes in parallel with the first pair of first and second diodes, the first and second diodes connected in anti-parallel relation respectively with the first and second switching elements, the first and second diodes defining therebetween a first point of connection, the third and fourth diodes defining therebetween a second point of connection, and further
   said chopper circuit further includes inductor means, connected in series with said AC voltage source between the first and second points of connection, for operating said chopper circuit so as to repeat interrupting an input AC voltage from said AC voltage source and thereby develop at the inductor means a resulting voltage to be fed through said fullwave rectifier for providing the DC voltage to the capacitor means.

8. A power source as set forth in claim 1, wherein
   said power control means drives the first and second switching elements connected in series across said AC voltage source so as to turn on and off at a high frequency for switching the DC voltage to provide a resulting AC voltage, and
   said chopper circuit includes a diode bridge full-wave rectifier providing the DC voltage from said AC source voltage, the rectifier incorporating a first pair of series connected first and second diodes and a second pair of series connected third and fourth diodes in parallel with the first pair of first and second diodes, the first and second diodes connected in anti-parallel relation respectively with the first and second switching elements, the first and second diodes defining therebetween a first point of connection, the third and fourth diodes defining therebetween a second point of connection, and further
   said chopper circuit further includes inductor means, connected in series with said AC voltage source between the first and second points of connection, for operating said chopper circuit so as to repeat interrupting an input AC voltage from said AC voltage source and thereby develop at the inductor means a resulting voltage to be fed through the full-wave rectifier for providing the DC voltage to the capacitor means, said inverter circuit means operates in synchronism with a polarity of the input AC voltage to keep turning on and off one of the switching elements to which a forward bias is applied from the input AC voltage while keeping turned off the other switching element for a suitable time period within each half cycle of the input AC voltage.

9. A power source as set forth in claim 1, further comprising:
 a load detector means, operatively connected to first and second load connection points, for detecting whether the load is disconnected from said power source; and
 a source voltage polarity detector for identifying which of the first and second switching elements currently receives a forward bias from said AC voltage source and acting currently for effecting operation of both said chopper and inverter circuit means, said load detector including control means for ceasing, in response to a no-load condition detected at the load detector operation of the first and second switching elements identified as responsible for operation of said chopper and inverter circuits while keeping the other switching element active, thereby enabling said inverter circuit means to provide a current when the load is reconnected, and the control means further operates in response to detection of the current to the load to resume driving the switching element that ceased operation.

10. A power source as set forth in claim 1 wherein the capacitor means includes a pair of first and second capacitors connected in series across the first and second switching elements with each of the first and second capacitors connected in parallel to each other and in series with the load across each of the first and second switching elements.

11. A power source as set forth in claim 1, wherein the capacitor means includes a pair of first and second capacitors connected in parallel relative to the second switching element with each of the first and second capacitors connected in series with the load across the first switching element.

* * * * *